US012668518B2

(12) United States Patent
Atwater et al.

(10) Patent No.: US 12,668,518 B2
(45) Date of Patent: Jun. 30, 2026

(54) SYSTEM AND METHOD FOR DUAL-PATHWAY SYSTEM FOR CARBON DIOXIDE CAPTURE FROM OCEAN WATER

(71) Applicant: California Institute of Technology, Pasadena, CA (US)

(72) Inventors: Harry A. Atwater, South Pasadena, CA (US); Chengxiang Xiang, San Marino, CA (US); Ibadillah A. Digdaya, Whittier, CA (US)

(73) Assignee: California Institute of Technology, Pasadena, CA (US)

( * ) Notice: Subject to any disclaimer, the term of this patent is extended or adjusted under 35 U.S.C. 154(b) by 689 days.

(21) Appl. No.: 18/061,381

(22) Filed: Dec. 2, 2022

(65) Prior Publication Data
US 2024/0182340 A1 Jun. 6, 2024

(51) Int. Cl.
*B01D 53/62* (2006.01)
*B01D 61/44* (2006.01)
(Continued)

(52) U.S. Cl.
CPC ............... *C02F 9/00* (2013.01); *B01D 53/62* (2013.01); *B01D 61/445* (2013.01); *B01D 61/50* (2013.01);
(Continued)

(58) Field of Classification Search
CPC .. B01D 2325/10; C01F 11/181; C02F 1/4693; C02F 2103/08
See application file for complete search history.

(56) References Cited

U.S. PATENT DOCUMENTS 3,627,479 A * 12/1971 Yee .......................... C02F 5/025
423/430
4,995,956 A 2/1991 Mani
(Continued)

FOREIGN PATENT DOCUMENTS

CA 2592926 A1 1/2009
CA 2592926 C 2/2015
(Continued)

OTHER PUBLICATIONS

Wang, Lu-chuan—CN211999373U machine translation—Nov. 24, 2020 (Year: 2020).*
(Continued)

*Primary Examiner* — Bradley R Spies
(74) *Attorney, Agent, or Firm* — KPPB LLP

(57) ABSTRACT

A dual-pathway system for $CO_2$ capture in both acidified and basified streams is provided. The system may be embodied in an off-shore stand-alone facility to allow for the operation of oceanic $CO_2$ capture to be more efficient and cost effective. Systems maintain high environmental standards by containing all intermediate acidic and alkaline solutions in a closed system so that the effluent discharged back into the ocean is at the similar pH and salinity as the feed ocean-water, with only $CO_2$ removed. Acid and base produced by an electrodialyzer unit is used to achieve oceanwater decarbonization via gaseous $CO_2$ removal and solid $CaCO_3$ precipitates removal. The system is configured to require the processing of a very small fraction of the total oceanwater intake for the acid-base generation process.

35 Claims, 13 Drawing Sheets

(51) Int. Cl.

| | |
|---|---|
| *B01D 61/50* | (2006.01) |
| *B01D 69/02* | (2006.01) |
| *B01D 69/08* | (2006.01) |
| *B01D 69/12* | (2006.01) |
| *B01D 69/14* | (2006.01) |
| *B01D 71/26* | (2006.01) |
| *B01D 71/52* | (2006.01) |
| *B01J 31/06* | (2006.01) |
| *B01J 35/59* | (2024.01) |
| *C01F 11/18* | (2006.01) |
| *C02F 1/461* | (2023.01) |
| *C02F 1/469* | (2023.01) |
| *C02F 1/66* | (2023.01) |
| *C02F 9/00* | (2023.01) |
| *C02F 103/08* | (2006.01) |
| *C02F 1/00* | (2023.01) |
| *C02F 1/42* | (2023.01) |
| *C02F 1/52* | (2023.01) |

(52) U.S. Cl.
CPC ............. *B01D 69/02* (2013.01); *B01D 69/08* (2013.01); *B01D 69/1216* (2022.08); *B01D 69/144* (2013.01); *B01D 69/145* (2013.01); *B01D 71/261* (2022.08); *B01D 71/262* (2022.08); *B01D 71/5211* (2022.08); *B01J 31/06* (2013.01); *B01J 35/59* (2024.01); *C01F 11/181* (2013.01); *B01D 2251/304* (2013.01); *B01D 2251/604* (2013.01); *B01D 2257/504* (2013.01); *B01D 2325/10* (2013.01); *B01D 2325/14* (2013.01); *B01D 2325/42* (2013.01); *C02F 1/004* (2013.01); *C02F 2001/007* (2013.01); *C02F 1/42* (2013.01); *C02F 1/4618* (2013.01); *C02F 1/4693* (2013.01); *C02F 2001/5218* (2013.01); *C02F 1/66* (2013.01); *C02F 2103/08* (2013.01); *C02F 2201/009* (2013.01)

(56) References Cited

U.S. PATENT DOCUMENTS

| | | | |
|---|---|---|---|
| 5,316,643 A | 5/1994 | Ahn et al. | |
| 5,645,703 A | 7/1997 | Tsai | |
| 6,221,225 B1 | 4/2001 | Mani | |
| 6,331,236 B1 | 12/2001 | Mani | |
| 6,482,305 B1 | 11/2002 | Mani | |
| 7,744,760 B2 | 6/2010 | Wilkins et al. | |
| 7,883,610 B2 | 2/2011 | Monzyk et al. | |
| 8,519,185 B2 | 8/2013 | Okazaki et al. | |
| 8,858,777 B2 | 10/2014 | Kaczur et al. | |
| 8,932,448 B2 | 1/2015 | Valk et al. | |
| 9,586,181 B2 | 3/2017 | Eisaman et al. | |
| 9,828,313 B2 | 11/2017 | Weiss et al. | |
| 9,914,644 B1 | 3/2018 | Eisaman | |
| 9,937,471 B1 | 4/2018 | Eisaman | |
| 10,266,430 B2 | 4/2019 | Yin et al. | |
| 10,301,200 B2 | 5/2019 | Liang | |
| 10,898,854 B2 | 1/2021 | Constantz et al. | |
| 11,318,416 B2 | 5/2022 | Wilkinson et al. | |
| 11,912,591 B2 | 2/2024 | McDonald et al. | |
| 2005/0186312 A1 | 8/2005 | Loh et al. | |
| 2005/0220969 A1 | 10/2005 | Loh et al. | |
| 2006/0024412 A1 | 2/2006 | Cha et al. | |
| 2006/0173084 A1 | 8/2006 | Zheng et al. | |
| 2008/0014622 A1* | 1/2008 | Federspiel | A61M 1/28 96/10 |
| 2010/0024651 A1 | 2/2010 | Bansal | |
| 2012/0298509 A1 | 11/2012 | Heydecke | |
| 2013/0008792 A1 | 1/2013 | Eisaman et al. | |
| 2013/0323373 A1 | 12/2013 | Tanaka et al. | |
| 2015/0083607 A1 | 3/2015 | Gilliam et al. | |

| | | | |
|---|---|---|---|
| 2017/0341952 A1 | 11/2017 | Eisaman | |
| 2017/0342006 A1* | 11/2017 | Eisaman | B01D 61/025 |
| 2018/0243682 A1 | 8/2018 | Isobe et al. | |
| 2019/0127865 A1 | 5/2019 | Li et al. | |
| 2019/0240623 A1 | 8/2019 | Beh et al. | |
| 2020/0024159 A1 | 1/2020 | Parkey et al. | |
| 2020/0140296 A1 | 5/2020 | Choi et al. | |
| 2020/0189941 A1 | 6/2020 | Kumar et al. | |
| 2020/0370188 A1 | 11/2020 | Oener et al. | |
| 2021/0046423 A1* | 2/2021 | Ardo | B01D 69/12 |
| 2021/0123146 A1 | 4/2021 | Berlinguette et al. | |
| 2021/0138364 A1 | 5/2021 | Van Linden et al. | |
| 2021/0207275 A1 | 7/2021 | Huo et al. | |
| 2021/0299606 A1* | 9/2021 | Henson | B01D 53/1443 |
| 2022/0144673 A1 | 5/2022 | Xiang et al. | |
| 2023/0107163 A1 | 4/2023 | Xiang et al. | |
| 2023/0358677 A1 | 11/2023 | Boehme et al. | |
| 2024/0024823 A1 | 1/2024 | Lucas et al. | |
| 2024/0133051 A1 | 4/2024 | Atwater et al. | |

FOREIGN PATENT DOCUMENTS

| | | | | | |
|---|---|---|---|---|---|
| CA | 3194634 | A1 | | 5/2022 | |
| CA | 3232572 | A1 | | 3/2023 | |
| CA | 3254020 | A1 | | 1/2024 | |
| CA | 3242789 | A1 | | 6/2024 | |
| CN | 1201710 | A | | 12/1998 | |
| CN | 110117048 | A | | 8/2019 | |
| CN | 110270225 | A | | 9/2019 | |
| CN | 211999373 | U | * | 11/2020 | |
| CN | 113087229 | B | | 6/2022 | |
| CN | 116669834 | A | | 8/2023 | |
| CN | 118695896 | A | | 9/2024 | |
| CN | 119731123 | A | | 3/2025 | |
| EP | 4240513 | A1 | | 9/2023 | |
| EP | 4405085 | A1 | | 7/2024 | |
| EP | 4547613 | A1 | | 5/2025 | |
| EP | 4626587 | A1 | | 10/2025 | |
| JP | H05285347 | A | | 11/1993 | |
| JP | H06254356 | A | | 9/1994 | |
| JP | 2007054066 | A | | 3/2007 | |
| JP | 2009535198 | A | | 10/2009 | |
| JP | 2013013889 | A | | 1/2013 | |
| JP | 2023549031 | A | | 11/2023 | |
| JP | 2025524332 | A | | 7/2025 | |
| KR | 20150108595 | A | * | 9/2015 | ............... C02F 9/00 |
| KR | 101746591 | B1 | | 6/2017 | |
| WO | 2019099769 | A1 | | 5/2019 | |
| WO | 2020123728 | A1 | | 6/2020 | |
| WO | WO-2020154699 | A1 | * | 7/2020 | ............. C01B 32/55 |
| WO | 2020232143 | A1 | | 11/2020 | |
| WO | 2022099174 | A1 | | 5/2022 | |
| WO | 2023044508 | A1 | | 3/2023 | |
| WO | 2024006860 | A1 | | 1/2024 | |
| WO | 2024081661 | A1 | | 4/2024 | |
| WO | 2024118103 | A1 | | 6/2024 | |

OTHER PUBLICATIONS

Floyd III, William C., et al. "Evaluation of a carbonic anhydrase mimic for industrial carbon capture." Environmental science & technology 47.17 (2013): 10049-10055. (Year: 2013).*

Herrero-Gonzalez, Marta, et al. "Highly concentrated HCl and NaOH from brines using electrodialysis with bipolar membranes." Separation and Purification Technology 242 (2020): 116785. (Year: 2020).*

Yang, Cheol Geun—KR20150108595A machine translation—Sep. 30, 2015 (Year: 2015).*

Kortlever et al., "Catalysts and Reaction Pathways for the Electrochemical Reduction of Carbon Dioxide", The Journal of Physical Chemistry Letters, vol. 6, No. 20, Sep. 24, 2015, pp. 4073-4082, doi: 10.1021/acs.jpclett.5b01559.

Kothai Nayaki et al., "Unusual luminescence characteristics of aminobiphenyls", Spectrochimica Acta Part A: Molecular and Biomolecular Spectroscopy, vol. 58, No. 13, Nov. 2002, pp. 2931-2940, doi: 10.1016/S1386-1425(02)00083-5.

(56)     References Cited

OTHER PUBLICATIONS

Krishnamurthy et al., "On the Proton Transfer Reactions of Indolecarboxylic Acids in the Excited Singlet State", Journal of Luminescence, vol. 35, No. 6, Sep. 1986, pp. 343-348, doi: 10.1016/0022-2313(86)90020-7.

Krishnamurthy et al., "Photophysical Behaviour of 3-Indazolinone", Chemical Physics, vol. 103, No. 2-3, Apr. 1, 1986, pp. 325-333, doi: 10.1016/0301-0104(86)80033-7.

Krishnamurthy et al., "Solvent Effects on the Electronic Absorption and Fluorescence Spectra of Indole-4-Carboxylic Acid: Prototropic Equilibria in Aqueous Solutions", Photochemistry and Photobiology, vol. 45, No. 3, Mar. 1987, pp. 359-364, doi: 10.1111/j.1751-1097.1987.tb05387.x.

Kuhl et al., "New insights into the electrochemical reduction of carbon dioxide on metallic copper surfaces", Energy & Environmental Science, vol. 5, No. 5, 2012, pp. 7050-7059, doi: 10.1039/C2EE21234J.

Landschutzer et al., "Decadal variations and trends of the global ocean carbon sink", Global Biogeochemical Cycles, vol. 30, No. 10, Oct. 2016, pp. 1396-1417, doi: 10.1002/2015GB005359.

Laws et al., "Analysis of Two-State Excited-State Reactions. The Fluorescence Decay of 2-Naphthol", Journal of Physical Chemistry, vol. 83, No. 7, Apr. 1, 1979, pp. 795-802, doi: 10.1021/j100470a007.

Lee et al., "Current achievements and the future direction of electrochemical CO2 reduction: A short review", Critical Reviews in Environmental Science and Technology, vol. 50, No. 8, 2020, pp. 769-815, doi: 10.1080/10643389.2019.1631991.

Lee et al., "Small molecule-based ratiometric fluorescence probes for cations, anions, and biomolecules", Chemical Society Reviews, vol. 44, No. 13, 2015, pp. 4185-4191, doi: 10.1039/c4cs00280f.

Leenheer et al., "Imaging Water-Splitting Electrocatalysts with pH-Sensing Confocal Fluorescence Microscopy", Journal of the Electrochemical Society, vol. 159, No. 9, Aug. 14, 2012, pp. H752-H757, doi: 10.1149/2.022209jes.

Lees et al., "Electrolytic Methane Production from Reactive Carbon Solutions", ACS Energy Letters, vol. 7, No. 5, Apr. 19, 2022, pp. 1712-1718, doi: 10.1021/acsenergylett.2c00283.

Lewis et al., "Phosphate Diffusion in Soil and Uptake by Plants", Plant and Soil, vol. XXVI, No. 1, Feb. 1967, pp. 99-118, doi: 10.1007/BF01978678.

Liu et al., "pH effects on the electrochemical reduction of CO(2) towards C2 products on stepped copper", Nature Communications, vol. 10, Article 32, Jan. 3, 2019, 10 pgs., doi: 10.1038/s41467-018-07970-9.

Longsworth, "Diffusion Measurements, at 25°, of Aqueous Solutions of Amino Acids, Peptides and Sugars", Journal of the American Chemical Society, vol. 75, No. 22, Nov. 20, 1953, pp. 5705-5709, doi: 10.1021/ja01118a065.

Lu et al., "In Situ Observation of the pH Gradient near the Gas Diffusion Electrode of CO2 Reduction in Alkaline Electrolyte", Journal of the American Chemical Society, vol. 142, No. 36, Jul. 21, 2020, pp. 15438-15444, doi: 10.1021/jacs.0c06779.

Luo et al., "Clarification of mechanisms of protonic photovoltaic action initiated by photoexcitation of strong photoacids covalently bound to hydrated Nafion cation-exchange membranes wetted by aqueous electrolytes", Energy & Environmental Science, vol. 14, No. 9, 2021, pp. 4961-4978, doi: 10.1039/d1ee00482d.

Mac Dowell et al., "The role of CO2 capture and utilization in mitigating climate change", Nature Climate Change, vol. 7, Apr. 5, 2017, pp. 243-249, doi: 10.1038/nclimate3231.

Manoharan et al., "Acidity Constants in the Excited States: Absence of an Excited-State Prototropic Equilibrium for the Monocation-Neutral Pair of 2,3-Diaminonaphthalene", The Journal of Physical Chemistry, vol. 92, No. 18, Sep. 1, 1988, pp. 5282-5287, doi: 10.1021/j100329a043.

Manoharan et al., "Unusual spectral shifts in the prototropic reactions of 2,7-diaminofluorene", Canadian Journal of Chemistry, vol. 65, No. 9, Sep. 1987, pp. 2013-2018, doi: 10.1139/v87-334.

Marcus, "On the Theory of Oxidation-Reduction Reactions Involving Electron Transfer. I*", The Journal of Chemical Physics, vol. 24, No. 5, May 1956, pp. 966-978, doi: 10.1063/1.1742723.

Marcus, "Theoretical Relations among Rate Constants, Barriers, and Bransted Slopes of Chemical Reactions", The Journal of Physical Chemistry, vol. 72, No. 3, Mar. 1, 1968. pp. 891-899, doi: 10.1021/j100849a019.

Markewitz et al., "Worldwide innovations in the development of carbon capture technologies and the utilization of CO2", Energy & Environmental Science, vol. 5, No. 6, 2012, pp. 7281-7305, doi: 10.1039/c2ee03403d.

Martynov et al., "Proton Transfer Reactions in the Excited Electronic States of Aromatic Molecules", Russian Chemical Reviews, vol. 46, No. 1, Jan. 1977, pp. 1-15, doi: 10.1070/RC1977v046n01ABEH002116.

Miller et al., "Intramolecular Long-Distance Electron Transfer in Radical Anions. The Effects of Free Energy and Solvent on the Reaction Rates", Journal of the American Chemical Society, vol. 106, No. 10, May 1, 1984, pp. 3047-3049, doi: 10.1021/ja00322a058.

Millero, "The Marine Inorganic Carbon Cycle", Chemical Reviews, vol. 107, No. 2, Feb. 14, 2007, pp. 308-341, doi: 10.1021/cr0503557.

Mills et al., "The Kinetics of Isotopic Exchange between Carbon Dioxide, Bicarbonate Ion, Carbonate Ion and Water1", Journal of the American Chemical Society, vol. 62, No. 5, May 1940, pp. 1019-1026, doi: 10.1021/ja01862a010.

Mishra et al., "Excited State Prototropism of 6-Aminochrysene", Journal of Photochemistry, vol. 23, No. 2, 1983, pp. 163-169, doi: 10.1016/0047-2670(83)80058-6.

Mishra et al., "The Fluorescence Spectra of Dianions of $\alpha$- and $\beta$-Naphthylamines", Journal of Photochemistry, vol. 28, No. 1, Jan. 1985, pp. 87-91, doi: 10.1016/0047-2670(85)87018-0.

Mohammed et al., "Aqueous bimolecular proton transfer in acid-base neutralization", Chemical Physics, vol. 341, No. 1-3, Nov. 15, 2007, pp. 240-257, doi: 10.1016/j.chemphys.2007.06.040.

Monteiro et al., "Measuring local pH in electrochemistry", Current Opinion in Electrochemistry, vol. 25, Article 100649, Feb. 2021, 9 pgs., doi: 10.1016/j.coelec.2020.100649.

Moradzaman et al., "Effect of partial pressure on product selectivity in Cu-catalyzed electrochemical reduction of CO2", Sustainable Energy & Fuels, vol. 4, No. 10, 2020, pp. 5195-5202, doi: 10.1039/d0se00865f.

Munitz et al., "Cation-Enhanced Deprotonation of Water by a Strong Photobase", Israel Journal of Chemistry, vol. 49, No. 2, Jul. 2009, pp. 261-272, doi: 10.1560/IJC.49.2.261.

Nayak et al., "Solvatochromism and prototropism in methyl 6-aminonicotinate: failure to observe amine-imine phototautomerism in solvents", Journal of Molecular Structure, vol. 702, No. 1-3, Sep. 27, 2004, pp. 85-94, doi: 10.1016/j.molstruc.2004.06.014.

Nayaki et al., "Excited state solvatochromic and prototropic behaviour of 4-aminodiphenylamine and 4,4'-diaminodiphenylamine—A comparative study by electronic spectra", Spectrochimica Acta Part A: Molecular and Biomolecular Spectroscopy, vol. 64, No. 3, Jun. 2006, pp. 631-636, doi: 10.1016/j.saa.2005.07.066.

Needham, "The Solubility of Amino Acids in Various Solvent Systems", Open Access Dissertations, Thesis, 1970, 95 pgs., doi: 10.23860/diss-needham-thomas-1970.

Nesbitt et al., "Operando Topography and Mechanical Property Mapping of CO2 Reduction Gas-Diffusion Electrodes Operating at High Current Densities", Journal of The Electrochemical Society, vol. 168, No. 4, Article 044505, Apr. 7, 2021, 9 pgs., doi: 10.1149/1945-7111/abf183.

Nesbitt et al., "Water and Solute Activities Regulate CO2 Reduction in Gas-Diffusion Electrodes", The Journal of Physical Chemistry C, vol. 125, No. 24, May 25, 2021, pp. 13085-13095, doi: 10.1021/acs.jpcc.1c01923.

Nguyen et al., "Gas diffusion electrode design for electrochemical carbon dioxide reduction", Chemical Society Reviews, vol. 49, No. 21, Oct. 5, 2020, pp. 7488-7504, doi: 10.1039/DOCS00230E.

(56)         References Cited

OTHER PUBLICATIONS

Nitopi et al., "Progress and Perspectives of Electrochemical CO2 Reduction on Copper in Aqueous Electrolyte", Chemical Reviews, vol. 119, No. 12, May 22, 2019, pp. 7610-7672, doi: 10.1021/acs.chemrev.8b00705.

Orr Jr., "Onshore Geologic Storage of CO2", Science, vol. 325, No. 5948, Sep. 25, 2009, pp. 1656-1658, doi: 10.1126/science.1175677.

Pande et al., "Electrochemically Induced pH Change: Time-Resolved Confocal Fluorescence Microscopy Measurements and Comparison with Numerical Model", Journal of Physical Chemistry Letters, vol. 11, No. 17, Jul. 28, 2020, pp. 7042-7048, doi: 10.1021/acs.jpclett.0c01575.

Pang et al., "Framework for evaluating the performance limits of membraneless electrolyzers", Energy & Environmental Science, vol. 13, No. 10, 2020, pp. 3663-3678, doi: 10.1039/DOEE02268C.

Park et al., "Synthetic ratiometric fluorescent probes for detection of ions", Chemical Society Reviews, vol. 49, No. 1, 2020, pp. 143-179, doi: 10.1039/c9cs00243j.

Peters et al., "Carbon dioxide emissions continue to grow amidst slowly emerging climate policies", Nature Climate Change, vol. 10, 2020, pp. 3-6, doi: 10.1038/s41558-019-0659-6.

Pinaud et al., "Technical and economic feasibility of centralized facilities for solar hydrogen production via photocatalysis and photoelectrochemistry", Energy & Environmental Science, vol. 6, No. 7, 2013, pp. 1983-2002, doi: 10.1039/C3EE40831K.

Pines et al., "Direct measurement of intrinsic proton transfer rates in diffusion-controlled reactions", Chemical Physics Letters, vol. 281, No. 4-6, Dec. 26, 1997, pp. 413-420, doi: 10.1016/S0009-2614(97)01245-1.

Pines et al., "How Acidic is Carbonic Acid?", Journal of Physical Chemistry B, vol. 120, No. 9, Feb. 10, 2016, pp. 2440-2451, doi: 10.1021/acs.jpcb.5b12428.

Pines et al., "Proton Transfer in Mixed Water-Organic Solvent Solutions: Correlation between Rate, Equilibrium Constant, and the Proton Free Energy of Transfer", Journal of Physical Chemistry, vol. 95, No. 25, 1991, pp. 10448-10457, doi: 10.1021/j100178a036.

Pines et al., "Solvent Assisted Photoacidity", Hydrogen-Transfer Reactions, vol. 1, Jul. 17, 2007, pp. 377-415, doi: 10.1002/9783527611546.ch12.

Premont-Schwarz et al., "Ultrafast Excited-State Proton-Transfer Reaction of 1-Naphthol-3,6-Disulfonate and Several 5-Substituted 1-Naphthol Derivatives", The Journal of Physical Chemistry B, vol. 117, No. 16, Jan. 10, 2013, pp. 4594-4603, doi: 10.1021/jp308746x.

Presiado et al., "Ultrafast Proton Transfer of Three Novel Quinone Cyanine Photoacids", Journal of Physical Chemistry A, vol. 116, No. 27, Jun. 6, 2012, pp. 7353-7363, doi: 10.1021/jp304123y.

Rabinowitz et al., "The future of low-temperature carbon dioxide electrolysis depends on solving one basic problem", Nature Communications, vol. 11, Article 5231, Oct. 16, 2020, 3 pgs., doi: 10.1038/s41467-020-19135-8.

Rajendiran et al., "Unusual Spectral Shifts of Bis(4-aminophenyl)ether", Bulletin of the Chemical Society of Japan, vol. 69, No. 9, Sep. 1996, pp. 2447-2452, doi: 10.1246/bcsj.69.2447.

Rehm et al., "Kinetics of Fluorescence Quenching by Electron and H-Atom Transfer", Israel Journal of Chemistry, vol. 8, No. 2, 1970, pp. 259-271, doi: 10.1002/ijch.197000029.

Renfrew et al., "Electrochemical Approaches toward CO2 Capture and Concentration", ACS Catalysis, vol. 10, No. 21, 2020, pp. 13058-13074, doi: 10.1021/acscatal.0c03639.

Resasco et al., "Promoter effects of alkali metal cations on the electrochemical reduction of carbon dioxide", Journal of the American Chemical Society, vol. 139, No. 32, Jul. 24, 2017, pp. 11277-11287, doi: 10.1021/jacs.7b06765.

Ringe et al., "Understanding Cation Effects in Electrochemical CO2 Reduction", Energy & Environmental Science, vol. 12, No. 10, 2019, pp. 3001-3014, doi: 10.1039/c9ee01341e.

Robinson, "The Diffusion Coefficients of Dye Solutions and their Interpretation", Proceedings of the Royal Society of London. Series A, Mathematical and Physical Sciences, vol. 148, No. 865, Feb. 15, 1935, pp. 681-695, doi: 10.1098/rspa.1935.0041.

Roh et al., "Photoelectrochemical CO2 Reduction toward Multicarbon Products with Silicon Nanowire Photocathodes Interfaced with Copper Nanoparticles", Journal of the American Chemical Society, vol. 144, No. 18, Apr. 27, 2022, pp. 8002-8006, doi: 10.1021/jacs.2c03702.

Rudd et al., "Fluorescence Confocal Laser Scanning Microscopy as a Probe of pH Gradients in Electrode Reactions and Surface Activity", Analytical Chemistry, vol. 77, No. 19, Aug. 25, 2005, pp. 6205-6217, doi: 10.1021/ac050800y.

Saha et al., "Photoluminescence of 2-aminofluorene: a relook", Journal of Molecular Structure, vol. 470, No. 3, Oct. 27, 1998, pp. 301-311, doi: 10.1016/S0022-2860(98)00375-5.

Santra et al., "Prototropism of the methylated derivatives of 2-(2'-aminophenyl) benzimidazole", Journal of Luminescence, vol. 81, No. 4, Jun. 1999, pp. 249-262, doi: 10.1016/S0022-2313(99)00009-5.

Sanz-Perez et al., "Direct Capture of CO2 from Ambient Air", Chemical Reviews, vol. 116, No. 19, Aug. 25, 2016, pp. 11840-11876, doi: 10.1021/acs.chemrev.6b00173.

Sarpal et al., "Prototropism in Aminophenols and Anisidines: A Reinvestigation", Journal of Photochemistry, vol. 38, Jun. 1987, pp. 263-276, doi: 10.1016/0047-2670(87)87022-3.

Sassenburg et al., "Characterizing CO2 Reduction Catalysts on Gas Diffusion Electrodes: Comparing Activity, Selectivity, and Stability of Transition Metal Catalysts", ACS Applied Energy Materials, vol. 5, No. 5, May 3, 2022, pp. 5983-5994, doi: 10.1021/acsaem.2c00160.

Schulman et al., "Excited State Prototropism and Solvent Dependence of the Fluorescence of 3-Aminoquinoline", Analytica Chimica Acta, vol. 58, No. 1, Jan. 1972, pp. 91-99, doi: 10.1016/S0003-2670(00)86857-9.

Schulz et al., "Determination of the rate constants for the carbon dioxide to bicarbonate inter-conversion in pH-buffered seawater systems", Marine Chemistry, vol. 100, No. 1-2, Jun. 1, 2006, pp. 53-65, doi: 10.1016/j.marchem.2005.11.001.

Seliskar et al., "Electronic Spectra of 2-Aminonaphthalene-6-sulfonate and Related Molecules. I. General Properties and Excited-State Reactions", Journal of the American Chemical Society, vol. 93, No. 21, Oct. 20, 1971, pp. 5405-5414, doi: 10.1021/ja00750a016.

Sepulveda et al., "The Role of Firm Low-Carbon Electricity Resources in Deep Decarbonization of Power Generation", Joule, vol. 2, No. 11, Oct. 17, 2018, pp. 2403-2420, doi: 10.1016/j.joule.2018.08.006.

Shafaat et al., "Photoactivation of an Acid-Sensitive Ion Channel Associated with Vision and Pain", ChemBioChem Communication, vol. 17, No. 14, Jul. 15, 2016, pp. 1323-1327, doi: 10.1002/cbic.201600230.

Sharifian et al., "Electrochemical carbon dioxide capture to close the carbon cycle", Energy & Environmental Science, vol. 14, No. 2, 2021, pp. 781-814, doi: 10.1039/DOEE03382K.

Sharrett et al., "Exploring the use of APTS as a fluorescent reporter dye for continuous glucose sensing", Organic and Biomolecular Chemistry, vol. 7, No. 7, 2009, pp. 1461-1470, doi: 10.1039/B821934F.

Sheng et al., "Correlating hydrogen oxidation and evolution activity on platinum at different pH with measured hydrogen binding energy", Nature Communications, vol. 6, Article 5848, Jan. 8, 2015, pp. 1-6, doi: 10.1038/ncomms6848.

Shizuka, "Excited-State Proton-Transfer Reactions and Proton-Induced Quenching of Aromatic Compounds", Accounts of Chemical Research, vol. 18, No. 5, May 1, 1985, pp. 141-147, doi: 10.1021/ar00113a003.

Shu et al., "Electrochemical Regeneration of Spent Alkaline Absorbent from Direct Air Capture", Environmental Science & Technology, vol. 54, No. 14, Jun. 25, 2020, pp. 8990-8998, doi: 10.1021/acs.est.0c01977.

Simkovitch et al., "How Fast Can a Proton-Transfer Reaction Be beyond the Solvent Control Limit?", Journal of Physical Chemistry B, vol. 119, No. 6, Jul. 31, 2014, pp. 2253-2262, doi: 10.1021/jp506011e.

Singh et al., "Effects of electrolyte, catalyst, and membrane composition and operating conditions on the performance of solar-

(56) References Cited

OTHER PUBLICATIONS driven electrochemical reduction of carbon dioxide", Physical Chemistry Chemical Physics, vol. 17, No. 29, 2015, pp. 18924-18936, doi: 10.1039/c5cp03283k.

Singh et al., "Hydrolysis of Electrolyte Cations Enhances the Electrochemical Reduction of CO2 over Ag and Cu", Journal of the American Chemical Society, vol. 138, No. 39, Sep. 14, 2016, pp. 13006-13012, doi: 10.1021/jacs.6b07612.

Sinha et al., "Excited-State and Ground-State Proton-Transfer Reactions in 5-Aminoindole", Bulletin of the Chemical Society of Japan, vol. 60, No. 12, Dec. 1987, pp. 4401-4407, doi: 10.1246/bcsj.60. 4401.

Siva Kumar et al., "Photophysical behaviour of 2,6-diaminoanthraquinone in different solvents and at various pH", Spectrochimica Acta Part A: Molecular and Biomolecular Spectroscopy, vol. 68, No. 3, Nov. 2007, pp. 651-655, doi: 10.1016/j.saa. 2006.12.042.

Sivakumar et al., "Photophysical Study of 1,5 -Diaminoanthraquinone in Different Solvents and at Various pH", E-Journal of Chemistry, vol. 4, No. 4, Oct. 2007, pp. 523-530, doi: 10.1155/2007/282979.

Smith et al., "Pathways to Industrial-Scale Fuel Out of Thin Air from CO2 Electrolysis", Joule, vol. 3, No. 8, Aug. 21, 2019, pp. 1822-1834, doi: 10.1016/j.joule.2019.07.009.

Solntsev et al., "Photochemistry of "Super"-Photoacids. Solvent Effects", Journal of Physical Chemistry A, vol. 103, No. 35, Aug. 13, 1999, pp. 6984-6997, doi: 10.1021/jp9902295.

Solntsev et al., "Protolytic Photodissociation and Proton-Induced Quenching of 1-Naphthol and 2-Octadecyl-1-Naphthol in Micelles", The Journal of Physical Chemistry A, vol. 108, No. 40, Sep. 10, 2004, pp. 8212-8222, doi: 10.1021/jp040201f.

Spurgeon et al., "A comparative technoeconomic analysis of pathways for commercial electrochemical CO2 reduction to liquid products", Energy & Environmental Science, vol. 11, No. 6, 2013, pp. 1536-1551, doi: 10.1039/C8EE00097B.

Srivastava et al., "Excited-State Prototropism in 2-Amino-3-Naphthoic Acid and its Ester", Journal of Photochemistry and Photobiology A: Chemistry, vol. 46, No. 3, Mar. 1989, pp. 329-345, doi: 10.1016/1010-6030(89)87050-9.

Stewart et al., "Accelerating slow excited state proton transfer", The Proceedings of the National Academy of Sciences (PNAS), vol. 110, No. 3, Dec. 31, 2012, pp. 876-880, doi: 10.1073/pnas. 1220742110.

Strathmann, "Electrodialysis, a mature technology with a multitude of new applications", Desalination, vol. 264, No. 3, Dec. 31, 2010, pp. 268-288, doi: 10.1016/j.desal.2010.04.069.

Suter et al., "Optimizing Mesostructured Silver Catalysts for Selective Carbon Dioxide Conversion into Fuels", Energy & Environmental Science, vol. 12, No. 5, 2019, pp. 1668-1678, doi: 10.1039/C9EE00656G.

Swaminathan et al., "A Study of the Nuclear Conformation and the Proton Transfer Reaction of 3,5-Diphenylpyrazole in the Excited State", Journal of Photochemistry, vol. 21, No. 2, 1983, pp. 245-250, doi: 10.1016/0047-2670(83)80028-8.

Swaminathan et al., "Solvent and pH dependence of fluorescence spectra of 9-phenanthrylamine", Canadian Journal of Chemistry, vol. 61, No. 6, Jun. 1983, pp. 1064-1066, doi: 10.1139/v83-186.

Talabi et al., "Membraneless electrolyzers for the simultaneous production of acid and base", Chemical Communications, vol. 53, No. 57, 2017, pp. 8006-8009, doi: 10.1039/c7cc02361h.

Tanhua et al., "A vision for FAIR ocean data products", Communications Earth & Environment, vol. 2, No. 1, Article 136, 2021, 4 pgs., doi: 10.1038/s43247-021-00209-4.

Thiemann et al., "Nitric Acid, Nitrous Acid, and Nitrogen Oxides", Ullmann's Encyclopedia of Industrial Chemistry, vol. 24, Jun. 15, 2000, pp. 177-255, doi: 10.1002/14356007.a17_293.

Turro et al., "Proton Transfer Quenching of the MLCT Excited State of Ru(phen)2dppz2+ in Homogeneous Solution and Bound to DNA", Journal of the American Chemical Society, vol. 117, No. 35, Sep. 1, 1995, pp. 9026-9032, doi: 10.1021/ja00140a020.

Varela et al., "Controlling the selectivity of CO2 electroreduction on copper: The effect of the electrolyte concentration and the importance of the local pH", Catalysis Today, vol. 260, Feb. 1, 2016, pp. 8-13, doi: 10.1016/j.cattod.2015.06.009.

Vitt et al., "Imaging of Oxygen Evolution and Oxide Formation Using Quinine Fluorescence", Analytical Chemistry, vol. 69, No. 6, Mar. 15, 1997, pp. 1070-1076, doi: 10.1021/ac960816b.

Voss et al., "The Effect of Temperature on the Cation-Promoted Electrochemical CO2 Reduction on Gold", ChemElectroChem, vol. 9, No. 13, Article e202200239, Jul. 14, 2022, 11 pgs., doi: 10.1002/celc.202200239.

Wan et al., "Photohydration of Aromatic Alkenes. Catalytic Phenomena and Structure-Reactivity Studies", The Journal of Organic Chemistry, vol. 48, No. 6, Mar. 1, 1983, pp. 869-876, doi: 10.1021/jo00154a024.

Wang et al., "A Review of Post-combustion CO2 Capture Technologies from Coal-fired Power Plants", Energy Procedia, vol. 114, Jul. 2017, pp. 650-665, doi: 10.1016/j.egypro.2017.03.1209.

Wang et al., "Comprehensive Study of the Hydration and Dehydration Reactions of Carbon Dioxide in Aqueous Solution", The Journal of Physical Chemistry A, vol. 114, No. 4, 2010, pp. 1734-1740, doi: 10.1021/jp909019u.

Wang et al., "Electrochemical Carbon Monoxide Reduction on Polycrystalline Copper: Effects of Potential, Pressure, and pH on Selectivity toward Multicarbon and Oxygenated Products", ACS Catalysis, vol. 8, No. 8, Jul. 18, 2018, pp. 7445-7454, doi: 10.1021/acscatal.8b01200.

Wang et al., "Electrochemical Reduction of CO2 to Alcohols: Current Understanding, Progress, and Challenges", Advanced Energy and Sustainability Research, vol. 3, No. 1, Article 2100131, Jan. 2022, 11 pgs., doi: 10.1002/aesr.202100131.

Wang et al., "Light-Driven Active Proton Transport through Photoacid-and Photobase-Doped Janus Graphene Oxide Membranes", Advanced Materials, vol. 31, No. 36, Article 1903029, Sep. 6, 2019, 8 pgs., doi: 10.1002/adma.201903029.

Wang et al., "Post-combustion CO2 capture with chemical absorption: A state-of-the-art review", Chemical Engineering Research and Design, vol. 89, No. 9, Sep. 2011, pp. 1609-1624, doi: 10.1016/j.cherd.2010.11.005.

Webb et al., "Picosecond Kinetics of the Excited-State, Proton-Transfer Reaction of 1-Naphthol in Water", The Journal of Physical Chemistry, vol. 90, No. 21, Oct. 1, 1986, pp. 5154-5164, doi: 10.1021/j100412a053.

Weekes et al., "Electrolytic CO2 Reduction in a Flow Cell", Accounts of Chemical Research, vol. 51, No. 4, Mar. 23, 2018, pp. 910-918, doi: 10.1021/acs.accounts.8b00010.

Welch et al., "Nanoporous Gold as a Highly Selective and Active Carbon Dioxide Reduction Catalyst", ACS Applied Energy Materials, vol. 2, No. 1, 2019, pp. 164-170, doi: 10.1021/acsaem. 8b01570.

Welch et al., "Operando Local pH Measurement within Gas Diffusion Electrodes Performing Electrochemical Carbon Dioxide Reduction", The Journal of Physical Chemistry C, vol. 125, No. 38, Sep. 17, 2021, pp. 20896-20904, doi: 10.1021/acs.jpcc. 1c06265.

Weller, "Fast Reaction of Excited Molecules", Chapter 7, Progress in Reaction Kinetics, vol. 1, 1961, 31 pgs.

Weng, "Towards membrane-electrode assembly systems for CO2 reduction: a modeling study", Energy & Environmental Science, vol. 12, No. 6, 2019, pp. 1950-1968, doi: 10.1039/c9ee00909d.

Weng et al., "A systematic analysis of Cu-based membrane-electrode assemblies for CO2 reduction through multiphysics simulation", Energy & Environmental Science, vol. 13, No. 10, Sep. 2, 2020, pp. 3592-3606, doi: 10.1039/DOEE01604G.

White et al., "Conversion of Visible Light into Ionic Power Using Photoacid- Dye-Sensitized Bipolar Ion-Exchange Membranes", Joule, vol. 2, No. 1, Jan. 17, 2018, pp. 94-109, doi: 10.1016/j.joule.2017. 10.015.

White et al., "Observation of Photovoltaic Action from Photoacid-Modified Nafion Due to Light-Driven Ion Transport", Journal of the American Chemical Society, vol. 139, No. 34, Apr. 17, 2017, pp. 11726-11733, doi: 10.1021/jacs.7b00974.

(56)        References Cited

OTHER PUBLICATIONS

Wiebe et al., "Hydrogen pump for hydrogen recirculation in fuel cell vehicles", E3S Web of Conferences, vol. 155, Article 01001, 2020, 11 pgs., doi: 10.1051/e3sconf/202015501001.

Willauer et al., "Development of an Electrochemical Acidification Cell for the Recovery of CO2 and H2 from Seawater", Industrial & Engineering Chemistry Research, vol. 50, No. 17, 2011, pp. 9876-9882, doi: 10.1021/ie2008136.

Willauer et al., "Development of an Electrochemical Acidification Cell for the Recovery of CO2 and H2 from Seawater II. Evaluation of the Cell by Natural Seawater", Industrial & Engineering Chemistry Research, vol. 51, No. 34, Aug. 2, 2012, pp. 11254-11260, doi: 10.1021/ie301006y.

Willauer et al., "Feasibility of CO2 Extraction from Seawater and Simultaneous Hydrogen Gas Generation Using a Novel and Robust Electrolytic Cation Exchange Module Based on Continuous Electrodeionization Technology", Industrial & Engineering Chemistry Research, vol. 53, No. 31, Jul. 11, 2014, pp. 12192-12200, doi: 10.1021/ie502128x.

Williams et al., "Carbon-Neutral Pathways for the United States", AGU Advances, vol. 2, No. 1, Article e2020AV000284, Mar. 2021, pp. 1-25, doi: 10.1029/2020AV000284.

Williams et al., "Protecting effect of mass transport during electrochemical reduction of oxygenated carbon dioxide feedstocks", Sustainable Energy Fuels, vol. 3, No. 5, Mar. 11, 2019, pp. 1225-1232, doi: 10.1039/c9se00024k.

Wuttig et al., "Bicarbonate is not a General Acid in Au-Catalyzed CO2 Electroreduction", Journal of the American Chemical Society, vol. 139, No. 47, Oct. 5, 2017, pp. 17109-17113, doi: 10.1021/jacs.7b08345.

Xie et al., "Photocurrent generation based on a light-driven proton pump in an artificial liquid membrane", Nature Chemistry, vol. 6, No. 3, Feb. 2, 2014, pp. 202-207, doi: 10.1038/nchem.1858.

Yan et al., "An Electrochemical Hydrogen-Looping System for Low-Cost CO2 Capture from Seawater", ACS Energy Letters, vol. 7, No. 6, May 11, 2022, pp. 1947-1952, doi: 10.1021/acsenergylett.2c00396.

Yang et al., "In Situ Infrared Spectroscopy Reveals Persistent Alkalinity near Electrode Surfaces during CO2 Electroreduction", Journal of the American Chemical Society, vol. 141, No. 40, Sep. 15, 2019, pp. 15891-15900, doi: 10.1021/jacs.9b07000.

Yates, "Application of Marcus Theory to Photochemical Proton-Transfer Reactions. 1. An Exploratory Study of Empirical Modifications of the Basic Equations", Journal of the American Chemical Society, vol. 108, No. 21, Oct. 1, 1986, pp. 6511-6517, doi: 10.1021/ja00281a011.

Zhang et al., "pH Matters When Reducing CO2 in an Electrochemical Flow Cell", ACS Energy Letters, vol. 5, No. 10, Sep. 4, 2020, pp. 3101-3107, doi: 10.1021/acsenergylett.0c01606.

Zhao et al., "Integrated design for electrocatalytic carbon dioxide reduction", Catalysis Science & Technology, vol. 10, No. 9, 2020, pp. 2711-2720, doi: 10.1039/D0CY00453G.

Zheng et al., "Universal dependence of hydrogen oxidation and evolution reaction activity of platinum-group metals on pH and hydrogen binding energy", Science Advances, vol. 2, No. 3, Article e1501602, Mar. 18, 2016, pp. 1-8, doi: 10.1126/sciadv.1501602.

Zhu et al., "Continuous carbon capture in an electrochemical solid-electrolyte reactor", Nature, vol. 618, Jun. 29, 2023, pp. 959-966, doi: 10.1038/s41586-023-06060-1.

Zivic et al., "Recent Advances and Challenges in the Design of Organic Photoacid and Photobase Generators for Polymerizations", Angewandte Chemie International Edition, vol. 58, No. 31, Jul. 29, 2019, pp. 10410-10422, doi: 10.1002/anie.201810118.

Extended European Search Report for European Application No. 21890266.6, Search completed Aug. 13, 2024, Mailed Sep. 11, 2024, 27 pgs.

Extended European Search Report for European Application No. 22871032.3, Search completed May 20, 2025, Mailed Jun. 4, 2025, 9 pgs.

International Preliminary Report on Patentability for International Application No. PCT/US2022/080858, Report issued May 27, 2025, Mailed Jun. 12, 2025, 6 pgs.

International Preliminary Report on Patentability for International Application No. PCT/US2021/058558, Report issued May 8, 2023, Mailed on May 19, 2023, 7 pgs.

International Preliminary Report on Patentability for International Application No. PCT/US2022/076738, Report issued Mar. 26, 2024, Mailed on Apr. 4, 2024, 6 pgs.

International Preliminary Report on Patentability for International Application No. PCT/US2023/069297, Report issued Dec. 18, 2024, Mailed Jan. 9, 2025, 6 pgs.

International Search Report and Written Opinion for International Application No. PCT/US2023/069297, Search completed Oct. 16, 2023, Mailed Oct. 17, 2023, 9 pgs.

International Search Report and Written Opinion for International Application No. PCT/US2021/058558, Search completed Jan. 4, 2022, Mailed Feb. 4, 2022, 8 pgs.

International Search Report and Written Opinion for International Application No. PCT/US2022/076738, Search completed Feb. 13, 2023, Mailed Feb. 14, 2023, 10 pgs.

International Search Report and Written Opinion for International Application No. PCT/US2022/080858, Search completed Aug. 24, 2023, Mailed Aug. 25, 2023, 8 pgs.

Adachi et al., "Photoactivatable HNO-releasing compounds using the retro-Diels-Alder reaction", Chemical Communications, vol. 41, 2008, pp. 5149-5151, doi: 10.1039/b811985f.

Adamczyk et al., "Real-Time Observation of Carbonic Acid Formation in Aqueous Solution", Science, vol. 326, No. 5960, Dec. 18, 2009, pp. 1690-1694, doi: 10.1126/science.1180060.

Alcaraz et al., "Ion selectivity and water dissociation in polymer bipolar membranes studied by membrane potential and current-voltage measurements" Polymer, vol. 41, No. 17, Aug. 2000, pp. 6627-6634, doi: 10.1016/S0032-3861(99)00886-1.

Al-Dhubhani et al., "Entanglement-Enhanced Water Dissociation in Bipolar Membranes with 3D Electrospun Junction and Polymeric Catalyst", ACS Applied Energy Materials, vol. 4, No. 4, Mar. 16, 2021, pp. 3724-3736, doi: 10.1021/acsaem.1c00151.

Alfonso et al., "Absence of giant dielectric permittivity in graphene oxide materials", Journal of Physics: Materials, vol. 2, No. 4, Article 045002, Jul. 22, 2019, 11 pgs., doi: 10.1088/2515-7639/ab2666.

Andrei et al., "Enhanced Oil Recovery with CO2 Capture and Sequestration", World Energy Congress, 2010, 20 pgs.

Aritomi et al., "Current-voltage curve of a bipolar membrane at high current density", Desalination, vol. 104, No. 1-2, Apr. 1996, pp. 13-18, doi: 10.1016/0011-9164(96)00021-5.

Arnaut et al., "Excited-state proton transfer reactions I. Fundamentals and intermolecular reactions", Journal of Photochemistry and Photobiology A: Chemistry, vol. 75, No. 1, Oct. 15, 1993, pp. 1-20, doi: 10.1016/1010-6030(93)80157-5.

Atherton et al., "Establishing cleavage conditions for an anthracene chiral auxiliary using a photochemical retro Diels-Alder reaction", Tetrahedron Letters, vol. 43, No. 50, Dec. 9, 2002, pp. 9097-9100, doi: 10.1016/s0040-4039(02)02255-4.

Bazhenov et al., "Gas-Liquid Hollow Fiber Membrane Contactors for Different Applications", Fibers, vol. 6, No. 4, Article 76, Oct. 10, 2018, 41 pgs., doi: 10.3390/fib6040076.

Beh et al., "A Redox-Shuttled Electrochemical Method for Energy-Efficient Separation of Salt from Water", ACS Sustainable Chemistry & Engineering, vol. 7, No. 15, Jul. 11, 2019, pp. 13411-13417, doi: 10.1021/acssuschemeng.9b02720.

Bennett et al., "Carbon capture powered by solar energy", Energy Procedia, vol. 114, Jul. 2017, pp. 1-6. doi: 10.1016/j.egypro.2017.03.1139.

Blommaert et al., "Electrochemical impedance spectroscopy as a performance indicator for water dissociation in bipolar membranes", Journal of Materials Chemistry A, vol. 7, No. 32, 2019, pp. 19060-19069, doi: 10.1039/C9TA04592A.

Blommaert et al., "Insights and Challenges for Applying Bipolar Membranes in Advanced Electrochemical Energy Systems", ACS Energy Letters, vol. 6, No. 7, Jun. 23, 2021, pp. 2539-2548, doi: 10.1021/acsenergylett.1c00618.

(56)　　　　　References Cited

OTHER PUBLICATIONS

Boot-Handford et al., "Carbon capture and storage update", Energy & Environmental Science, vol. 7, No. 1, 2014, pp. 130-189, doi: 10.1039/c3ee42350f.

Bronsted et al., "Die katalytische Zersetzung des Nitramids und ihre physikalisch-chemische Bedeutung", Zeitschrift für Physikalische Chemie, vol. 108U, No. 1, 1964, pp. 185-235, doi: 10.1515/zpch-1924-10814.

Bui et al., "Continuum Modeling of Porous Electrodes for Electro-chemical Synthesis", Chemical Reviews, vol. 122, No. 12, May 4, 2022, pp. 11022-11084, doi: 10.1021/acs.chemrev.1c00901.

Bui et al., "On the Nature of Field-Enhanced Water Dissociation in Bipolar Membranes", The Journal of Physical Chemistry C, vol. 125, No. 45, Nov. 9, 2021, pp. 24974-24987, doi: 10.1021/acs.jpcc. 1c08276.

Bui et al., "Understanding Multi-Ion Transport Mechanisms in Bipolar Membranes", ACS Applied Materials & Interfaces, vol. 12, No. 47, Nov. 10, 2020, pp. 52509-52526, doi: 10.1021/acsami. 0c12686.

Chakraborty et al., "Formation and Aggregation of Polymorphs in Continuous Precipitation. 2. Kinetics of CaCO3 Precipitation", Industrial & Engineering Chemistry Research, vol. 35, No. 6, Jun. 6, 1996, pp. 1995-2006, doi: 10.1021/ie9504011.

Chen et al., "High-Performance Bipolar Membrane Development for Improved Water Dissociation", ACS Applied Polymer Materials, vol. 2, No. 11, Aug. 19, 2020, pp. 4559-4569, doi: 10.1021/acsapm. 0c00653.

Choi et al., "Thermodynamics and Proton Transport in Nafion II. Proton Diffusion Mechanisms and Conductivity", Journal of the Electrochemical Society, vol. 152, No. 3, Feb. 7, 2005, pp. E123-E130, doi: 10.1149/1.1859814.

Chu, "Carbon Capture and Sequestration", Science, vol. 325, No. 5948, Sep. 25, 2009, p. 1599, doi: 10.1126/science.1181637.

Craig, "Electrochemical Behavior of Bipolar Membranes", UC Berkeley Electronic Theses and Dissertations, 2013, 116 pgs.

Crothers et al., "Theory of Multicomponent Phenomena in Cation-Exchange Membranes: Part II. Transport Model and Validation", Journal of the Electrochemical Society, vol. 167, No. 1, Article No. 013548, Feb. 7, 2020, 12 pgs., doi: 10.1149/1945-7111/ab6724.

Datta et al., "Electrochemical CO2 Capture Using Resin-Wafer Electrodeionization", Industrial & Engineering Chemistry Research, vol. 52, No. 43, Oct. 8, 2013, pp. 15177-15186, doi: 10.1021/ie402538d.

De Groot et al., "Crystal Form of Precipitated Calcium Carbonate as influenced by Adsorbed Magnesium Ions", Nature, vol. 212, No. 5058, Oct. 8, 1966, pp. 183-184, doi: 10.1038/212183a0.

De Lannoy et al., "Indirect ocean capture of atmospheric CO2: Part I. Prototype of a negative emissions technology", International Journal of Greenhouse Gas Control, vol. 70, Mar. 2018, pp. 243-253, doi: 10.1016/j.ijggc.2017.10.007.

Desai et al., "Electrochemical Desalination of Seawater and Hypersaline Brines with Coupled Electricity Storage", ACS Energy Letters, vol. 3, No. 2, Dec. 18, 2017, pp. 375-379, doi: 10.1021/acsenergylett. 7b01220.

Digdaya et al., "A direct coupled electrochemical system for capture and conversion of CO2 from oceanwater", Nature Communications, vol. 11, No. 1, Article 4412, Sep. 4, 2020, 10 pgs., doi: 10.1038/s41467-020-18232-y.

Eigen, "Proton Transfer, Acid-Base Catalysis, and Enzymatic Hydro-lysis. Part I: Elementary Processes", Angewandte Chemie Interna-tional Edition in English, vol. 3, No. 1, Jan. 1964, pp. 1-19, doi: 10.1002/anie.196400011.

Eisaman et al., "CO2 extraction from seawater using bipolar mem-brane electrodialysis", Energy & Environmental Science, vol. 5, No. 6, 2012, pp. 7346-7352, doi: 10.1039/c2ee03393c.

Eisaman et al., "Indirect ocean capture of atmospheric CO2: Part II. Understanding the cost of negative emissions", International Jour-nal of Greenhouse Gas Control, vol. 70, Mar. 2018, pp. 254-261, doi: 10.1016/j.ijggc.2018.02.020.

Fasihi et al., "Techno-economic assessment of CO2 direct air capture plants", Journal of Cleaner Production, vol. 224, Jul. 1, 2019, pp. 957-980, doi: 10.1016/j.jclepro.2019.03.086.

Fernandes et al., "Protonation constants and thermodynamic prop-erties of amines for post combustion capture of CO2", The Journal of Chemical Thermodynamics, vol. 51, Aug. 2012, pp. 97-102, doi: 10.1016/j.jct.2012.02.031.

Friedlingstein et al., "Long-term climate implications of twenty-first century options for carbon dioxide emission mitigation", Nature Climate Change, vol. 1, No. 9, Dec. 2011, pp. 457-461, doi: 10.1038/nclimate1302.

Ge et al., "High-performance bipolar membrane for electrochemical water electrolysis", Journal of Membrane Science, vol. 656, Article No. 120660, Aug. 15, 2022, pp. 1-11, doi: 10.1016/j.memsci.2022. 120660.

Giesbrecht et al., "Recent Advances in Bipolar Membrane Design and Applications", Chemistry of Materials, vol. 32, No. 19, Sep. 8, 2020, pp. 8060-8090, doi: 10.1021/acs.chemmater.0c02829.

Grew et al., "A Dusty Fluid Model for Predicting Hydroxyl Anion Conductivity in Alkaline Anion Exchange Membranes", Journal of the Electrochemical Society, vol. 157, No. 3, Jan. 4, 2010, B327-B337, doi: 10.1149/1.3273200.

Grew et al., "Understanding Transport at the Acid-Alkaline Inter-face of Bipolar Membranes", Journal of the Electrochemical Soci-ety, vol. 163, No. 14, 2016, pp. F1572-F1587, doi: 10.1149/2. 0941614jes.

Halvagar et al., "Small Molecule Models: Cu, Ni, Co", Compre-hensive Inorganic Chemistry II, Second Edition, 2016, pp. 455-486, doi: 10.1016/B978-0-08-097774-4.00321-1.

Haszeldine, "Carbon Capture and Storage: How Green Can Black Be?", Science, vol. 325, No. 5948, Sep. 25, 2009, pp. 1647-1652, doi: 10.1126/science.1172246.

Hohenadel et al., "Electrochemical Characterization of Hydrocar-bon Bipolar Membranes with Varying Junction Morphology", ACS Applied Energy Materials, vol. 2, No. 9, Aug. 23, 2019, pp. 6817-6824, doi: 10.1021/acsaem.9b01257.

Hohenadel et al., "Spectroelectrochemical Detection of Water Dis-sociation in Bipolar Membranes", ACS Applied Materials & Inter-faces, vol. 13, No. 38, Sep. 20, 2021, pp. 46125-46133, doi: 10.1021/acsami.1c12544.

House et al., "Economic and energetic analysis of capturing CO2 from ambient air", Proceedings of the National Academy of Sci-ences, vol. 108, No. 51, Dec. 20, 2011, pp. 20428-20433, doi: 10.1073/pnas.1012253108.

Iliuta et al., "Investigation of CO2 Removal by Immobilized Car-bonic Anhydrase Enzyme in a Hollow-Fiber Membrane Bioreac-tor", AIChE Journal, vol. 63, No. 7, 2017, pp. 2996-3007, doi: 10.1002/aic.15646.

Jayarathna et al., "Review on direct ocean capture (DOC) technolo-gies", Proceedings of the 16th Greenhouse Gas Control Technolo-gies Conference (GHGT-16), Oct. 23-27, 2022, 12 pgs.

Jin et al., "Low energy carbon capture via electrochemically induced pH swing with electrochemical rebalancing", Nature Communica-tions, vol. 13, Article No. 2140, Apr. 19, 2022, 11 pgs., doi: 10.1038/s41467-022-29791-7.

Kaiser et al., "Onsager's Wien effect on a lattice", Nature Materials, vol. 12, Aug. 11, 2013, pp. 1033-1037, doi: 10.1038/nmat3729.

Kamcev et al., "Partitioning of mobile ions between ion exchange polymers and aqueous salt solutions: importance of counter-ion condensation", Physical Chemistry Chemical Physics, vol. 18, No. 8, 2016, pp. 6021-6031, dol: 10.1039/c5cp06747b.

Konkena et al., "Understanding Aqueous Dispersibility of Graphene Oxide and Reduced Graphene Oxide through pKa Measurements", The Journal of Physical Chemistry Letters, vol. 3, No. 7, Mar. 13, 2012, pp. 867-872, doi: 10.1021/jz300236w.

Krol et al., "Behaviour of bipolar membranes at high current density Water diffusion limitation", Separation and Purification Technology, vol. 14, No. 1-3, Aug. 1998, pp. 41-52, doi: 10.1016/S1383-5866(98)00058-6.

Kusoglu et al., "New Insights into Perfluorinated Sulfonic-Acid Ionomers", Chemical Reviews, vol. 117, No. 3, Jan. 23, 2017, pp. 987-1104, doi: 10.1021/acs.chemrev.6b00159.

(56)　　　　　References Cited

OTHER PUBLICATIONS

Lin et al., "Modeling the electrochemical behavior and interfacial junction profiles of bipolar membranes at solar flux relevant operating current densities", Sustainable Energy & Fuels, vol. 5, No. 7, 2021, pp. 2149-2158, doi: 10.1039/D1SE00201E.

Lindskog et al., "The Catalytic Mechanism of Carbonic Anhydrase", Proceedings of the National Academy of Sciences, vol. 70, No. 9, Sep. 1973, pp. 2505-2508, doi: 10.1073/pnas.70.9.2505.

Liu et al., "Challenges and opportunities in continuous flow processes for electrochemically mediated carbon capture", iScience, vol. 25, No. 10, Article No. 105153, Oct. 21, 2022, 21 pgs., doi: 10.1016/j.isci.2022.105153.

Liu et al., "Graphene oxide papers with high water adsorption capacity for air dehumidification", Scientific Reports, vol. 7, Article No. 9761, Aug. 29, 2017, 9 pgs., doi: 10.1038/s41598-017-09777-y.

Lu et al., "State of Water in Perfluorosulfonic Ionomer (Nafion 117) Proton Exchange Membranes", Journal of the Electrochemical Society, vol. 155, No. 2, Dec. 2007, pp. B163-B171, doi: 10.1149/1.2815444.

Lucas et al., "Measurement of ion transport properties in ion exchange membranes for photoelectrochemical water splitting", Frontiers in Energy Research, vol. 10, No. 1383, Sep. 14, 2022, 11 pgs., doi: 10.3389/fenrg.2022.1001684.

Luo et al., "Structure-Transport Relationships of Poly(Aryl Piperidinium) Anion-Exchange Membranes: Effect of Anions and Hydration", Journal of Membrane Science, vol. 598, No. 117680, Mar. 2020, 38 pgs., doi: 10.1016/j.memsci.2019.117680.

Mafe et al., "Electric field-assisted proton transfer and water dissociation at the junction of a fixed-charge bipolar membrane", Chemical Physics Letters, vol. 294, No. 4-5, Sep. 18, 1998, pp. 406-412, doi: 10.1016/S0009-2614(98)00877-X.

Mafe et al., "Modeling of surface vs. bulk ionic conductivity in fixed charge membranes", Physical Chemistry Chemical Physics, vol. 5, No. 2, 2002, pp. 376-383, doi: 10.1039/B209438J.

Mayerhöfer et al., "Bipolar Membrane Electrode Assemblies for Water Electrolysis", ACS Applied Energy Materials, vol. 3, No. 10, Jul. 30, 2020, pp. 9635-9644, doi: 10.1021/acsaem.0c01127.

MccCann et al., "Kinetics and Mechanism of Carbamate Formation from CO2(aq), Carbonate Species, and Monoethanolamine in Aqueous Solution", The Journal of Physical Chemistry A, vol. 113, No. 17, Apr. 1, 2009, pp. 5022-5029, doi: 10.1021/jp810564z.

McDonald et al., "Graphene Oxide as a Water Dissociation Catalyst in the Bipolar Membrane Interfacial Layer", ACS Applied Materials & Interfaces, vol. 6, No. 16, Jul. 21, 2014, pp. 13790-13797, doi: 10.1021/am503242v.

McDonald et al., "Reduced Graphene Oxide Bipolar Membranes for Integrated Solar Water Splitting in Optimal pH", ChemSusChem Full Paper, vol. 8, No. 16, 2015, pp. 2645-2654, doi: 10.1002/cssc.201500538.

Morse et al., "Influences of temperature and Mg:Ca ratio on CaCO3 precipitates from seawater", Geology, vol. 25, No. 1, Jan. 1, 1997, pp. 85-87, doi: 10.1130/0091-7613(1997)025<0085:IOTAMC>2.3.CO;2.

Nagasawa et al., "A New Recovery Process of Carbon Dioxide from Alkaline Carbonate Solution via Electrodialysis", AlChE Journal, vol. 55, No. 12, Dec. 2009, pp. 3286-3293, doi: 10.1002/aic. 11907.

Nozaki et al., "Retro-Diels-Alder Reaction Induced by π, π* Excitation and by Electron Impact", Tetrahedron, vol. 25, No. 8, 1969, pp. 1661-1665, doi: 10.1016/s0040-4020(01)82739-3.

Nunes et al., "Photoacid for Extremely Long-Lived and Reversible pH-Jumps", Journal of the American Chemical Society, vol. 131, No. 26, Jun. 11, 2009, pp. 9456-9462, doi: 10.1021/ja901930c.

Oener et al., "Accelerating water dissociation in bipolar membranes and for electrocatalysis", Science, vol. 369, No. 6507, Jul. 2, 2020, pp. 1099-1103, doi: 10.1126/science.aaz1487.

Oener et al., "Thin Cation-Exchange Layers Enable High-Current-Density Bipolar Membrane Electrolyzers via Improved Water Transport", ACS Energy Letters, vol. 6, No. 1, 2021, pp. 1-8, doi: 10.1021/acsenergylett.0c02078.

Onsager, "Deviations from Ohm's Law in Weak Electrolytes", Journal of Chemical Physics, vol. 2, No. 9, Sep. 1934, pp. 599-615, doi: 10.1063/1.1749541.

Onsager et al., "Irreversible Processes in Electrolytes. Diffusion, Conductance, and Viscous Flow in Arbitrary Mixtures of Strong Electrolytes", The Journal of Physical Chemistry, vol. 36, No. 11, Nov. 1, 1932, pp. 2689-2778, doi: 10.1021/j150341a001.

Orth et al., "pKa determination of graphene-like materials: Validating chemical functionalization", Journal of Colloid and Interface Science, vol. 467, Apr. 1, 2016, pp. 239-244, doi: 10.1016/j.jcis.2016.01.013.

Ozkan et al., "Current status and pillars of direct air capture technologies", iScience, vol. 25, No. 4, Article No. 103990, Apr. 15, 2022, 23 pgs., doi: 10.1016/j.isci.2022.103990.

Pachauri et al., "Climate Change 2014: Synthesis Report", Contribution of Working Groups I, II and III to the Fifth Assessment Report of the Intergovernmental Panel on Climate Change, IPCC, Geneva, Switzerland, 2014, pp. 1-151.

Pärnamäe et al., "Bipolar membranes: A review on principles, latest developments, and applications", Journal of Membrane Science, vol. 617, No. 118538, Jan. 1, 2021, 25 pgs., doi: 10.1016/j.memsci.2020.118538.

Paul et al., "A statistical mechanical model for the calculation of the permittivity of water in hydrated polymer electrolyte membrane pores", The Journal of Chemical Physics, vol. 115, No. 16, Oct. 22, 2021, pp. 7762-7771, doi: 10.1063/1.1405851.

Powers et al., "Freestanding Bipolar Membranes with an Electrospun Junction for High Current Density Water Splitting", ACS Applied Materials & Interfaces, vol. 14, No. 31, Jul. 29, 2022, pp. 36092-36104, doi: 10.1021/acsami.2c07680.

Rochelle, "Amine Scrubbing for CO2 Capture", Science, vol. 325, No. 5948, Sep. 25, 2009, pp. 1652-1654. doi: 10.1126/science.1176731.

Sabatino et al., "Evaluation of a Direct Air Capture Process Combining Wet Scrubbing and Bipolar Membrane Electrodialysis", Industrial & Engineering Chemistry Research, vol. 59, No. 15, Jan. 14, 2020, pp. 7007-7020, doi: 10.1021/acs.iecr.9b05641.

Sabatino et al., "Modeling, Optimization, and Techno-Economic Analysis of Bipolar Membrane Electrodialysis for Direct Air Capture Processes", Industrial & Engineering Chemistry Research, vol. 61, No. 34, Aug. 9, 2022, pp. 12668-12679, doi: 10.1021/acs.iecr.2c00889.

Sanborn et al., "Interfacial and Nanoconfinement Effects Decrease the Excited-State Acidity of Polymer-Bound Photoacids", Chem, vol. 5, No. 6, Jun. 13, 2019, pp. 1648-1670, doi: 10.1016/j.chempr.2019.04.022.

Schalenbach et al., "A Perspective on Low-Temperature Water Electrolysis - Challenges in Alkaline and Acidic Technology", International Journal of Electrochemical Science, vol. 13, No. 2, Feb. 2018, pp. 1173-1226, doi: 10.20964/2018.02.26.

Schulte et al., "Turning water into a protonic diode and solar cell via doping and dye sensitization", Joule, vol. 5, No. 9, Sep. 15, 2021, pp. 2380-2394, doi: 10.1016/j.joule.2021.06.016.

Shen et al., "High Performance Electrospun Bipolar Membrane with a 3D Junction", Energy & Environmental Science, vol. 10, No. 6, 2017, 27 pgs., doi: 10.1039/c7ee00345e.

Shi et al., "Long-Lived Photoacid Based upon a Photochromic Reaction", Journal of the American Chemical Society, vol. 133, No. 37, Aug. 8, 2011, pp. 14699-14703, doi: 10.1021/ja203851c.

Silverman et al., "Charge Transfer in Photoacids Observed by Stark Spectroscopy", The Journal of Physical Chemistry A, vol. 112, No. 41, Sep. 18, 2008, pp. 10244-10249, doi: 10.1021/jp805189u.

Simons, "Strong electric field effects on proton transfer between membrane-bound amines and water", Nature, vol. 280, Aug. 30, 1979, pp. 824-826, doi: 10.1038/280824a0.

Strathmann et al., "Limiting current density and water dissociation in bipolar membranes", Journal of Membrane Science, vol. 125, No. 1, Mar. 5, 1997, pp. 123-142, doi: 10.1016/S0376-7388(96)00185-8.

Sun et al., "A Stabilized, Intrinsically Safe, 10% Efficient, Solar-Driven Water-Splitting Cell Incorporating Earth-Abundant Electrocatalysts with Steady-State pH Gradients and Product Sepa-

(56) References Cited

OTHER PUBLICATIONS ration Enabled by a Bipolar Membrane", Advanced Energy Materials, vol. 6, No. 13, Article No. 1600379, 2016, pp. 1-7, doi: 10.1002/aenm.201600379.

Thuc et al., "Simultaneous improvement of proton conductivity and chemical stability of Nafion membranes via embedment of surface-modified ceria nanoparticles in membrane surface", Journal of Membrane Science, vol. 642, Article 119990, Feb. 2022, 11 pgs., doi: 10.1016/j.memsci.2021.119990.

Tolbert et al., "Excited-State Proton Transfer: From Constrained Systems to "Super" Photoacids to Superfast Proton Transfert", Accounts of Chemical Research, vol. 35, No. 1, 2002, pp. 19-27, doi: 10.1021/ar990109f.

Torrisi et al., "Measurements on Five Characterizing Properties of Graphene Oxide and Reduced Graphene Oxide Foils", Physica Status Solidi (A) Applications and Materials Science, vol. 219, No. 6, Article No. 2100628, 2022, pp. 1-9, doi: 10.1002/pssa.202100628.

Trachtenberg et al., "Membrane-based, enzyme-facilitated, efficient carbon dioxide capture", Energy Procedia, vol. 1, No. 1, Feb. 2009, pp. 353-360, doi: 10.1016/j.egypro.2009.01.048.

Vargas-Barbosa et al., "Assessing the Utility of Bipolar Membranes for use in Photoelectrochemical Water-Splitting Cells", ChemSusChem, vol. 7, No. 11, 2014, pp. 3017-3020, doi: 10.1002/cssc.201402535.

Vedavyasan, "Chemical Cleaning of Membranes", Encyclopedia of Membranes, 2016, pp. 379-386, 10.1007/978-3-662-44324-8 633.

Vermaas et al., "Ion transport mechanisms in bipolar membranes for (photo)electrochemical water splitting", Sustainable Energy & Fuels, vol. 2, No. 9, 2018, pp. 2006-2015, doi: 10.1039/c8se00118a.

Wang et al., "Balancing Water Dissociation and Current Densities to Enable Sustainable Hydrogen Production with Bipolar Membranes in Microbial Electrolysis Cells", Environmental Science & Technology, vol. 53, No. 24, Nov. 12, 2019, pp. 14761-14768, doi: 10.1021/acs.est.9b05024.

Wang et al., "Poly(aryl piperidinium) membranes and ionomers for hydroxide exchange membrane fuel cells", Nature Energy, vol. 4, Apr. 8, 2019, pp. 392-398, doi: 10.1038/s41560-019-0372-8.

Weiss, "Carbon Dioxide in Water and Seawater: The Solubility of a Non-ideal Gas", Marine Chemistry, vol. 2, No. 3, Nov. 1974, pp. 203-215, doi: 10.1016/0304-4203(74)90015-2.

Weng et al., "Modeling gas-diffusion electrodes for CO2 reduction", Physical Chemistry Chemical Physics, vol. 20, No. 25, 2018, pp. 16973-16984, doi: 10.1039/C8CP01319E.

Widodo et al., "The Effect of NaCl Concentration on the Ionic NaCl Solutions Electrical Impedance Value using Electrochemical Impedance Spectroscopy Methods", AIP Conference Proceedings, vol. 2021, No. 1, Oct. 17, 2018, pp. 050003_1-050003_6, doi: 10.1063/1.5062753.

Willauer et al., "Development of an Electrolytic Cation Exchange Module for the Simultaneous Extraction of Carbon Dioxide and Hydrogen Gas from Natural Seawater", Energy & Fuels, vol. 31, No. 2, Jan. 8, 2017, pp. 1723-1730, doi: 10.1021/acs.energyfuels.6b02586.

Xia et al., "Direct electrosynthesis of pure aqueous H2O2 solutions up to 20% by weight using a solid electrolyte", Science, vol. 366, No. 6462, Oct. 11, 2019, pp. 226-231, doi: 10.1126/science.aay1844.

Xu et al., "Review on electrochemical carbon dioxide capture and transformation with bipolar membranes", Chinese Chemical Letters, vol. 34, No. 8 Article 108075, Aug. 2023, 16 pgs., doi: 10.1016/j.cclet.2022.108075.

Xu et al., "Ultrahigh-efficiency desalination via a thermally-localized multistage solar still", Energy & Environmental Science, vol. 13, No. 3, 2020, pp. 830-839, doi: 10.1039/C9EE04122B.

Yamada et al., "Photochemical Synthesis of Pentacene and its Derivatives", Chemistry—A European Journal, vol. 11, No. 21, Oct. 13, 2005, pp. 6212-6220, doi: 10.1002/chem.200500564.

Yan et al., "The Balance of Electric Field and Interfacial Catalysis in Promoting Water Dissociation in Bipolar Membranes", Energy & Environmental Science, vol. 11, No. 8, 2018, pp. 2235-2245, doi: 10.1039/C8EE01192C.

Zenyuk et al., "Understanding Impacts of Catalyst-Layer Thickness on Fuel-Cell Performance via Mathematical Modeling", Journal of The Electrochemical Society, vol. 163, No. 7, Apr. 30, 2016, pp. F691-F703, doi: 10.1149/2.1161607jes.

Zhou et al., "Rational use and reuse of Nafion 212 membrane in vanadium flow batteries", RSC Advances, vol. 7, 2017, pp. 19425-19433, doi: 10.1039/C7RA00294G.

Zhou et al., "Solar-Driven Reduction of 1 atm of CO2 to Formate at 10% Energy-Conversion Efficiency by Use of a TiO2-Protected III-V Tandem Photoanode in Conjunction with a Bipolar Membrane and a Pd/C Cathode", ACS Energy Letters, vol. 1, No. 4, Sep. 9, 2016, pp. 764-770, doi: 10.1021/acsenergylett.6b00317.

Zuoguo, "Process and Principle of Membrane Science and Technology", East China University of Science and Technology Press, Aug. 31, 2009, 3 pgs.

International Preliminary Report on Patentability received for International Application No. PCT/US2023/076490, Report issued Apr. 15, 2025, Mailed Apr. 24, 2025, 7 pgs.

International Search Report and Written Opinion received for International Application No. PCT/US2023/076490, Search completed Mar. 5, 2024, Mailed Mar. 5, 2024, 9 pgs.

Adamczyk et al., "Ultrafast Protonation of Cyanate Anion in Aqueous Solution", Israel Journal of Chemistry, vol. 49, No. 2, Jul. 2009, pp. 217-225, doi: 10.1560/IJC.49.2.217.

Agmon, "Elementary Steps in Excited-State Proton Transfer", The Journal of Physical Chemistry A, vol. 109, No. 1, 2005, pp. 13-35, doi: 10.1021/jp047465m.

Agmon, "From Energy Profiles to Structure-Reactivity Correlations", International Journal of Chemical Kinetics, vol. 13, No. 4, Apr. 1981, pp. 333-365, doi: 10.1002/kin.550130403.

Agmon et al., "Energy, Entropy and the Reaction Coordinate: Thermodynamic-Like Relations in Chemical Kinetics", Chemical Physics Letters, vol. 52, No. 2, Dec. 1, 1977, pp. 197-201, doi: 10.1016/0009-2614(77)80523-X.

Albery, "The Application of the Marcus Relation to Reactions in Solution", Annual Review of Physical Chemistry, vol. 31, Oct. 1980, pp. 227-263, doi: 10.1146/annurev.pc.31.100180.001303.

Alper et al., "CO2 utilization: Developments in conversion processes", Petroleum, vol. 3, No. 1, Mar. 2017, pp. 109-126, doi: 10.1016/j.petlm.2016.11.003.

Arnaut et al., "Excited-State Proton-Transfer Kinetics: A Theoretical Model", The Journal of Physical Chemistry, vol. 92, No. 3, Feb. 1, 1988, pp. 685-691, doi: 10.1021/j100314a022.

Bagger et al., "Electrochemical CO2 Reduction: A Classification Problem", ChemPhysChem, vol. 18, No. 22, Nov. 17, 2017, pp. 3266-3273, doi: 10.1002/cphc.201700736.

Ballinger et al., "Acid Ionization Constants of Alcohols. I. Trifluoroethanol in the Solvents H2O and D2O1", Journal of the American Chemical Society, vol. 81, No. 5, Mar. 1, 1959, pp. 1050-1053, doi: 10.1021/ja01514a010.

Bhide et al., "Quantification of Excited-State Brønsted-Lowry Acidity of Weak Photoacids Using Steady-State Photoluminescence Spectroscopy and a Driving- Force-Dependent Kinetic Theory", Journal of the American Chemical Society, vol. 144, No. 32, Aug. 2, 2022, pp. 14477-14488, doi: 10.1021/jacs.2c00554.

Birdja et al., "Advances and challenges in understanding the electrocatalytic conversion of carbon dioxide to fuels", Nature Energy, vol. 4, Sep. 9, 2019, pp. 732-745, doi: 10.1038/s41560-019-0450-y.

Botz et al., "Local Activities of Hydroxide and Water Determine the Operation of Ag-Based Oxygen Depolarized Cathodes", Angewandte Chemie International Edition, vol. 57, No. 38, Sep. 17, 2018, pp. 12285-12289, doi: 10.1002/anie.201807798.

Bouffier et al., "Coupling electrochemistry with in-situ fluorescence (confocal) microscopy", Current Opinion in Electrochemistry, vol. 6, No. 1, Dec. 2017, pp. 31-37, doi: 10.1016/j.coelec.2017.06.015.

Bowden, "Acidity Functions for Strongly Basic Solutions", Chemical Reviews, vol. 66, No. 2, Mar. 25, 1966, pp. 119-131, doi: 10.1021/cr60240a001.

(56)        References Cited

OTHER PUBLICATIONS

Bowyer et al., "Fluorescence Imaging of the Heterogeneous Reduction of Oxygen", Analytical Chemistry, vol. 68, No. 13, Jul. 1, 1996, pp. 2005-2009, doi: 10.1021/ac9512259.

Brethome et al., "Direct air capture of CO2 via aqueous-phase absorption and crystalline-phase release using concentrated solar power", Nature Energy, vol. 3, May 7, 2018, pp. 553-559, doi: 10.1038/s41560-018-0150-z.

Bronsted et al., "The catalytic decomposition of nitramide and its physical-chemical significance", Zeitschrift für Physikalische Chemie, vol. 108U, No. 1, 1964, pp. 185-235, doi: 10.1515/zpch-1924-10814.

Brunschwig et al., "Solvent Reorganization in Optical and Thermal Electron-Transfer Processes", Journal of Physical Chemistry, vol. 90, No. 16, Jul. 1, 1986, pp. 3657-3668, doi: 10.1021/J100407A037.

Bui et al., "Carbon capture and storage (CCS): the way forward", Energy & Environmental Science, vol. 11, No. 5, 2018, pp. 1062-1176, doi: 10.1039/c7ee02342a.

Bui et al., "Dynamic Boundary Layer Simulation of Pulsed CO2 Electrolysis on a Copper Catalyst", ACS Energy Letters, vol. 6, No. 4, Mar. 11, 2021, pp. 1181-1188, doi: 10.1021/acsenergylett.1c00364.

Busch et al., "Potential for low-cost carbon dioxide removal through tropical reforestation", Nature Climate Change, vol. 9, Jun. 2019, pp. 463-466, doi: 10.1038/s41558-019-0485-x.

Chattopadhyay, "Determination of pK* in excited state proton transfer (ESPT) reaction: a rearrangement of Weller's equation; advantage of dual luminescence", Journal of Photochemistry and Photobiology A: Chemistry, vol. 88, No. 1, May 10, 1995, 4 pgs., doi: 10.1016/1010-6030(94)03992-4.

Chattopadhyay et al., "Equilibrium pK* of Carbazole Studied by the Deprotonation Reaction in Ammoniacal Aqueous Media", Journal of Photochemistry, vol. 38, Jun. 1987, pp. 301-309, doi: 10.1016/0047-2670(87)87025-9.

Chattopadhyay et al., "Excited State Deprotonation Reactions of Aromatic Amines: A Diffusion-Controlled Process", Journal of Photochemistry and Photobiology A: Chemistry, vol. 48, No. 1, Jul. 1989, pp. 61-68, doi: 10.1016/1010-6030(89)87090-X.

Chow et al., "Mitigating Electrode Fouling in Electrocoagulation by Means of Polarity Reversal: The Effects of Electrode Type, Current Density, and Polarity Reversal Frequency", Water Research, vol. 197, Article 117074, Jun. 1, 2021, pp. 1-10, doi: 10.1016/j.watres.2021.117074.

Closs et al., "Intramolecular Long-Distance Electron Transfer in Organic Molecules", Science, vol. 240, No. 4851, Apr. 22, 1988, pp. 440-447, doi: 10.1126/science.240.4851.440.

Cofell et al., "Investigation of Electrolyte-Dependent Carbonate Formation on Gas Diffusion Electrodes for CO2 Electrolysis", ACS Applied Materials & Interfaces, vol. 13, No. 13, Mar. 25, 2021, pp. 15132-15142, doi: 10.1021/acsami.0c21997.

Cohen et al., "Diffusion-Limited Acid-Base Nonexponential Dynamics", The Journal of Physical Chemistry A, vol. 105, No. 30, Jul. 11, 2001, pp. 7165-7173, doi: 10.1021/jp0106911.

Cohen et al., "On the Slope of Free Energy Plots in Chemical Kinetics", The Journal of Physical Chemistry, vol. 72, No. 12, Nov. 1, 1968, pp. 4249-4256, doi: 10.1021/j100858a052.

Corral et al., "Advanced manufacturing for electrosynthesis of fuels and chemicals from CO2", Energy & Environmental Science, vol. 14, No. 5, Feb. 15, 2021, pp. 3064-3074, doi: 10.1039/d0ee03679j.

Creutzig et al., "The underestimated potential of solar energy to mitigate climate change", Nature Energy, vol. 2, Article 17140, Aug. 25, 2017, pp. 1-9, doi: 10.1038/nenergy.2017.140.

Davis et al., "Net-zero emissions energy systems", Science, vol. 360, No. 6396, Article eaas9793, Jun. 29, 2018, 10 pgs., doi: 10.1126/science.aas9793.

Davis et al., "Production of Acids and Bases for Ion Exchange Regeneration from Dilute Salt Solutions Using Bipolar Membrane Electrodialysis", ACS Sustainable Chemistry & Engineering, vol. 3, No. 9, Aug. 18, 2015, pp. 2337-2342, doi: 10.1021/acssuschemeng.5b00654.

De Levie, "Explicit Expressions of the General Form of the Titration Curve in Terms of Concentration: Writing a Single Closed-Form Expression for the Titration Curve for a Variety of Titrations without Using Approximations or Segmentation", Journal of Chemical Education, vol. 70, No. 3, Mar. 1993, pp. 209-217, doi: 10.1021/ed070p209.

Debye, "Reaction Rates in Ionic Solutions", Transactions of the Electrochemical Society, vol. 82, No. 1, Oct. 9, 1942, pp. 265-272, doi: 10.1149/1.3071413.

Dempsey et al., "Mechanism of H2 Evolution from a Photogenerated Hydridocobaloxime", Journal of the American Chemical Society, vol. 132, No. 47, Nov. 10, 2010, pp. 16774-16776, doi: 10.1021/ja109351h.

Dieckhofer et al., "Probing the Local Reaction Environment During High Turnover Carbon Dioxide Reduction with Ag-Based Gas Diffusion Electrodes", Chemistry: A European Journal, vol. 27, No. 19, Apr. 1, 2021, pp. 5906-5912, doi: 10.1002/chem.202100387.

Diederichsen et al., "Electrochemical methods for carbon dioxide separations", Nature Reviews Methods Primers, vol. 2, Article 68, Sep. 8, 2022, 29 pgs., doi: 10.1038/s43586-022-00148-0. (With English Abstract).

Dinh et al., "CO2 electroreduction to ethylene via hydroxide-mediated copper catalysis at an abrupt interface", Science, vol. 360, No. 6390, May 18, 2018, pp. 783-787, doi: 10.1126/science.aas9100.

Dogra, "Solvatochromism and prototropism in 6-aminonicotinic acid", Journal of Luminescence, vol. 114, No. 3-4, Sep. 2005, pp. 213-226, doi: 10.1016/j.jlumin.2005.01.004.

Du et al., "Treatment of Brackish Water RO Brine via Bipolar Membrane Electrodialysis", Industrial & Engineering Chemistry Research, vol. 60, No. 7, Feb. 12, 2021, pp. 3115-3129, doi: 10.1021/acs.iecr.1c00370.

Dunwell et al., "The Central Role of Bicarbonate in the Electrochemical Re- duction of Carbon Dioxide on Gold", Journal of the American Chemical Society, vol. 139, No. 10, Feb. 17, 2017, pp. 3774-3783, doi: 10.1021/jacs.6b13287.

Ehlinger et al., "Modeling proton-exchange-membrane fuel cell performance/degradation tradeoffs with chemical scavengers", Journal of Physics: Energy, vol. 2, No. 4, Article 044006, Oct. 9, 2020, pp. 1-17, doi: 10.1088/2515-7655/abb194.

Eigen, "Fast Elementary Steps in Chemical Reaction Mechanisms", Pure and Applied Chemistry, vol. 6, No. 1, Jan. 1, 2009, pp. 97-116, doi: 10.1351/pac196306010097.

Eigen, "Kinetics of Proton Transfer Processes", Discussions of the Faraday Society, vol. 39, 1965, pp. 7-15, doi: 10.1039/DF9653900007.

Eigen et al., "Self-dissociation and protonic charge transport in water and ice", Proceedings A, vol. 247, No. 1251, 1958, pp. 505-533, doi: 10.1098/rspa.1958.0208.

Eigen et al., "The Kinetics and Mechanism of Formation of Metal Complexes", Chapter 3, Mechanisms of Inorganic Reactions, vol. 49, Jan. 1, 1965, pp. 55-80, doi: 10.1021/ba-1965-0049.ch003.

Ekimova et al., "Ultrafast Proton Transport between a Hydroxy Acid and a Nitrogen Base along Solvent Bridges Governed by the Hydroxide/Methoxide Transfer Mechanism", Journal of the American Chemical Society, vol. 141, No. 37, Aug. 26, 2019, pp. 14581-14592, doi: 10.1021/jacs.9b03471.

Farid et al., "Reexamination of the Rehm-Weller Data Set Reveals Electron Transfer Quenching That Follows a Sandros-Boltzmann Dependence on Free Energy", Journal of the American Chemical Society, vol. 133, No. 30, 2011, pp. 11580-11587, doi: 10.1021/ja2024367.

Fenwick et al., "Probing the Catalytically Active Region in a Nanoporous Gold Gas Diffusion Electrode for Highly Selective Carbon Dioxide Reduction", ACS Energy Letters, vol. 7, No. 2, Jan. 27, 2022, pp. 871-879, doi: 10.1021/acsenergylett.1c02267.

Forster, "Fluorescence spectrum and hydrogen ion concentration", Natural Sciences, vol. 36, No. 6, 1949, pp. 186-187, doi: 10.1007/BF00626582.

Förster et al., "Kinetics of Proton Transfer Reactions Involving Hydroxypyrene-Trisulphonate in Aqueous Solution by Nanosecond Laser Absorption Spectroscopy", Chemical Physics Letters, vol. 34, No. 1, Jul. 1, 1975, pp. 1-6, doi: 10.1016/0009-2614(75)80188-6.

(56) References Cited

OTHER PUBLICATIONS

Fuladpanjeh-Hojaghan et al., "In-Operando Mapping of pH Distribution in Electrochemical Processes", Angewandte Chemie International Edition, vol. 58, No. 47, Nov. 18, 2019, pp. 16815-16819, doi: 10.1002/anie.201909238.

Fuoss et al., "Properties of Electrolytic Solutions. XV. Thermodynamic Properties of Very Weak Electrolytes", Journal of the American Chemical Society, vol. 57, No. 1, Jan. 17, 1935, pp. 1-4, doi: 10.1021/ja01304a001.

Gafni et al., "Excited State Proton Transfer Reactions of Acridine Studied by Nanosecond Fluorometry", Chemical Physics Letters, vol. 58, No. 3, Oct. 1, 1978, pp. 346-350, doi: 10.1016/0009-2614(78)85050-7.

García De Arquer et al., "CO2 electrolysis to multicarbon products at activities greater than 1 A cm-2", Science, vol. 367, No. 6478, Feb. 7, 2020, pp. 661-666, doi: 10.1126/science.aay4217.

Garza et al., "On the Mechanism of CO2 Reduction at Copper Surfaces: Pathways to C2 Products", ACS Catalysis, vol. 8, No. 2, Jan. 11, 2018, pp. 1490-1499, doi: 10.1021/acscatal.7b03477.

Gasser et al., "Negative emissions physically needed to keep global warming below 2 ", Nature Communications, vol. 6, Article 7958, Aug. 3, 2015, pp. 1-7, doi: 10.1038/ncomms8958.

Gauthier et al., "Pathways for the Formation of C2+ Products under Alkaline Conditions during the Electrochemical Reduction of CO2", ACS Energy Letters, vol. 7, No. 5, Apr. 13, 2022, pp. 1679-1686, doi: 10.1021/acsenergylett.2c00167.

Glancy et al., "Identification of Photoacidic Behavior Using AC and Open-Circuit Photoelectrochemical Techniques", ECS Journal of Solid-State Science and Technology, vol. 11, No. 10, Article 105002, Oct. 6, 2022, 7 pgs., doi: 10.1149/2162-8777/ac71ff.

Goeppert et al., "Air as the renewable carbon source of the future: an overview of CO2 capture from the atmosphere", Energy & Environmental Science, vol. 5, No. 7, 2012, pp. 7833-7853, doi: 10.1039/C2EE21586A.

Gruber et al., "The oceanic sink for anthropogenic CO2 from 1994 to 2007", Science, vol. 363, No. 6432, Mar. 15, 2019, pp. 1193-1199, doi: 10.1126/science.aau5153.

Gui et al., "Recent advances in dual-emission ratiometric fluorescence probes for chemo/biosensing and bioimaging of biomarkers", Coordination Chemistry Reviews, vol. 383, Mar. 15, 2019, pp. 82-103, doi: 10.1016/j.ccr.2019.01.004.

Haghighat et al., "Controlling Proton Conductivity with Light: A Scheme Based on Photoacid Doping of Materials", Journal of Physical Chemistry B, vol. 120, No. 5, Jan. 15, 2016, pp. 1002-1007, doi: 10.1021/acs.jpcb.6b00370.

Hakonen et al., "A high-performance fluorosensor for pH measurements between 6 and 9", Talanta, vol. 80, No. 5, Mar. 15, 2010, pp. 1964-1969, doi: 10.1016/j.talanta.2009.10.055.

Hall et al., "Mesostructure-Induced Selectivity in CO2 Reduction Catalysis", Journal of the American Chemical Society, vol. 137, No. 47, Nov. 4, 2015, pp. 14834-14837, doi: 10.1021/jacs.5b08259.

Hansen et al., "Excited-state Proton Transfer of Protonated 1-Aminopyrene Complexes with Beta-Cyclodextrin", Journal of Physical Chemistry, vol. 96, No. 17, Aug. 1, 1992, pp. 6904-6910, doi: 10.1021/j100196a011.

Harris et al., "Alcohol tracer diffusion, density, NMR and FTIR studies of aqueous ethanol and 2,2,2-trifluoroethanol solutions at 25°C", Journal of the Chemical Society, Faraday Transactions, vol. 94, No. 14, 1998, pp. 1963-1970, doi: 10.1039/A802567C.

Hicks et al., "Excited-state acid-base chemistry of coordination complexes", Coordination Chemistry Reviews, vol. 211, No. 1, Jan. 2001, pp. 207-222, doi: 10.1016/S0010-8545(00)00279-4.

Higgins et al., "Gas-Diffusion Electrodes for Carbon Dioxide Reduction: A New Paradigm", ACS Energy Letters, vol. 4, No. 1, Dec. 14, 2018, pp. 317-324, doi: 10.1021/acsenergylett.8b02035.

Hoegh-Guldberg et al., "Coral Reefs Under Rapid Climate Change and Ocean Acidification", Science, vol. 318, No. 5857, Dec. 14, 2007, pp. 1737-1742, doi: 10.1126/science.1152509.

Hori et al., "Production of CO and CH4 in Electrochemical Reduction of CO2 at Metal Electrodes in Aqueous Hydrogencarbonate Solution", Chemistry Letters, vol. 14, No. 11, Nov. 1985, pp. 1695-1698, doi: 10.1246/cl.1985.1695.

Inaba et al., "Benchmarking high surface area electrocatalysts in a gas diffusion electrode: measurement of oxygen reduction activities under realistic conditions", Energy & Environmental Science, vol. 11, No. 4, 2018, pp. 988-994, doi: 10.1039/C8EE00019K.

Ireland et al., "Acid-Base Properties of Electronically Excited States of Organic Molecules", Advances in Physical Organic Chemistry, vol. 12, 1976, pp. 131-221, doi: 10.1016/S0065-3160(08)60331-7.

Jagannadh et al., "Electrokinetics Methods to Control Membrane Fouling", Industrial & Engineering Chemistry Research, vol. 35, No. 4, 1996, pp. 1133-1140, doi: 10.1021/ie9503712.

Jeanty et al., "Upscaling and continuous operation of electrochemical CO2 to CO conversion in aqueous solutions on silver gas diffusion electrodes", Journal of CO2 Utilization, vol. 24, Mar. 2018, pp. 454-462, doi: 10.1016/j.jcou.2018.01.011.

Jin et al., "Advances and Challenges for the Electrochemical Reduction of CO2 to CO: From Fundamentals to Industrialization", Angewandte Chemie International Edition, vol. 133, 2021, pp. 2-24, doi: 10.1002/ange.202101818.

Jin et al., "pH swing cycle for CO2 capture electrochemically driven through proton-coupled electron transfer", Energy & Environmental Science, vol. 13, No. 10, 2020, pp. 3706-3722, doi: 10.1039/DOEE01834A.

Jones et al., "Electrochemical CO2 Reduction: Recent Advances and Current Trends", Israel Journal of Chemistry, vol. 54, No. 10, Oct. 2014, pp. 1451-1466, doi: 10.1002/ijch.201400081.

Kastlunger et al., "Using pH dependence to understand mechanisms in electrochemical CO reduction", ACS Catalysis, vol. 12, No. 8, Mar. 28, 2022, pp. 4344-4357, doi: 10.1021/acscatal.1c05520.

Keith, "Why Capture CO2 from the Atmosphere?", Science, vol. 325, No. 5948, Sep. 25, 2009, pp. 1654-1655, doi: 10.1126/science.1175680.

Keith et al., "A Process for Capturing CO2 from the Atmosphere", Joule, vol. 2, No. 18, Aug. 15, 2018, pp. 1573-1594, doi: 10.1016/j.joule.2018.05.006.

Kibria et al., "Electrochemical CO2 Reduction into Chemical Feedstocks: From Mechanistic Electrocatalysis Models to System Design", Advanced Materials, vol. 31, No. 31, Article 1807166, Aug. 2, 2019, pp. 1-24, doi: 10.1002/adma.201807166.

Kiefer et al., "Nonlinear Free Energy Relations for Adiabatic Proton Transfer Reactions in a Polar Environment. I. Fixed Proton Donor-Acceptor Separation", The Journal of Physical Chemistry A, vol. 106, No. 9, Feb. 8, 2002, pp. 1834-1849, doi: 10.1021/jp0134244.

Kiefer et al., "Nonlinear Free Energy Relations for Adiabatic Proton Transfer Reactions in a Polar Environment. II. Inclusion of the Hydrogen Bond Vibration", The Journal of Physical Chemistry A, vol. 106, No. 9, Feb. 8, 2002, pp. 1850-1861, doi: 10.1021/jp013425w.

Kim et al., "Asymmetric chloride-mediated electrochemical process for CO2 removal from oceanwater", Energy & Environmental Science, vol. 16, No. 5, 2023, pp. 2030-2044, doi: 10.1039/D2EE03804H.

Kim et al., "Effects of composition of the micro porous layer and the substrate on performance in the electrochemical reduction of CO2 to CO", Journal of Power Sources, vol. 312, Apr. 30, 2016, pp. 192-198, doi: 10.1016/j.jpowsour.2016.02.043.

Kim et al., "Impact of Pulsed Electrochemical Reduction of CO2 on the Formation of C2+ Products over Cu", ACS Catalysis, vol. 10, No. 21, Sep. 29, 2020, pp. 12403-12413, doi: 10.1021/acscatal.0c02915.

Kim et al., "Tailored catalyst microenvironments for CO2 electroreduction to multicarbon products on copper using bilayer ionomer coatings", Nature Energy, vol. 6, Nov. 2021, pp. 1026-1034, doi: 10.1038/s41560-021-00920-8.

Extended European Search Report for European Application No. 23832562.5, Search completed May 11, 2026, Mailed May 27, 2026, 12 pgs.

Kim et al., "Bipolar Membranes to Promote Formation of Tight Ice-Like Water for Efficient and Sustainable Water Splitting", Small Wiley, Hoboken, USA, Sep. 22, 2020, vol. 16, No. 41, XP072685531, ISSN: 1613-6810, DOI: 10.1002/SMLL.202002641.

(56)          References Cited

OTHER PUBLICATIONS

Wang et al., "Ion Exchange Membrane Related Processes Towards Carbon Capture, Utilization and Storage: Current Trends and Perspectives", Separation and Purification Technology Elsevier Science, Amsterdam, NL, Jun. 1, 2022, vol. 296, XP087098914, ISSN: 1383-5866, DOI:10.1016/J.SEPPUR.2022.121390.
Xue et al., "Progress on Modification of Bipolar Membrane: An Overview", Modern Chemical Industry, Oct. 31, 2021, vol. 41, No. 10, pp. 38-46, DOI: 10.16606 /j.cnki.issn 0253-4320.2021.10.009.

* cited by examiner

FIG. 8

| Constituents | g kg$^{-1}$ | mM |
|---|---|---|
| Cl$^-$ | 19.3524 | 545.86 |
| Na$^+$ | 10.7837 | 469.06 |
| Mg$^{2+}$ | 1.2837 | 52.82 |
| SO$_4$$^{2-}$ | 2.7123 | 28.24 |
| Ca$^{2+}$ | 0.4121 | 10.28 |
| K$^+$ | 0.3991 | 10.21 |
| CO2 | 0.0004 | 0.01 |
| HCO3$^-$ | 0.1080 | 1.77 |
| CO$_3$$^{2-}$ | 0.0156 | 0.26 |
| B(OH)$_3$ | 0.0198 | 0.32 |
| B(OH)$_4$$^-$ | 0.0079 | 0.10 |
| Br$^-$ | 0.0673 | 0.84 |
| Sr$^{2+}$ | 0.0079 | 0.09 |
| F$^-$ | 0.0013 | 0.07 |
| OH$^-$ | 0.002 | 0.01 |

SYSTEM AND METHOD FOR DUAL-PATHWAY SYSTEM FOR CARBON DIOXIDE CAPTURE FROM OCEAN WATER

FEDERAL SUPPORT STATEMENT

This invention was made with government support under Grant No. DE-AR0001407 awarded by the Department of Energy. The government has certain rights in the invention.

FIELD OF THE INVENTION

Embodiments disclosed herein relate to systems and methods for a dual-pathway system for carbon dioxide capture from ocean water.

BACKGROUND

Capture and conversion of $CO_2$ from anthropogenic emission is becoming an increasingly important social responsibility as the concentration of atmospheric $CO_2$ continues to rise above record high levels. $CO_2$ from the atmosphere, oceanwater and point sources such as coal fired power plants or cement plants are considered as the major feedstock for subsequent capture and conversion processes. The concentration of the present $CO_2$ in the atmosphere is ~400 ppm, or 0.00079 kg m$^{-3}$. As a result, a large volume of air needs to be processed in direct air capture processes. In contrast, world oceans constitutes the largest carbon sink, absorbing about 40% of anthropogenic $CO_2$ since the beginning of industrial era with an effective $CO_2$ concentration of 2.1 mmol kg$^{-1}$, or 0.095 kg m$^{-3}$ in seawater, which is a factor of 120 times larger than in the atmosphere. Thus, extraction of $CO_2$ from seawater provides an alternative and unique approach in the global carbon removal technological landscape in relative to direct air capture (DAC).

SUMMARY OF THE INVENTION

Embodiments of the disclosure are directed to systems and methods for a dual-pathway system for carbon dioxide capture from ocean water.

Many embodiments of the disclosure are directed to dual-pathway systems for $CO_2$ capture including:
- a platform disposed adjacent a source of oceanwater;
- an acid-base-generator in fluid communication with the source of oceanwater including:
  - a purification apparatus configured to convert a first portion of the oceanwater into a feedstock of NaCl, and
  - at least one electrodialyzer in fluid communication with the purification apparatus and incorporated a bipolar membrane configured to convert the feedstock of NaCl into a HCl feedstock and a NaOH feedstock;
- an acidic $CO_2$ removal system in fluid communication with the source of oceanwater including:
  - an acidification element in fluid communication with the HCl feedstock and configured to produce an acidified oceanwater feedstock from the oceanwater, and
  - a catalyst-bonded membrane contactor in fluid communication with the acidification element and a vacuum system to extract gaseous $CO_2$ from the acidified oceanwater feedstock and output a decarbonized acidified oceanwater effluent to an output;
- an alkaline $CO_2$ removal system in fluid communication with a source of fluid entrained $CO_2$ and in further fluid communication with the NaOH feedstock and configured to produce a $CO_2$ lean effluent and a carbonate; and
- wherein the output mixes the decarbonized acidified oceanwater effluent and at least one effluent from the alkaline $CO_2$ removal system to form a mixed oceanwater effluent for release into the environment.

In still many embodiments of the disclosure the alkaline $CO_2$ removal system is in fluid communication with the source of oceanwater and includes:
- a basification element in fluid communication with the NaOH feedstock and configured to produce a basified oceanwater feedstock from the oceanwater, and
- a sedimentation element in fluid communication with the basification element to collect mineral carbonate precipitates from the basified oceanwater feedstock and output a decarbonized basified oceanwater effluent to the output; and
- wherein the output mixes the decarbonized acidified oceanwater effluent and the decarbonized basified oceanwater effluent to form a mixed oceanwater effluent having a pH approximately equivalent to the pH of the source of oceanwater for release into the environment.

In yet many embodiments of the disclosure the alkaline $CO_2$ removal system is in fluid communication with the fluid entrained $CO_2$, which comprises a source of $CO_2$ containing gas feedstock and includes:
- a direct air capture element in fluid communication with the NaOH feedstock and the $CO_2$ containing gas feedstock configured to produce a $CO_2$-lean gas effluent and a carbonate solution; and
- wherein the output mixes the decarbonized acidified oceanwater effluent and the carbonate solution to entrain the $CO_2$ within the carbonate into the decarbonized acidified oceanwater effluent for release into the environment.

In still yet many embodiments of the disclosure the acidified oceanwater feedstock has a pH range between pH~4 to pH~7.

In yet still many embodiments of the disclosure the basified oceanwater feedstock has a pH of around 10, and wherein the mineral carbonate is $CaCO_3$.

In still yet many embodiments of the disclosure the oceanwater and mixed oceanwater effluent have a pH of around 8.

In yet still many embodiments of the disclosure the system includes at least one pre-processing element disposed between the source of oceanwater and the acid-base generator, the acidic $CO_2$ removal system and the alkaline $CO_2$ removal system to screen the oceanwater.

In still yet many embodiments of the disclosure the pre-processing element comprises a drum-screen filter.

In yet still many embodiments of the disclosure the purification apparatus comprises one or more of the elements selected from the group consisting of dissolved air flotation clarifiers, micro/ultra-filters, cartridge filters, and water softening ion exchangers.

In still yet many embodiments of the disclosure the purification apparatus comprises at least a clarifier and an ion exchanger, and wherein the clarifier is in fluid communication with the HCl feedstock and the ion exchange is in fluid communicate with the NaOH feedstock.

In yet still many embodiments of the disclosure the electrodialyzer is configures to operate at a current density between 250 mA/cm$^2$ to 1000 mA/cm$^2$.

In still yet many embodiments of the disclosure the bipolar membrane comprises a catalyzed ionic layer bound directly onto one of either a cationic-exchange membrane or an anionic-exchange membrane.

In yet still many embodiments of the disclosure the ionic layer has a thickness between 5-50 μm.

In still yet many embodiments of the disclosure the bipolar membrane is a trilayer structure comprising at least three elements selected from the group consisting of porous solid electrolytes, cationic-exchange membranes, and anionic-exchange membranes.

In yet still many embodiments of the disclosure the catalyzed ionic layer comprises at least one buffering group with a $pK_a$ of approximately 7.

In still yet many embodiments of the disclosure the catalyzed ionic layer comprises at least one buffering group covalently bound to a polymer backbone.

In yet still many embodiments of the disclosure the polymer backbone is selected from the group consisting of polyethylene oxide, polypropylene and polyethylene.

In still yet many embodiments of the disclosure the at least one buffering group is selected from the group consisting of phosphonates and metal-oxide nanomaterials.

In yet still many embodiments of the disclosure the system includes a stack of electrodialyzers.

In still yet many embodiments of the disclosure the catalyst-bonded membrane contactor comprises one or more gas-liquid membrane contactor materials having bonded thereto a buffering group catalyst.

In yet still many embodiments of the disclosure the gas-liquid membrane contactor material comprises one or more hollow-fiber.

In still yet many embodiments of the disclosure the one or more hollow-fiber is a material selected from the group consisting of polypropylene or polyethylene.

In yet still many embodiments of the disclosure the buffering group catalyst is a synthetic carbon anhydrase mimic.

In still yet many embodiments of the disclosure the catalyst-bonded membrane contactor comprises a baffle structure disposed exterior to the one or more hollow-fiber such that flows of the acidified oceanwater feedstock are introduced at one or more angles to the one or more hollow-fiber.

In yet still many embodiments of the disclosure at least a portion of the catalyst-bonded membrane contactor proximal to an intake thereof is free of the buffering group catalyst.

In still yet many embodiments of the disclosure the system includes one or more renewable power sources electrically interconnected to power the dual-path system.

In yet still many embodiments of the disclosure at least one of the renewable power sources if photovoltaics and wherein the photovoltaics collect infrared radiation, and wherein the infrared radiation is used to generate heat to heat the catalyst-bonded membrane contactor.

In still yet many embodiments of the disclosure the sedimentation element is further provided with at least one seeding growth material selected from the group consisting of vaterite, calcite, and salt solutions thereof.

In yet still many embodiments of the disclosure the first portion comprises ~0.5% of the oceanwater introduced into the dual-pathway system.

In still yet many embodiments of the disclosure the catalyst-bonded membrane contactor is in fluid communication with the HCl feedstock.

In yet still many embodiments of the disclosure at least one electrodialyzer further outputs a dilute low salt concentration water effluent, and wherein the dilute low salt concentration water effluent is reintroduced into the electrodialyzer as a feedstock.

Various embodiments of the disclosure are directed to dual-pathway methods for $CO_2$ capture including:
   introducing a first portion of oceanwater into an acid-base-generator;
   converting the first portion of the oceanwater into a feedstock of NaCl;
   electrodialyzing in a bipolar membrane the NaCl into a HCl feedstock and a NaOH feedstock;
   introducing a second portion of oceanwater to an acidification element in fluid communication with the HCl feedstock to produce an acidified oceanwater feedstock from the oceanwater;
   extracting gaseous $CO_2$ from the acidified oceanwater feedstock through a catalyst-bonded membrane contactor and outputting a decarbonized acidified oceanwater effluent;
   introducing a source of fluid entrained $CO_2$ to an alkaline $CO_2$ removal system in fluid communication with the NaOH feedstock and configured to produce a $CO_2$ lean effluent and a carbonate; and
   mixing the decarbonized acidified oceanwater effluent and at least one effluent from the alkaline $CO_2$ removal system to form a mixed oceanwater effluent for release into the environment.

In still various embodiments of the disclosure the source of fluid entrained $CO_2$ comprises a third portion of oceanwater, and further including:
   introducing the third portion to a basification element in fluid communication with the NaOH feedstock to produce a basified oceanwater feedstock from the oceanwater;
   collecting a mineral carbonate precipitate from the basified oceanwater feedstock and outputting a decarbonized basified oceanwater effluent; and
   mixing the decarbonized acidified oceanwater effluent and the decarbonized basified oceanwater effluent to form a mixed oceanwater effluent having a pH approximately equivalent to the pH of the source of oceanwater for release into the environment.

In yet various embodiments of the disclosure the source of fluid entrained $CO_2$ comprises a $CO_2$ containing gas feedstock, and further including:
   introducing the $CO_2$ containing gas feedstock to a direct air capture element in fluid communication with the NaOH feedstock and configured to produce a $CO_2$-lean gas effluent and a carbonate solution; and
   wherein the output mixes the decarbonized acidified oceanwater effluent and the carbonate solution to entrain the $CO_2$ within the carbonate into the decarbonized acidified oceanwater effluent for release into the environment.

In still yet various embodiments of the disclosure the acidified oceanwater feedstock has a pH range between pH~4 to pH~7.

In yet still various embodiments of the disclosure the basified oceanwater feedstock has a pH of around 10, and wherein the mineral carbonate precipitate is $CaCO_3$.

In still yet various embodiments of the disclosure the first portion comprises ~0.5% of the oceanwater introduced into the dual-pathway system.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiment of the disclosure and should not be construed as a complete recitation of the scope of the disclosure, wherein:

FIG. 8 provides a table of the concentration of major constituents of major constituents of natural seawater in accordance with the prior art.

DETAILED DESCRIPTION

Figure 1A:
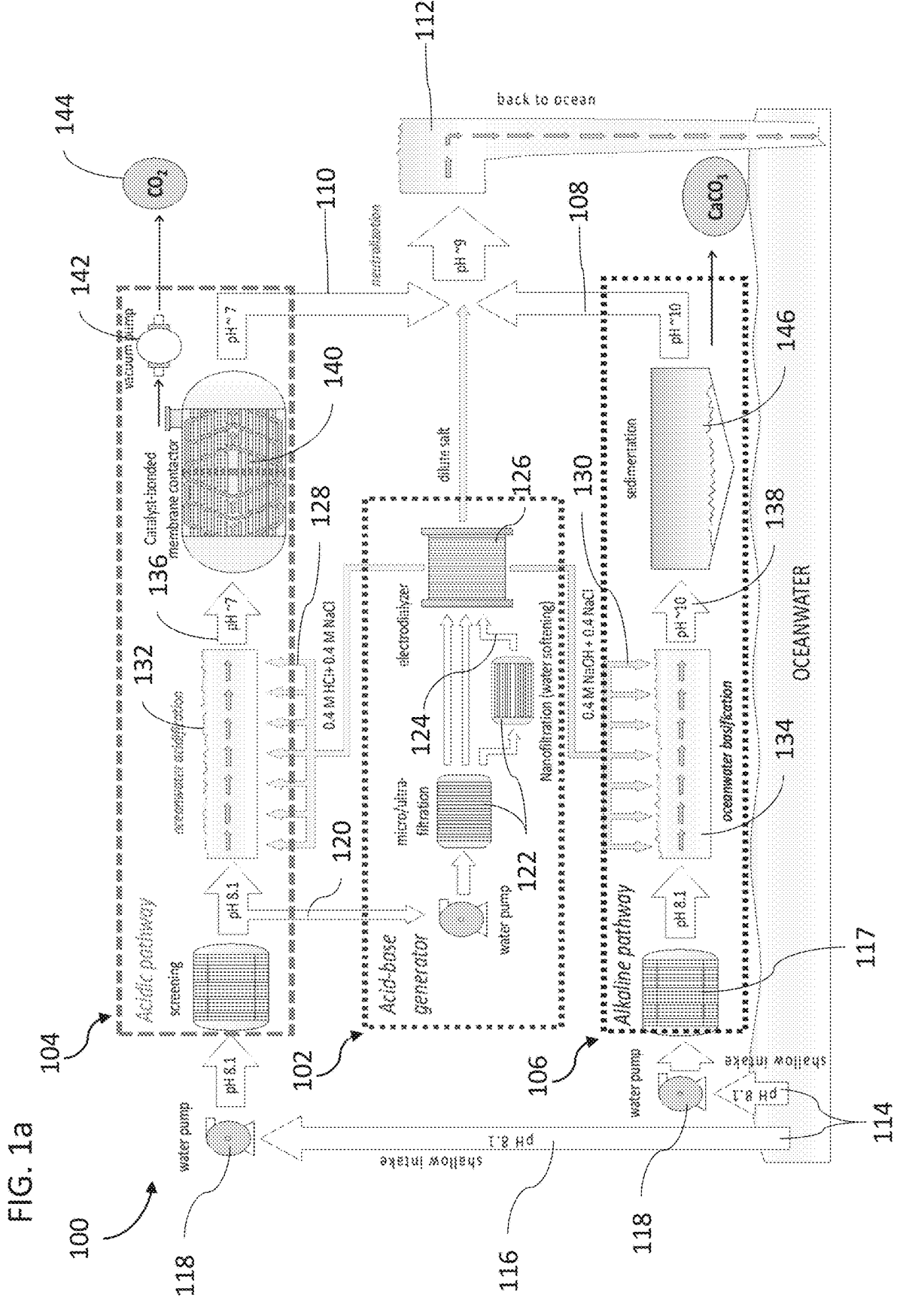
FIG. 1*a* provides a schematic illustration of a hybrid $CO_2$ capture system via electrochemical pH according to aspects of the disclosure.

It will be readily understood that the components of the embodiments as generally described herein and illustrated in the appended figures may be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

Aspects of the instant disclosure are directed to a dual-pathway system for $CO_2$ capture from oceanwater. Various aspects contemplate applications of such a system in an off-shore stand-alone facility to allow for the operation of oceanic $CO_2$ capture to be more efficient and cost effective. Aspects of the system minimize oceanwater intake costs by use of an off-shore, floating platform that intake oceanwater directly. In many aspects systems will maintain high environmental standards by containing all intermediate acidic and alkaline solutions in a closed system so that the effluent discharged back into the ocean is at a mild pH and the same salinity as the feed oceanwater, with only $CO_2$ removed. Aspects also include the combined use of acid and base produced by the electrodialyzer unit to achieve oceanwater decarbonization via gaseous $CO_2$ removal and solid $CaCO_3$ precipitates removal. According to aspects the system may be configured to require the processing of a very small fraction of the total processed oceanwater for the acid-base generation process. Aspects contemplate that dual-pathway systems in which $CO_2$ is captured from oceanwater in both the acidified and basified streams, lower the total cost for negative $CO_2$ emission at scale.

Traditional oceanwater capture involves pushing a $CO_2$/bicarbonate equilibrium toward dissolved $CO_2$ by acidifying the oceanwater via electrodialysis. The acidified stream is then passed through a liquid-gas membrane contactor, which captures the gaseous $CO_2$ from the dissolved $CO_2$ in the aqueous stream. These conventional oceanwater capture systems include challenges including: oceanwater intake and pretreatment costs; and the minimal co-location opportunities.

For land-based oceanic $CO_2$ removal systems oceanwater intake and pre-treatment dominate the cost. Based on the current and projected costs in desalination plants, the ocean intake, pretreatment and discharge for a land-based stand-alone $CO_2$ capture plant cost about $1.4M/million gallon-day, which translates to a best-case cost of $1839/t-$CO_2$. While these costs could be reduced as the technology scales, it is nearly impossible to meet the realistic cost target of <$100/t-$CO_2$ in the long term using such an approach. Decreasing the long distances for oceanwater intake, transport, and pre-treatment is critical to reduced cost of oceanic $CO_2$ removal.

With respect to desalination, the co-location of oceanic $CO_2$ removal systems with desalination plants is not considered to be scalable. While co-location of oceanic $CO_2$ removal systems with desalination plants overcomes the issue of distance, technoeconomic analyses suggest that this results in a system for oceanic $CO_2$ removal ($373/t-$CO_2$) with a best-case cost that is still far from the FOA target of <$100/t-$CO_2$. Moreover, even for the unrealistic scenario where reverse osmosis plants produce all potable water currently consumed worldwide (4.3 trillion $m^3$/yr) and all $CO_2$ is removed from that water, only 0.95 Gt-$CO_2$/yr is possible, meaning that co-location of oceanic $CO_2$ removal systems with desalination plants does not provide a viable path for scaleup to the cost target of >1 Gt-$CO_2$/yr.

Aspects of the disclosure provide a 'dual-pathway' $CO_2$ capture system that generates both acidified and alkaline water streams via an electrochemical pH swing. The system implements $CO_2$ capture in both an alkaline pathway where dissolved inorganic carbon is pushed towards $CaCO_3$ formation, as well as in a gaseous $CO_2$ capture using an electrodialyzer at high current densities from the acidified stream. Accordingly, aspects of alkaline systems are directed to methods and systems for controlling $CaCO_3$ precipitation kinetics in the basified oceanwater stream to enhance the calcite (solid phase $CaCO_3$) formation via control of pH, temperature, and crystallization kinetics in the calcite growth. Aspects of acidified systems incorporate a fast redox couple electrolyte in a unique electrodialysis architecture for oceanic $CO_2$ removal that incorporates single cell voltage and the lowest required electrochemical energy for electrodialysis. Aspects of the electrodialyzer design provide for gaseous $CO_2$ capture at high current densities from the acidified stream. Accordingly, dual-pathway systems combine basified and acidified aspects for $CO_2$ capture using the alkaline electrolyte produced in the basified stream via $CaCO_3$ formation to increase the overall $CO_2$ capture efficiency.

As shown in FIG. 1a, aspects of dual-pathway systems and methods consist of a modular on-water, stand-alone system for oceanic $CO_2$ removal. In various aspects, hybrid oceanic $CO_2$ capture systems (100) comprise, among other things three main components, an acid-base generator (102), an acidified pathway (104) for generation of gaseous $CO_2$, and an alkaline pathway (106) for generation of $CaCO_3$. As shown, the acid (108) and alkaline (110) streams are then recombined and the decarbonized oceanwater (112) released back to the ocean at a balanced pH. Each of these system aspects, their integration, and related process methods will be discussed in greater detail below. Aspects of the systems are directed to minimizing oceanwater intake costs by use of an off-shore, stand-alone design, and maintain high environmental standards by containing all intermediate acidic and alkaline solutions in a closed system so that the effluent discharged back into the ocean is at a similar pH and the same salinity as the feed oceanwater, with only $CO_2$ removed.

Accordingly, aspects of the dual-pathway system include an overall floating platform located in a saltwater body such as the ocean allowing for the vast majority of the processed oceanwater to be pumped only a short vertical distance from underneath the floating platform. In such aspects one or more intakes (114) are provided that are configured to feed untreated seawater (116) into the acidified pathway and the alkaline pathway. As shown, the intakes may include pre-processing (117) aspects including, for example, screens or other filters to prevent unwanted contaminants from entering the $CO_2$ extraction pathway. The intakes, pre-processing systems, pumps (118) to bring the water into the system and the overall dimensions and construction of the floating platform may take any suitable configuration capable of supporting and providing oceanwater to the dual-pathway system. In aspects stable continuous operation of a dual-pathways system (e.g., 84 h at 70% of initial $CO_2$ removal rate) may be accomplished with feed water consisting of only drum-screen-filtered oceanwater at the typical $CO_2$ removal pH (pH≤5), and subsequent reactivation to 95% of initial $CO_2$ removal rate. Accordingly, in various aspects of the dual-pathway system inexpensive filtration methods are sufficient to enable robust operation with minimal fouling that can be regenerated for long lifetime operation without requiring expansive and expensive water pre-treatment.

One significant advantage of such a floating pathway is the short distance (e.g., a few meters) that the system is required to move the untreated water. Decreasing the long distances for oceanwater intake, transport, and pre-treatment is one aspect of the disclosed systems that allows for reduced cost of oceanic $CO_2$ removal. As previously discussed, oceanwater intake and pre-treatment dominate the cost of land-based oceanic $CO_2$ removal systems a co-location of desalination plants is not sufficiently scalable such that it is nearly impossible to meet the target of <$100/t-$CO_2$ in the long term using such an approach.

In various aspects incoming oceanwater is directed to one of three pathways in the dual-pathway system: an acidic pathway (104), an alkaline pathway (106) and an acid-base generator (102). Aspects and elements of each of these pathways will be described in greater detail, however, it should be understood that these pathways are exemplary and each may include additional treatment or conditioning elements to improve the process.

Aspects of the acidic pathway (104) decarbonizes feed oceanwater by "pushing" and "pulling" $CO_2$ from bicarbonate via the following reactions:

$$HCO_3^-(aq) \leftrightarrows OH^-(aq) + CO_2(aq) + H^+(aq) \leftrightarrows H_2O(l) + CO_2(aq) \leftrightarrows CO_2(g) \tag{EQ. 1}$$

In such aspects, to progress the reaction in the forward direction, an increased concentration of $H^+$ "pushes" the reaction to form water by mass action and a decreased $p_{CO2}$ "pulls" the reaction to form gaseous $CO_2$ by Le Chatelier's principle. Similarly, aspects of the alkaline pathway (106) decarbonizes feed oceanwater by using the same "pushing" and "pulling" from basified oceanwater for the generation of precipitation products, including $CaCO_3$, $Ca(OH)_2$, $MgCO_3$, $Mg(OH)_2$, $SrSO_4$, $CaF_2$ and $CaSO_4$. It will be noted that while not all of these precipitation products contribute equivalently to $CO_2$ capture (such as, for example precipitation products $Mg(OH)_2$) they can be used for other applications such as cement making, etc. and as a valuable by-product in the process to lower the operation cost of the overall system.

Aspects of the dual-pathway system and method efficiently push these reactions forward by directing a fraction (120) of the total processed oceanwater through an acid-base-generator (102) where a multi-stage pre-treatment process (122) produces a purified stream of salt (e.g., NaCl (124)) that is fed to a high current density, low voltage electrodialyzer (126) for generation of HCl and NaOH, which are then fed (128/130) into the acidification (132) and basification (134) elements of the acidic and alkaline pathways. These acidified (136) and basified (138) water feedstocks are then directed to the related $CO_2$ extraction element for the relevant pathway. In the acidic pathway this extraction element comprises a catalyst-bonded membrane contactor (140) and a suitable vacuum pump (142) for exhausting the gaseous $CO_2$ (144). In the alkaline pathway this extraction element comprises a suitable sedimentation element (146) and any other apparatus necessary for the extraction of the precipitate.

Figure 1B:
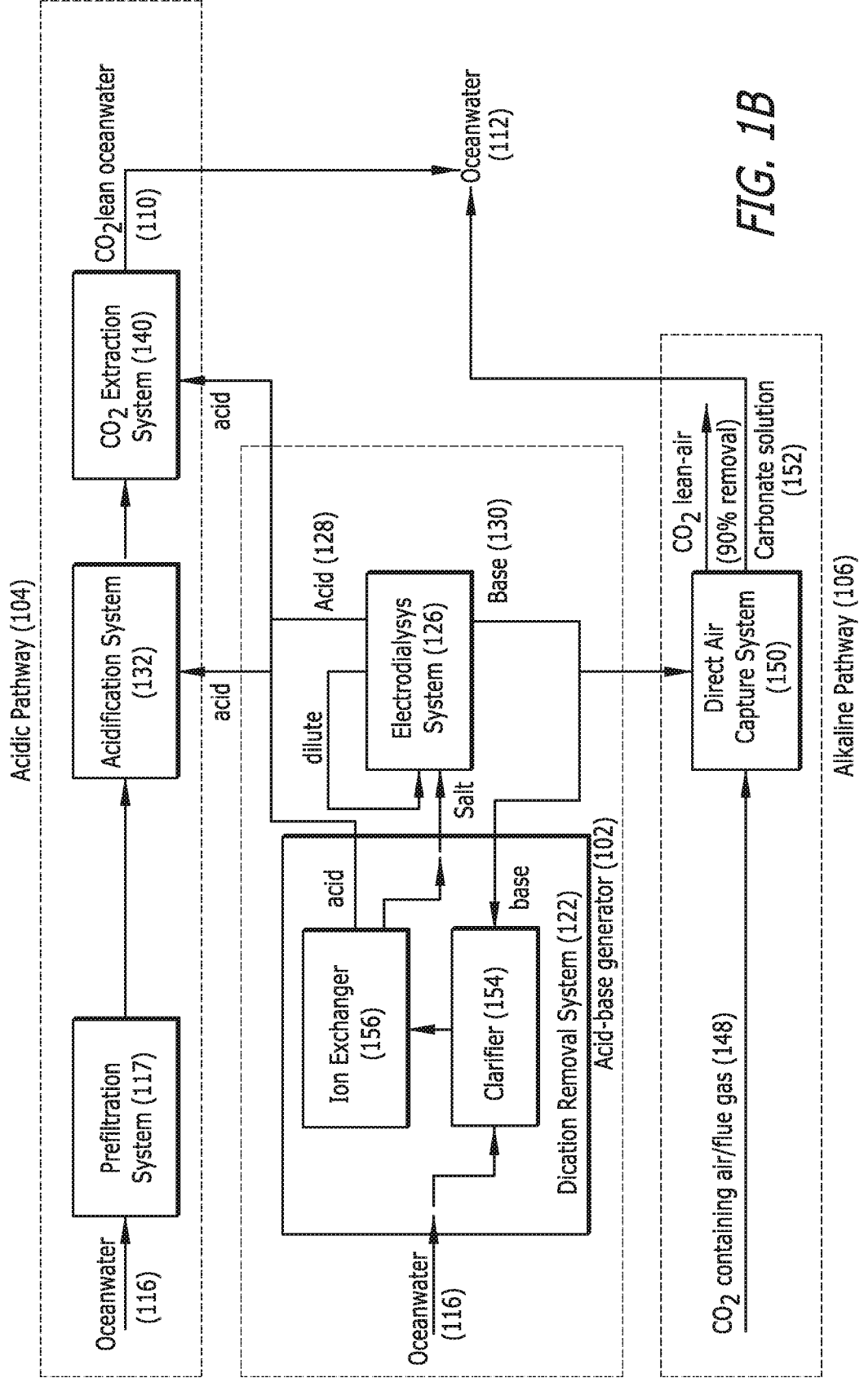
FIG. 1*b* provides a schematic illustration of a hybrid $CO_2$ capture system via electrochemical pH incorporating a direct air capture system according to aspects of the disclosure.

Although, an implementation of a dual-pathway system configured to process multiple streams of oceanwater has been discussed with reference to FIG. 1a, it will be understood that other configurations may be implemented that incorporate mixed feedstock streams. As shown in FIG. 1b, in various aspects of the dual-pathway system may incorporated many of the same systems previously described (e.g., an acid-base generator (102) and acid pathway (104) as described in FIG. 1a), but instead incorporate gas feedstocks (148) containing streams of $CO_2$. In various such aspects the gas feedstocks may include any suitable source of gas entrained with sufficient concentrations of $CO_2$ (e.g., >400 ppm), including, for example, atmospheric air or industrial waste or flue gases. Aspects incorporating gas extraction systems may incorporate any suitable direct air capture system (150). Although many such direct air capture systems may be incorporated, in various aspects the direct air capture system uses an aqueous basic solution (130) produced and provided to the direct air capture system from the acid-base generator (102) to forms $CO_2$ lean gas streams and effluents of carbonate solutions (152)(e.g., $NaCO_3$ solution), which can then be reintroduced into the $CO_2$ lean water effluent (110) from the acidic pathway to release and entrain the $CO_2$ into the output oceanwater (112).

Figure 1C:
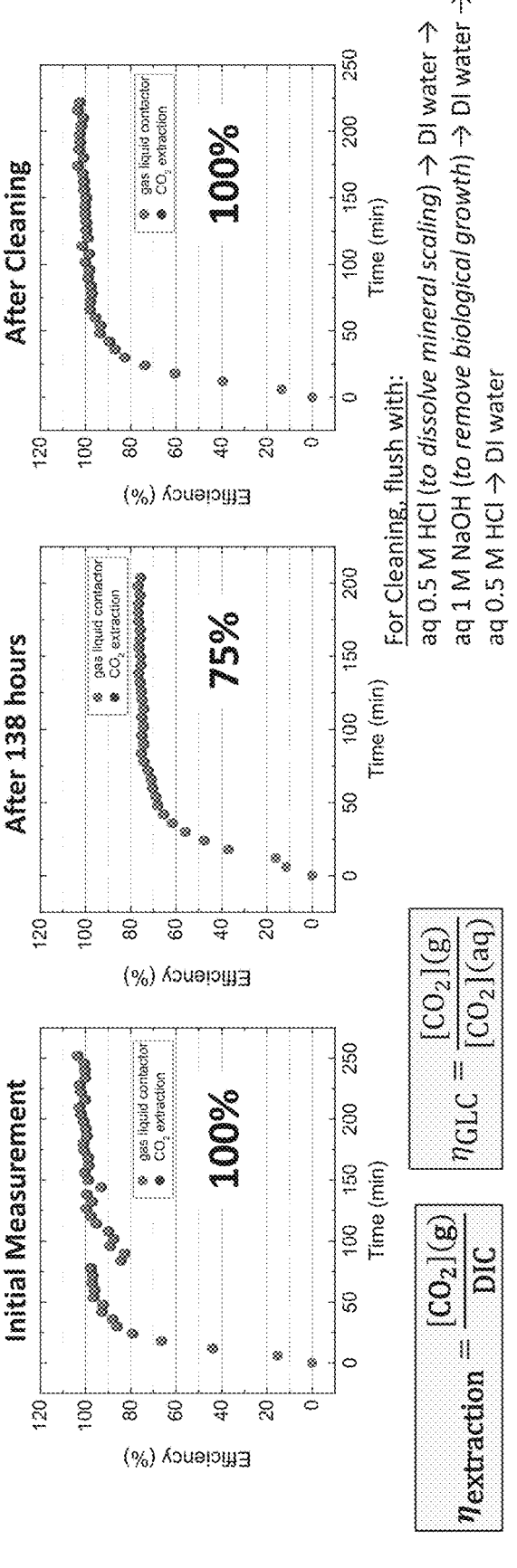
FIG. 1*c* provides data plots of the effect of regeneration on $CO_2$ extraction efficiency in the gas liquid contactors according to aspects of the disclosure.

As also shown in FIG. 1b, various aspects of the system incorporate system regeneration pathways. For example, it will be understood that the catalyst-bonded contactor membrane (140) of the acidic pathway, and the pre-treatment elements (e.g., clarifier (154) and ion exchanger (156)) may become fouled over time. In conventional systems, regeneration acids and bases must be supplied on a periodic basis to these systems to clean them, however, this requires regular resupply of the platform. In various aspects of the dual-pathway system these regenerative acids and bases may be supplied directly from the acid-base generator (102) thereby allowing for the self-contained maintenance of platform elements. In various such aspects, for example, a stream of acid may be provided to the $CO_2$ extractor element of the acidic pathway to regenerate the catalyzed contactor membrane element. Similarly, in various aspects, a base stream may be provided as the feedstock for the clarifier to precipitate out dications (for example, $Mg^{2+}$ or $Ca^{2+}$) in the oceanwater into hydroxides or carbonates, and a acid stream may be provided to regenerate the resins used in the ion exchange step to achieve efficient and effective dication removals down to <1 ppm level as the feed solution for the electrodialysis system. FIG. 1c, provides a set of data plots showing the effect of regeneration on efficiency of $CO_2$ extraction in the system. As shown, using acid and base streams from the electrodialyzer it is possible to regenerate the $CO_2$ efficiency of the system back to starting levels thereby allowing a greater duty-cycle for the overall dual-pathway system.

Figure 2A:
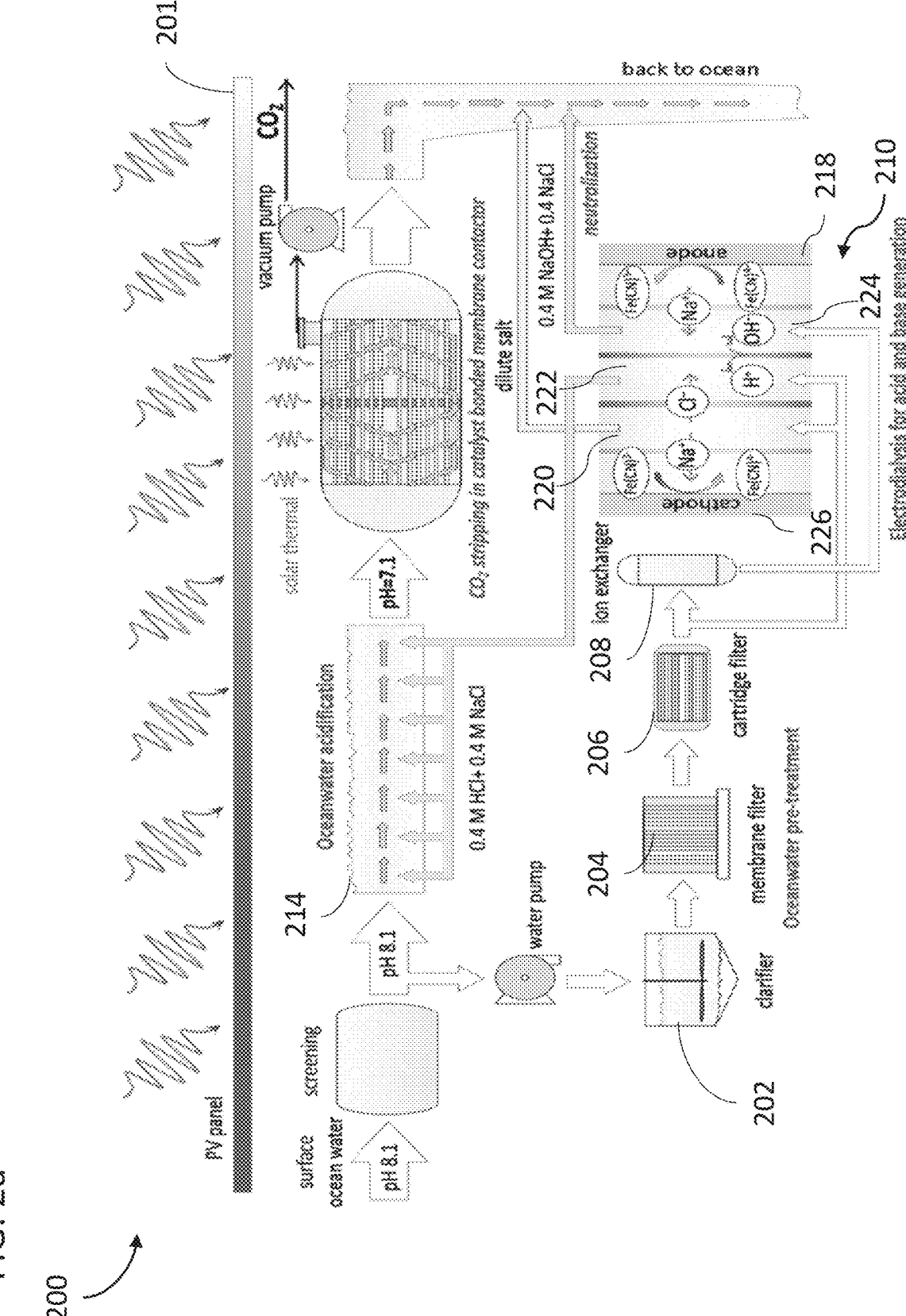
FIG. 2*a* provides a schematic illustration of an acidic pathway portion of an oceanic $CO_2$ removal system according to aspects of the disclosure.

Although the above discussion has focused on a several aspects of a dual-pathway system and methods according to the disclosure it will be understood that other aspects and elements may be incorporated as necessary or advantageous to the operation of the system and methods. For example, as shown in FIG. 2a, in various embodiments the platform (200) can receive power for running the various elements of the system and method using large area commercial floating array of solar panels (201) or other renewable or grid-assisted-renewable sources, such as off-shore wind, along with energy storage systems to achieve a sufficient capacity factor (e.g., 90% or higher) for the system.

Detailed discussions of aspects of the acid-base generator, acidic pathway and alkaline pathway are provided in the sections below and are to be read as incorporating each and every aspect and elements described in the above sections as well as in the sections to follow.

Aspects of Acid-Base-Generator Electrodialyzer

Aspects of the dual-pathway system and methods require a low-overpotential electrodialyzer operating at between 250 mA/cm² to >1000 mA/cm², a system currently unavailable in the art. Turning to the details of the acid-base-generator (102), it will be understood that a small amount of the inflow of water is diverted to a pre-treatment element (122) in the acid-base-generator (102). Although in FIG. 1a the inflow of water is shown as originating from the acidic pathway, it will be understood that incoming water from either pathway, a combination of pathways or a separate source (as shown in FIG. 1b) may be used. According to various aspects, the pre-treatment element may include any components suitable to convert the screened oceanwater into a purified stream of NaCl for use in the electrodialyzer (126) to produce streams of HCl (between 0.8M to 2.5 M) and NaOH (between 0.8M to 2.5 M) for the acidic and alkaline pathways. As shown in greater detail in FIGS. 1b and 2a, pre-treatment elements may include, dissolved air flotation clarifiers (202), micro/ultra-filters (204), cartridge filter (206), and water softening (ion exchanger) (208), among other elements. Regardless of the arrangement of specific elements in aspects a salt-splitting process is configured to provide a purified stream of NaCl and $H_2O$ to the electrodialyzer (210). The electrodialyzer then dissociates the water stream using a bipolar membrane to form $OH^-$ and $H^+$ ions that are recombined with the $Na^+$ and $Cl^-$ ions to form HCl (between 0.8M to 2.5 M) and NaOH (between 0.8M to 2.5 M) that are used introduced into the acidifier (214) and the basifier (not shown) to drive the $CO_2$ recovery reactions in the acidic and alkaline pathways.

FIGS. 1a/1b and 2a are show as producing an output of acid and base that can be used to run various aspects of the overall dual-pathway system. These systems also produce a stream of dilute solution with low salt concentration (between 0.01 to 0.1 M) after electrodialysis process (e.g., dilute). Although this dilute is shown as an effluent that is output with the rest of the effluent stream into the ocean, in various aspects (as shown in FIG. 1b) this dilute (which has already been purified by the pre-processing system (122) of the acid-base generator (102)), may be reintroduced into the electrodialyzer thus further reducing the overall volume of oceanwater that needs to be processed through the system.

In various aspects, as shown in FIG. 2a, a single cell of an electrodialyzer in accordance with the disclosure may have a suitable active surface area for electrodialysis of purified oceanwater at between 250 mA/cm² to >1000 mA/cm². In such aspects each cell of the electrodialyzer may consist of an anode compartment (218), dilute salt compartment (220), acid compartment (222), base compartment (224) and cathode compartment (226). Conductive plates (e.g., Pt-coated Ti plates) may be used as the cathode and the anode and a solution containing one-electron electrochemically reversible redox couple may be used as the anolyte and the catholyte. The thickness and spacing of membranes, as well as redox couple type and concentration may be varied to achieve a target voltage in the system (e.g., 1.6 V).

Figure 2B:
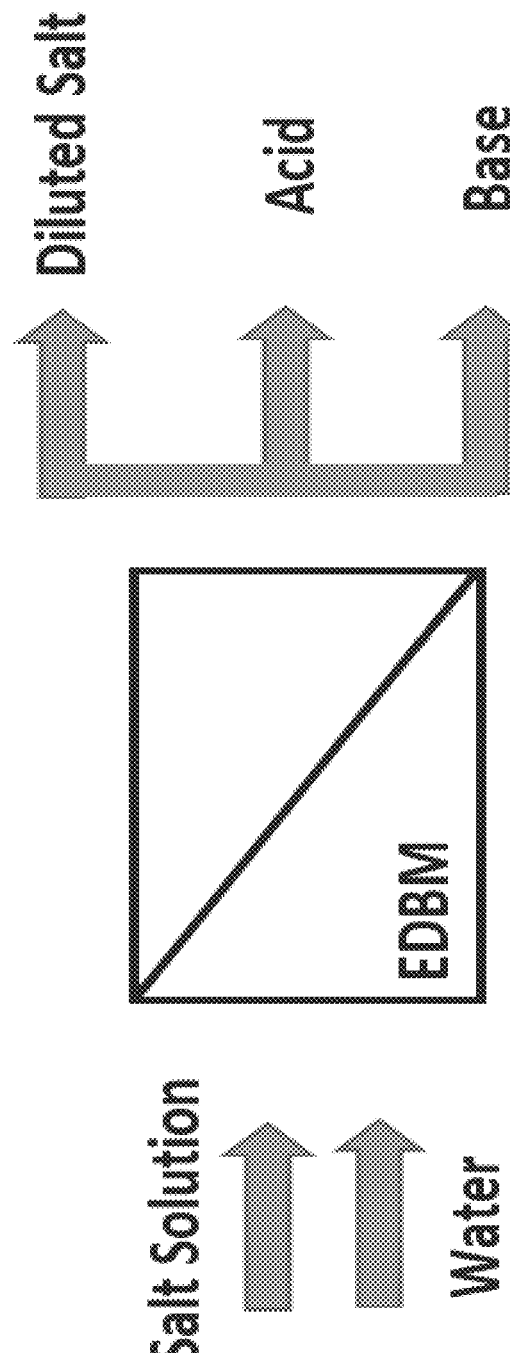
FIG. 2*b* provides a schematic illustration of an electrodialysis with bipolar membranes process according to the prior art.

The basic aspect of electrodialysis with bipolar membranes (EDBM) is the combination of electrodialysis for salt separation with electrodialysis water splitting for the conversion of a salt into its corresponding acid and base. The bipolar membranes enhance the splitting of water into protons and hydroxide ions. This is shown schematically in FIG. 2b. Bipolar membranes are a special type of layered ion exchange (IX) membrane where the two polymer layers one is only permeable for the anions and the other only for cations. Unlike membrane processes EBM isn't applied for separation purposes but to get a reaction in the bipolar junction of the membrane where the anion and the cation permeable layers are in direct contact. Water splits into hydroxide ions and protons. The produced hydroxide ion and proton are separated by migration in the respective membrane layer out of the membrane.

$$2H_2O \leftrightarrow H_3O + +OH— \qquad \text{(EQ. 2)}$$

Unlike water splitting at electrodes during electrolysis, no gases are formed as a side product to this reaction, nor are gases used. Electrodialysis with bipolar membranes (EDBM) can replace electrolysis with water splitting at the electrodes and can also have a wider variety of applications.

Despite the apparent advantages of EDBM systems, conventional salt-splitting technologies, such as those proposed for use in the acid-base-generator of the disclosure have a number of issues, the first of which is that electrodialyzers to produce acid/base are generally very expensive to run and maintain. Currently, the main drivers of the high cost of electrodialyzers are the high cost of membrane materials and the efficiency of water dissociation at the bipolar membrane (BPM) interface. Inefficient rates of water dissociation necessitate high operating voltage (>1.3 V/cell) while diffusional mass transport limits for water to the BPM interface result in low operating current density (<200 mA cm²). According to aspects of the dual-path system according to the instant disclosure, acid-base-generators are demonstrated incorporating low-overpotential electrodialyzers that operate at high current densities (between 250 mA/cm² to >1000 mA/cm²). Significantly lowering the overpotentials and increasing the current densities diminish the size of the electrodialyzer, thus lowering overall system cost, and particularly the high associated costs for producing acidic and basic solutions required to push the CO₂ release reactions in the acidic and alkaline pathways of the dual-pathway system.

Figures 3A, 3B:
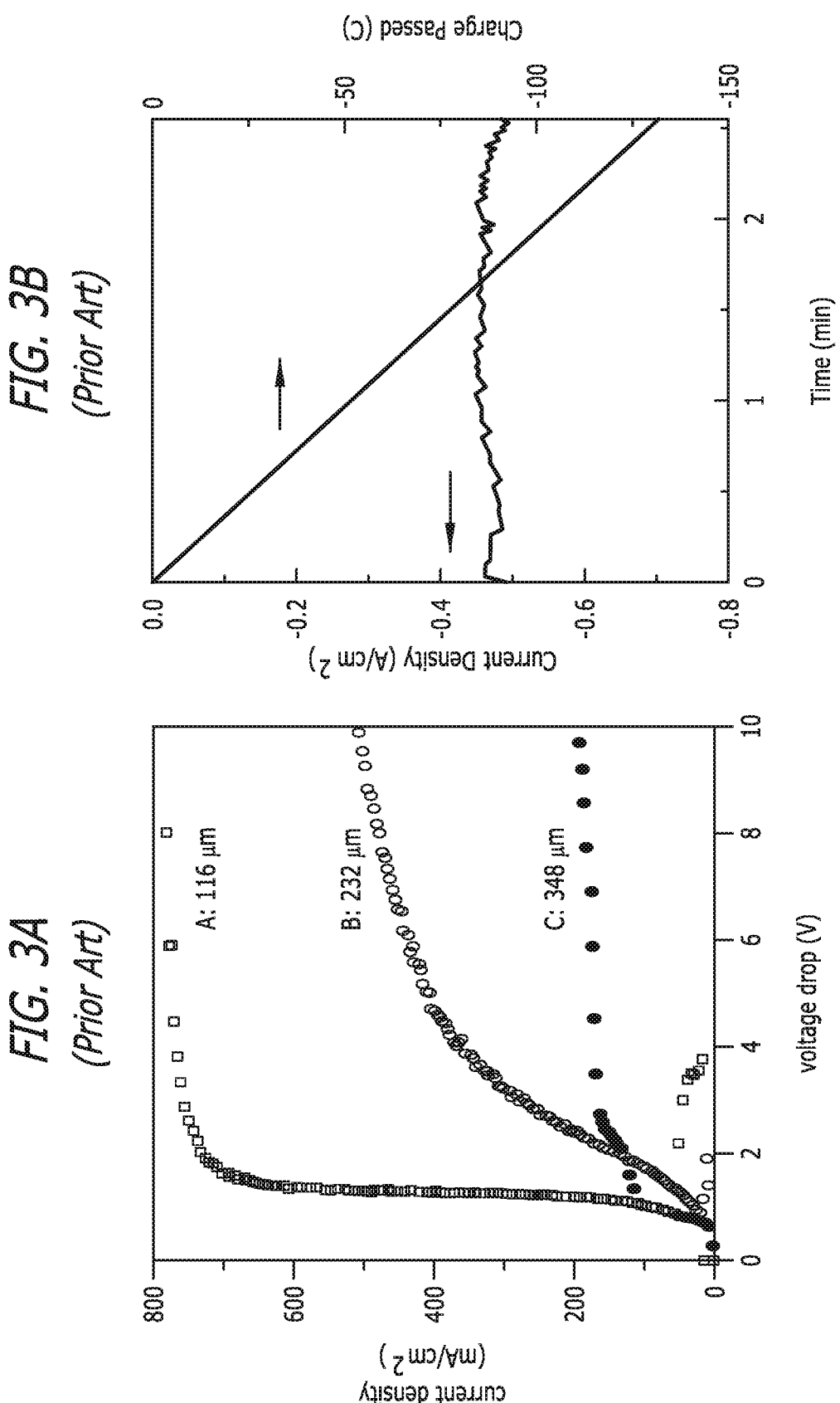
FIG. 3*a* provides a data plot of high current density from a BPM in 0.5 M NaCl (aq) according to the prior art.
FIG. 3*b* provides a data plot showing >0.5 A cm−2 from a BPM with ~10 μm thick AEM in 1 M KCl (aq.) according to aspects of the disclosure.

Aspects of the dual-pathway system and method implement tailored BPM materials to increase the operating current density from typical values of ~100 mA cm² to between 250 mA/cm² to >1000 mA/cm². Limiting BPM current densities may arise from dehydration of the BPM interface during high rates of water dissociation (WD). Studies have shown that thinner membranes can mitigate this dehydration. As shown in FIG. 3a, an operating current density of ~800 mA cm² was reported for a 116 μm thick membrane, and data using a ~60 μm thick BPM with a thin AEM layer (~10 μm) achieved >500 mA cm² (FIG. 3b). Accordingly, in various aspects of low-overpotential/high current density electrodialyzers according to the disclosure, BPMs containing covalently bound catalysts are provided to increase the reversible rate of water dissociation and formation (WDF: $H_2O \leftrightarrows H^+(aq)+OH^-(aq)$). In such electrodialyzers, membrane-bound WDF catalysts within the BPM lower the electrodialyzer operating voltage by increasing the WDF reaction exchange rate. In various aspects a thin cationic (or anionic) layer (5-50 μm) may be synthesized and bound directly onto a robust commercial cationic-exchange membrane CEM (or anionic-exchange membrane AEM) to further improve water transport to the BPM interface to achieve between 250 mA/cm² to >1000 mA/cm². Thin membrane layers do have the potential to cause increased co-ion crossover, thus lowering electrodialysis efficiency. Accordingly, in aspects tri-layer BPM architectures are implemented to prevent dehydration at BPM interfaces. Specifically, tri-layer BPMs (FIG. 4) may be provided such that co-ion crossover is minimized, and active water feed from dilute salt may be used to hydrate the BPM interface. Results of studies conducted on electrochemical architectures have successfully demonstrate H₂O₂ generation and CO₂ reduction at high rates. Such BPMs enable operating current densities of between 250 mA/cm² to >1000 mA/cm², instead of the typical ~200 mA cm² when limited by water transport to the BPM junction.

Figure 4:
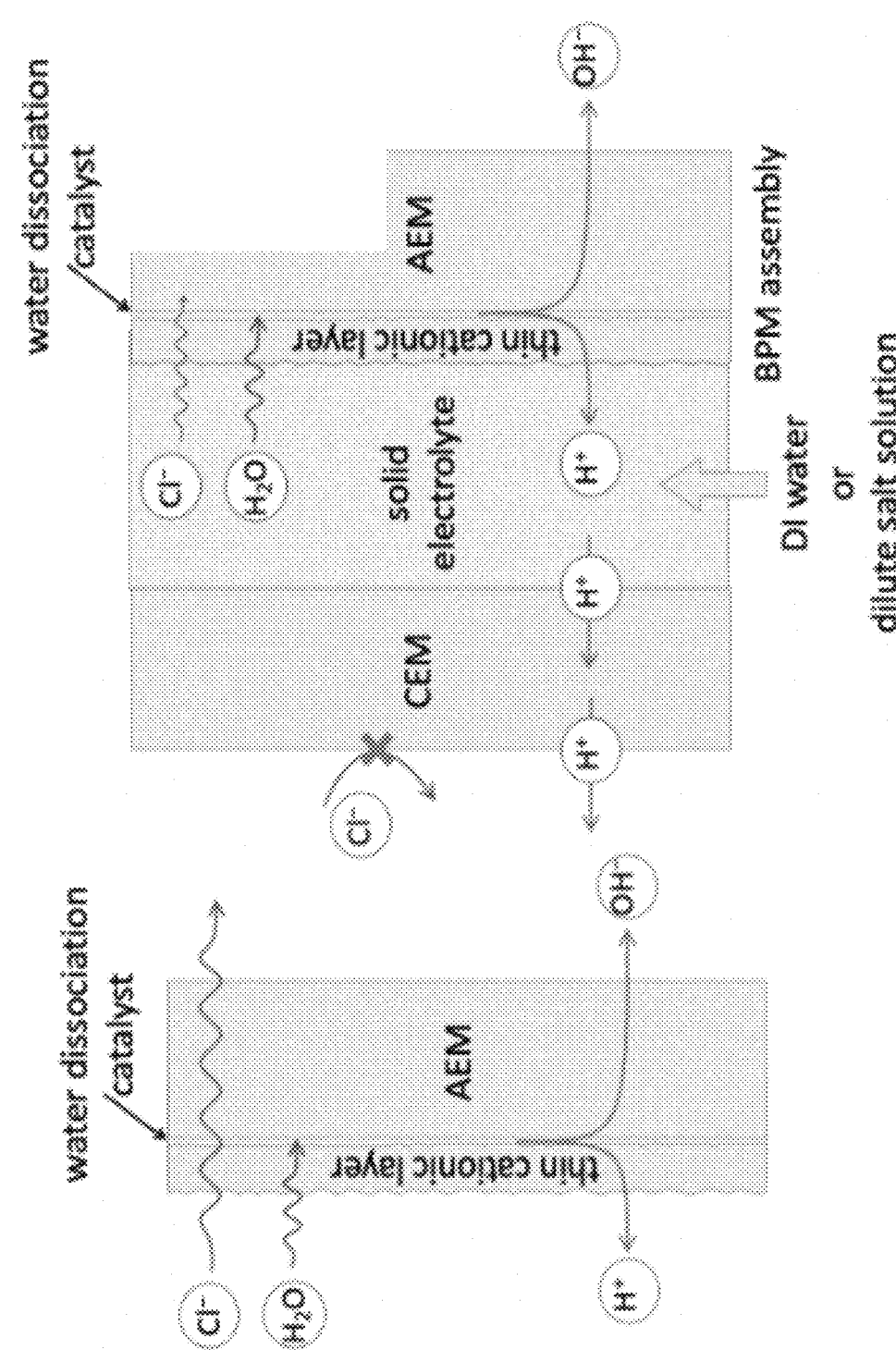
FIG. 4 provides a schematic Illustration of a BPM structure with a thin cationic layer, and a BPM with a tri-layer structure according to aspects of the disclosure.

Turning to specific materials and configurations of BPMs contemplated for dual-path systems according to the disclosure, in various aspects BPMs incorporating a thin anionic (cationic) layer may include materials such as, for example, X37 or XA9 ionomer (e.g., Nafion or sulfonated polyphenyl sulfone). Such BPMS may be attached, for example, to <50 μm thick commercial CEMs (AEMs). As discussed, one potential risk is increased ionic crossover due to the potential low selectivity of the casted thin layer, which will lower the efficiency of the electrodialyzer. In various aspects tri-layer BPM structures may integrate a porous solid electrolyte, such as, for example, a polymer ion conductor or solidified gel, as shown in FIG. 4. Such a porous solid electrolyte may then be infiltrated, via flow, with dilute salt or deionized water. It will be understood that in such aspects, commercially available CEMs and AEMs with a thickness of ~50-100 μm used in the BPM structure will ensure low crossover rates, while an active water feed at the BPM interface may be implemented to circumvent water loss. In various implementations, styrene-divinylbenzene copolymer microspheres functionalized with sulfonic acid groups for cation (H⁺) conduction may be integrated at the BPM interface. In such aspects the interconnected surface provides for rapid ionic conduction, while micrometer-scale pores allow sufficient hydration for high current density operation.

Figures 5A, 5B:
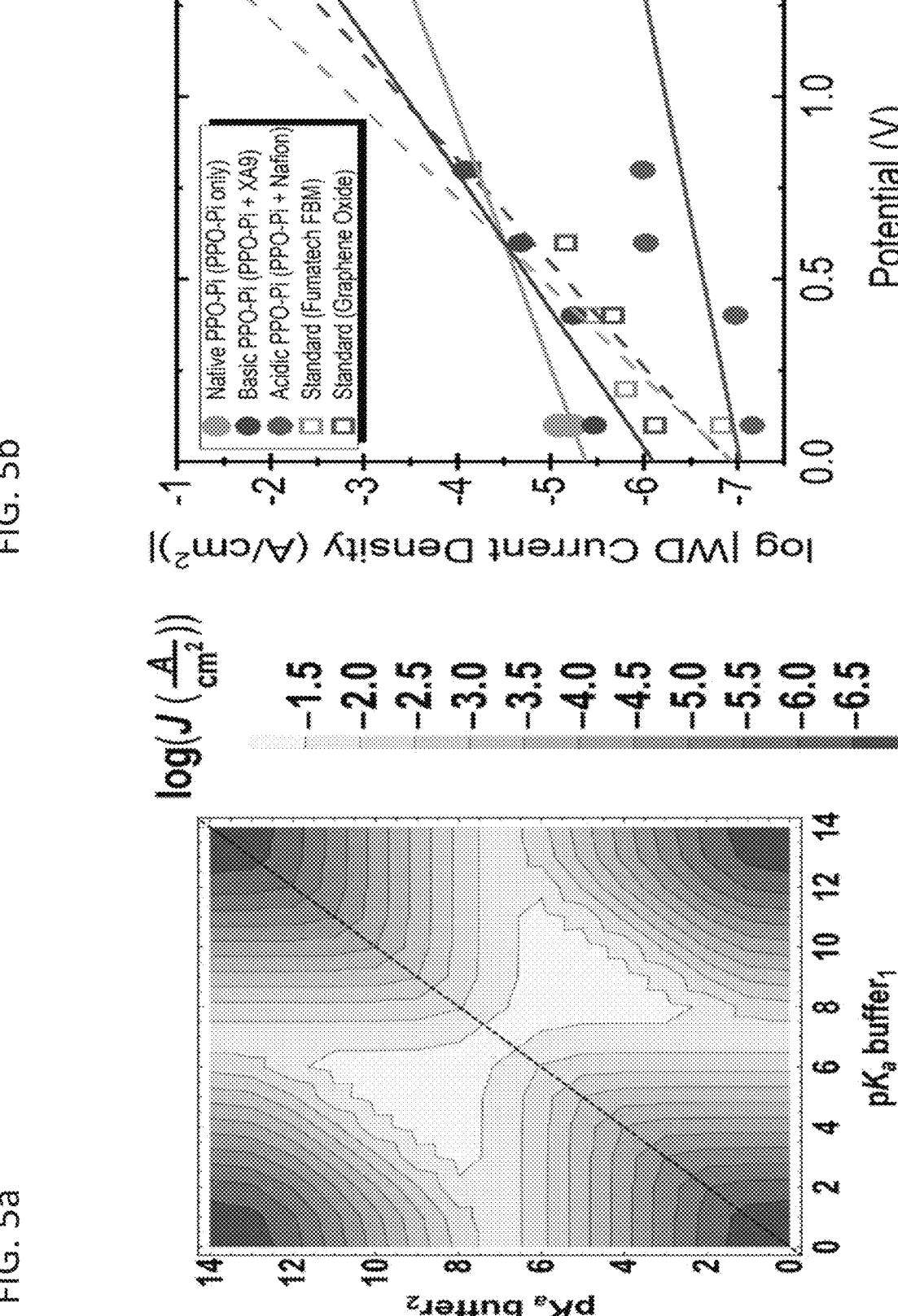
FIG. 5*a* provides numerical modeling results at pH 7 for 0.5 M of each of two buffering groups (two $pK_a$ values) indicating current densities for WDF at zero bias are largest (50 mA/cm$^2$) for one buffer with $pK_a$=7 (dashed line) or several combinations of two buffers (lightest colors) according to aspects of the disclosure.
FIG. 5*b* provides a plot of experimental data for a series of novel tri-layer BPMs with PPO-P$_i$ middle layer ($pK_a$≈7) when separating 0.5 M salt solutions illustrating that at low overpotential (<0.4 V) BPMs according to aspects of the disclosure (circles) outperform state-of-the-art commercial Fumatech FBM and graphene oxide (open squares).

As previously discussed in addition to high current density, aspects of electrodialyzers according to the disclosure are directed to bipolar membranes for low voltage operation. In developing such low voltage electrodialyzers aspects of the disclosure consider the electrostatics, chemical reactions, and migration and diffusion of solution species that are critical to achieve high WDF catalysis rates at the BPM interface, and to couple electric-field-enhanced WD for an additional driving force for ion transport to the BPM interface. As observed in previous experiments and computations, buffering groups with $pK_a=7$ and local pH=7 result in the most rapid rates of chemically catalyzed WDF. This is described by the Shockley-Read-Hall mechanism for the most rapid rate of generation and recombination of mobile charges, where half-filled midgap states maximize this rates: $pK_a=pH=0.5\times(pK_a(H_2O(I))+pK_a(H^*(aq)))=7$. Aspects of the disclosure recognize some flexibility may be achieved in desired $pK_a$ values by using two buffering groups (FIG. 5a). These maximum current densities are for experimentally possible concentrations of 1 M buffering groups and may, be further enhanced by the local electric fields inherent when pH gradients exist across the BPM. For tri-layer designs, such as those described above, that better facilitate water transport, the pH gradients and electric fields are necessarily smaller, necessitating effective chemical catalysis of WDF.

Accordingly, in various aspects of low-overpotential/high current density electrodialyzers according to the disclosure, modified BPM polymers are implemented that contain buffering groups with $pK_a\approx7$, which are the most effective at catalyzing WD. As shown in FIG. 5b, initial experimental results obtained using poly(phenylene oxide)-modified polymers containing phosphonate groups with $pK_a=7$ indicate that WDF is improved both in the absence (at ~0 V) and presence (>0 V) of electric fields enhancing WDF by an 10× over the state-of-the-art. Accordingly, in many aspects buffering groups such as, for example, phosphonates may be incorporated onto BPMs to catalyze WDF in solution, between pH=8.1 and pH=4. In various aspects these chemical functionalities are covalently bonded to polymer backbones. In the same or other aspects, polymers may also be modified with polar and/or charged groups to enhance hygroscopicity for enhanced hydration and water transport. While much of the data presented relates to PPO, it will be understood any polymer which is highly scalable, cost-effective, and that may be produced at large scales may be used according to aspects, such as, for example, poly(propylene oxide), polypropylene, and polyethylene. In certain aspects BPMs may be manufactured from monolithically cast polymers to enhance robustness. In such aspects the chemical modification may be performed from opposing directions using an H-cell. Moreover, membranes according to aspects of the disclosure may be interfaced to catalyst layers using fluorinated ionomers to mitigate degradation from water oxidation side reactions.

As previously summarized, studies performed (FIG. 5a) indicate that using two buffering groups can result in a synergistic enhancement of WDF that lessens the strict requirement of $pK_a\approx7$. Accordingly, in various aspects buffering groups may be used that span several units beyond 7. In the presence of significant electric-field-enhanced WD, $pK_a=3.5$ buffering groups are particularly promising. To relax the constraint of a single buffering group with $pK_a\approx7$, various aspects of catalyzed BPMs co-modify polymers using two buffering groups with $pK_a\approx7$ (measured in solution). In some aspects metal-oxide nanomaterials, which are known to contain several protonatable groups, may be implemented. Aspects of BPMs using such nanomaterials can mitigate the risk associated with $pK_a$ values measured in solution changing when incorporated into polymers. Other aspects may incorporate electric-field enhancement of WD, which is mostly beneficial at large electric-field intensities often correlated with large overpotentials, which is not be deleterious to the dual-pathway system of the disclosure due to its weak reliance on voltage.

Monolithic membrane structures with covalently bound buffering groups according to aspects of the disclosure are inherently robust in comparison to the state-of-the-art and aid in the formation of atomically thin space-charge regions for maximum electric-field enhancement of WD. This allows for the use of these robust materials over extended periods of operation, which is critical to meet the FOA target of <$100/t-CO_2 in the long term.

Aspects of electrodialyzers according to the disclosure also implement cell and cell stack architectures to minimize polarization losses associated with WD at the BPM interface. In many electrodialyzers according to the disclosure stacks of various configuration may be employed to minimize polarization losses and allow for operation at high current densities. we will make advances in three areas. Cells and multi-cell stacks, may be optimized for channel width, flow rates and salt composition of input/output streams all of which depend highly on the operating current density. In various aspects such cell parameters are optimized for the lowest possible polarization loss. In many aspects continuum-level multiphysics modeling may be used to identify conditions that minimize polarization losses and optimize high current density stack operation. In various aspects 2D multi-physics simulation tools may be used to optimize the cell architectures for high current density operations. Such models may provide the optimal flow rates and cell dimensions which are dictated by the species concentrations, the target pHs and membrane properties at high current densities. For example, a high flow rate at the dilute salt channel (AEM/CEM) may be required in various aspects to minimize the resistive loss across that channel as $Na^+$ and $Cl^-$ ions start to deplete and increase the cell resistance.

Aspects of an Acidic Pathway

As previously discussed with respect to FIGS. 1a/1b and FIG. 2, in various aspects the dual-pathway system implement an acidic pathway comprising a source of screened oceanwater (116) (pH~8.1) in fluid communication with an acidification element (132) into which a source of HCl (128) is fed to acidify the oceanwater to a pH below the starting pH of ~8.1. This acidified oceanwater (136) is then directed into a $CO_2$ extraction element (140), which for the acidic pathway is a suitable catalyst-bonded membrane contactor. This membrane contactor then produces a flow of gaseous $CO_2$, which may be extracted via a vacuum pump or other suitable apparatus and directed to post extraction storage or processing as a feedstock, and a flow of decarbonized acidified oceanwater, which is mixed with a flow of alkaline oceanwater and returned to the ocean.

Although methods of extracting CO from a feedstock of acidified oceanwater are known, currently acidified oceanwater with pH=4 is required to help drive gaseous $CO_2$ removal. In these conventional systems, a high surface area gas stripping unit is required to efficiently produce gaseous $CO_2$ from oceanwater, by decreasing diffusional mass transport limits for dissolved $CO_2$ whose concentration is only ~2 mM in acidified oceanwater. However, this requires that oceanwater, which has an approximate pH 8.1, be first acidified to pH=4 in order to increase rates for interconversion of bicarbonate and $CO_2$ so that it does not limit the rate of gaseous $CO_2$ removal from membrane contactors, which are often used to strip gaseous $CO_2$ from oceanwater. The problem arises that, by only using acid generated by the electrodialyzer to adjust the pH to ~4, required for effective use of state-of-the-art gas stripping units for oceanic $CO_2$ removal, it is not possible to meet the long term i-CO$_2$/yr to meet the long-term cost target of <$100/t-CO$_2$. This is because in such a system the majority of the energy required in system is used to power the electrodialyzer unit to create the necessary pH swings.

Accordingly, aspects of the dual-pathway system decrease the required volume of acid/base needed for oceanic CO$_2$ removal by implementing a membrane contactor for effective removal of CO$_2$ from pH~4 to pH~7 oceanwater in the acidic pathway. As a result, the vast majority of the processed oceanwater needs only to be pumped a short vertical distance from underneath the floating platform, followed by an addition of small amounts of HCl to drive CO$_2$ removal from rather high-pH oceanwater (pH=4 to 7) in the catalyst-containing gas-liquid contactor within the acidic pathway, thereby improving the overall system efficiency.

Figure 6A:
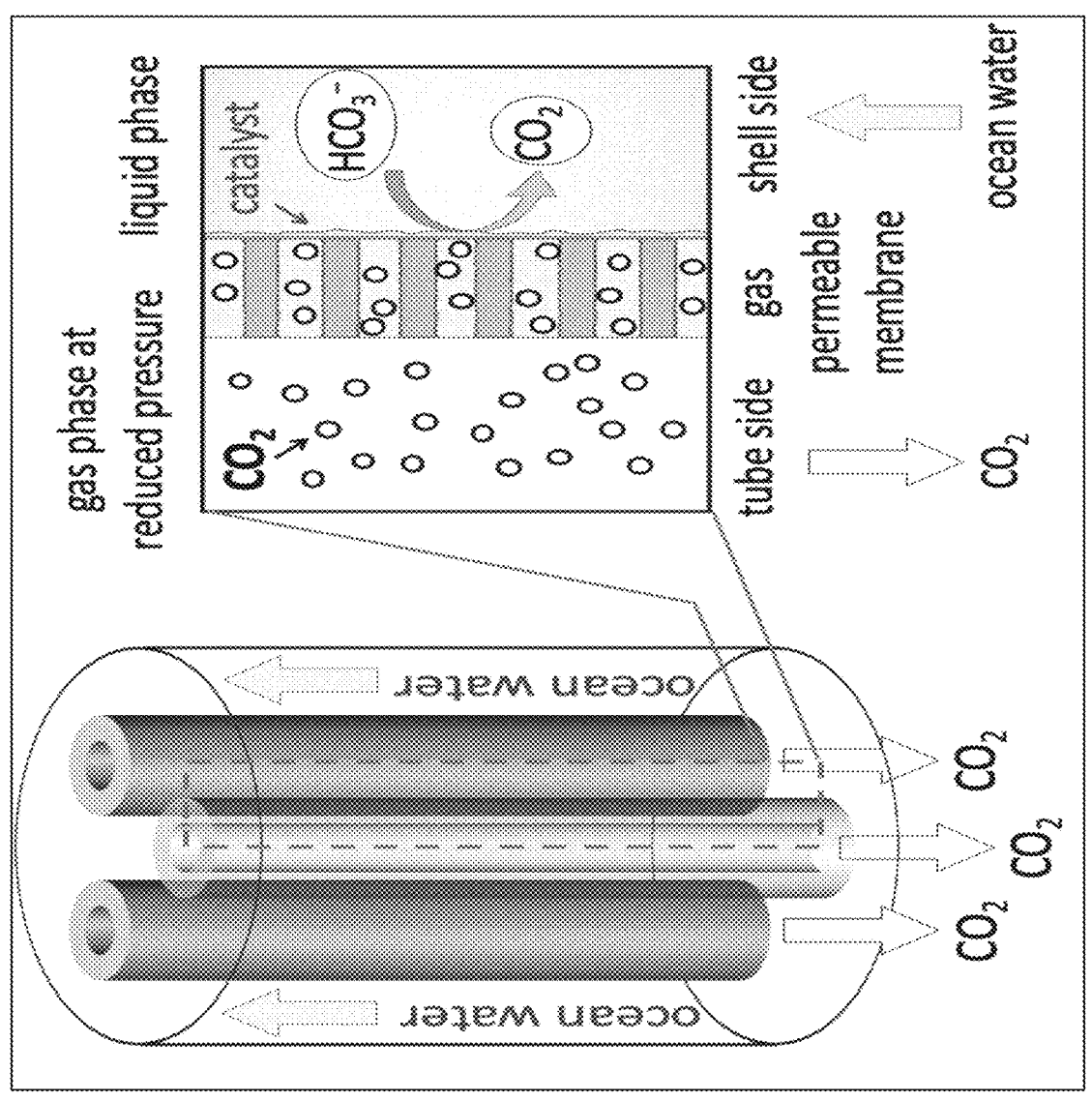
FIG. 6*a* provides a schematic of catalyst-bonded membranes in a gas-liquid contactor according to aspects of the disclosure.

Specifically, in various aspects of the disclosure atom-efficient tailored catalysts are bound to gas-liquid membrane contactor materials (FIG. 6a) leading to significantly increase rates for interconversion of bicarbonate and CO$_2$. Specifically, in various aspects a membrane contactor operating at pH~4 to ~7 for effective oceanwater CO$_2$ is provided via the use of WDF catalysts and bicarbonate dehydration and formation (BDF) catalysts as synthetic carbon anhydrase mimics to significantly accelerate the inherently sluggish rates for interconversion of bicarbonate and CO$_2$. In some such aspects gas-liquid membrane contactors using catalyst-bonded hollow fiber membrane bundles (FIG. 6a) may be implemented. In aspects incorporating such catalyst-bonded hollow fiber membrane bundles, the spatial location of catalysts, flow rates of acidified oceanwater in hollow fiber materials, oceanwater pH and gas partial pressure in the membrane contactor are all relevant to the efficiency of the overall system. In addition, CO$_2$ removal efficiency and mass transport in the bundled fiber materials are factors.

Accordingly, in many aspects chemical grafting or mixing with typical membrane/fiber materials, such as, for example, polypropylene hollow fibers, into the membrane contactor may be used to incorporate catalyst buffering groups (as described above) at the shell side of the fiber materials. Owing to the short diffusional distance in the membrane contactor and fast interconversion rate between bicarbonate and CO$_2$, the oceanwater may behave as a reservoir of dissolved CO$_2$ within the hollow membrane fiber material. In various aspects of the disclosure, hollow fiber modules in which microporous hollow fibers are woven into fabric bundles are implemented. In such implementations, catalyst layers may be coated at the shell-side of the fiber materials so that acidified oceanwater is in contact with catalysts of enhanced surface area compared to planar structures (as shown schematically in FIG. 6b, inset). While certain membrane and catalyst combinations are described above, it will be understood that other combinations may be employed according to aspects of the disclosure.

For example, in various aspects metal-oxide nanomaterial catalysts (which as previously discussed may be used to increase rates of water dissociation in BPMs in the acid-base generator) may also be added to membrane/fiber materials as composites to improve the rate of conversion in the BDF. Regeneration strategies including rapid pulse flushing using the dilute salt water and acid/base from the electrodialyzer stack and solar-thermal heating for reactivation of the membrane contactor may also be implements according to aspects of the disclosure to extend the lifetime of the catalyzed gas-liquid membrane contactor materials. In addition, while flows through the system are shown going only in line with the fiber bundles it will be understood that in some aspects baffles may be incorporated on the fiber exterior introducing flows counter to—and perpendicular to—the fibers optimizing gas-liquid contactor operation.

Figure 6B:
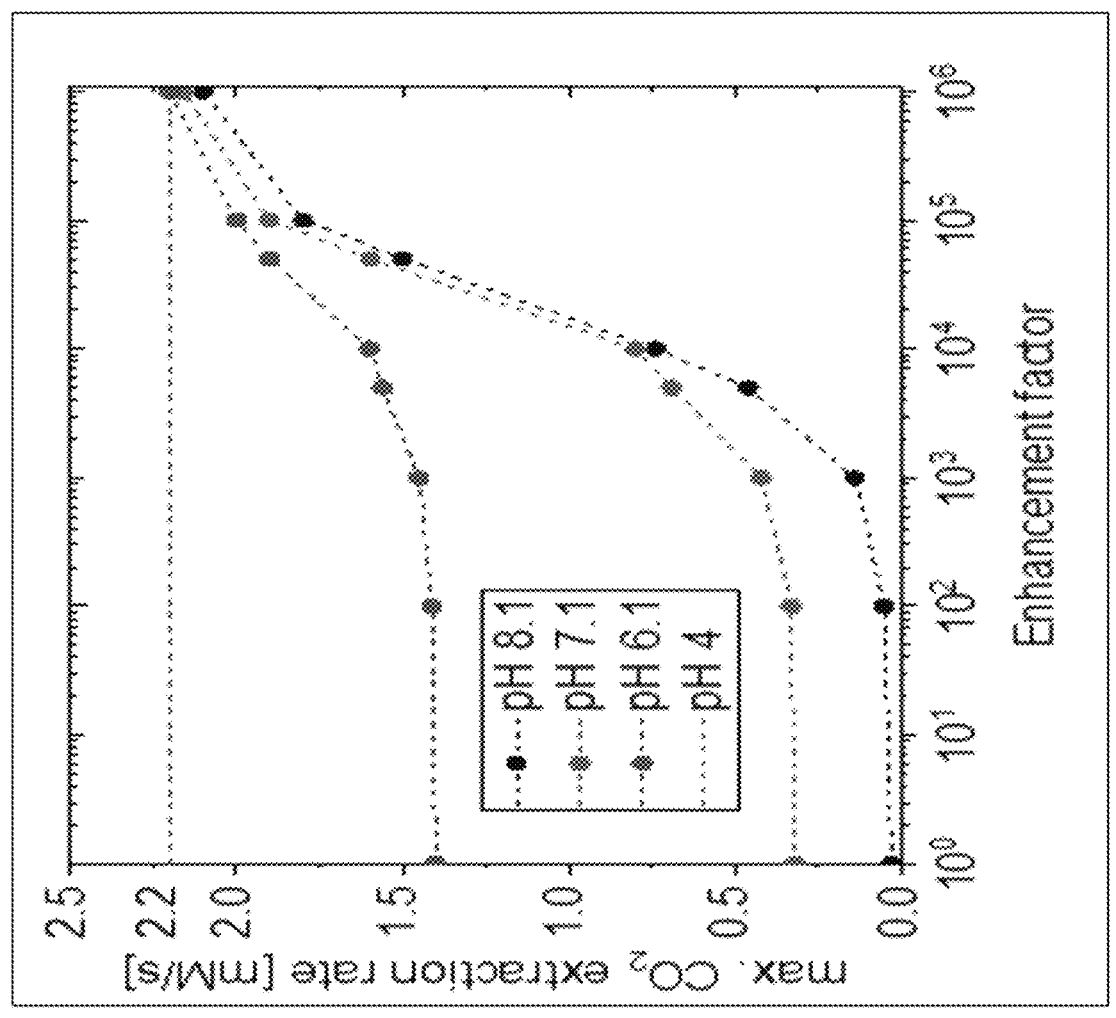
FIG. 6*b* provides a plot of modeling results for attainable $CO_2$ removal rates at different pH values for the acidified oceanwater, which in the absence of any acidification has pH≈8.1 according to aspects of the disclosure.

Regardless of the specific design, catalyst-coated membrane materials according to aspects of the disclosure enhance rates for interconversion of bicarbonate and CO$_2$. As a result, instead of pH≈4, a much higher pH (pH 4 to 7) can be used to efficiently remove CO$_2$ from oceanwater, even with small reduced pressure gas flow streams. As shown in FIG. 6b, enhancing the rates of the forward and reverse reactions for interconversion of bicarbonate and CO$_2$ by a factor of $10^6$, in accordance with aspects of the disclosure, yields maximum CO$_2$ removal rates at pH values of 6.1, 7.1, or even 8.1 (native oceanwater) similar to oceanwater at the conventional threshold of pH=4. In turn, efficient removal of CO$_2$ from high pH oceanwater (pH >4 to >7) requires much less acid and base to be produced by the electrodialyzer. For instance, using oceanwater at pH=7.1, only $\frac{1}{360}^{th}$ of the oceanwater needs to be pre-treated, which will significantly lower electrodialyzer costs. In various aspects of the dual-pathway system, ~0.5% of the incoming water volume needs to be converted to acid/base, and with moderate concentration (<0.5 M); and this requires pre-treatment of ~0.5% of the total processed oceanwater for use in the electrodialyzer stack. Moreover, as previously discussed with respect to FIG. 1b, in various aspects the acid-base generator may be configured to recycle the dilute effluent from the electrodialyzer back into the electrodialyzer such that an even smaller proportion of oceanwater must be pre-treated, thus further reducing the overall energy input needed to run the electrodialyzer system.

Turning to the buffering catalysts themselves, it will be understood that aspects of the disclosure contemplate various buffering groups, whose pK$_a$ values span ~3.5-10.0 and over a variety of concentrations and pH conditions, and for 1-3 buffering group combinations which are shown to relax pK$_a$ constraints to achieve rapid rates of WDF (FIG. 5a). Analyzing the kinetics of how CO$_2$ is released from a small-volume aqueous solution containing bicarbonate and different buffering groups may be used to identify specific species. This allows for the identification of optimal combinations in terms of tradeoff in stability and effectiveness in solution, followed by optimization when covalently bound to ionomer and small polymer groups that are soluble in water, and ultimately when covalently incorporated into ion-exchange membranes and gas-liquid membrane contactors. Polymer polarity may also be tuned via chemical modification to enable specificity for CO$_2$ through variations in equilibrium constant for absorbing CO$_2$ from oceanwater, such that moderate binding strengths are attained allowing for the speed up conversion of dissolved CO$_2$ into gaseous CO$_2$ under minimal vacuum or flow conditions.

Figure 7:
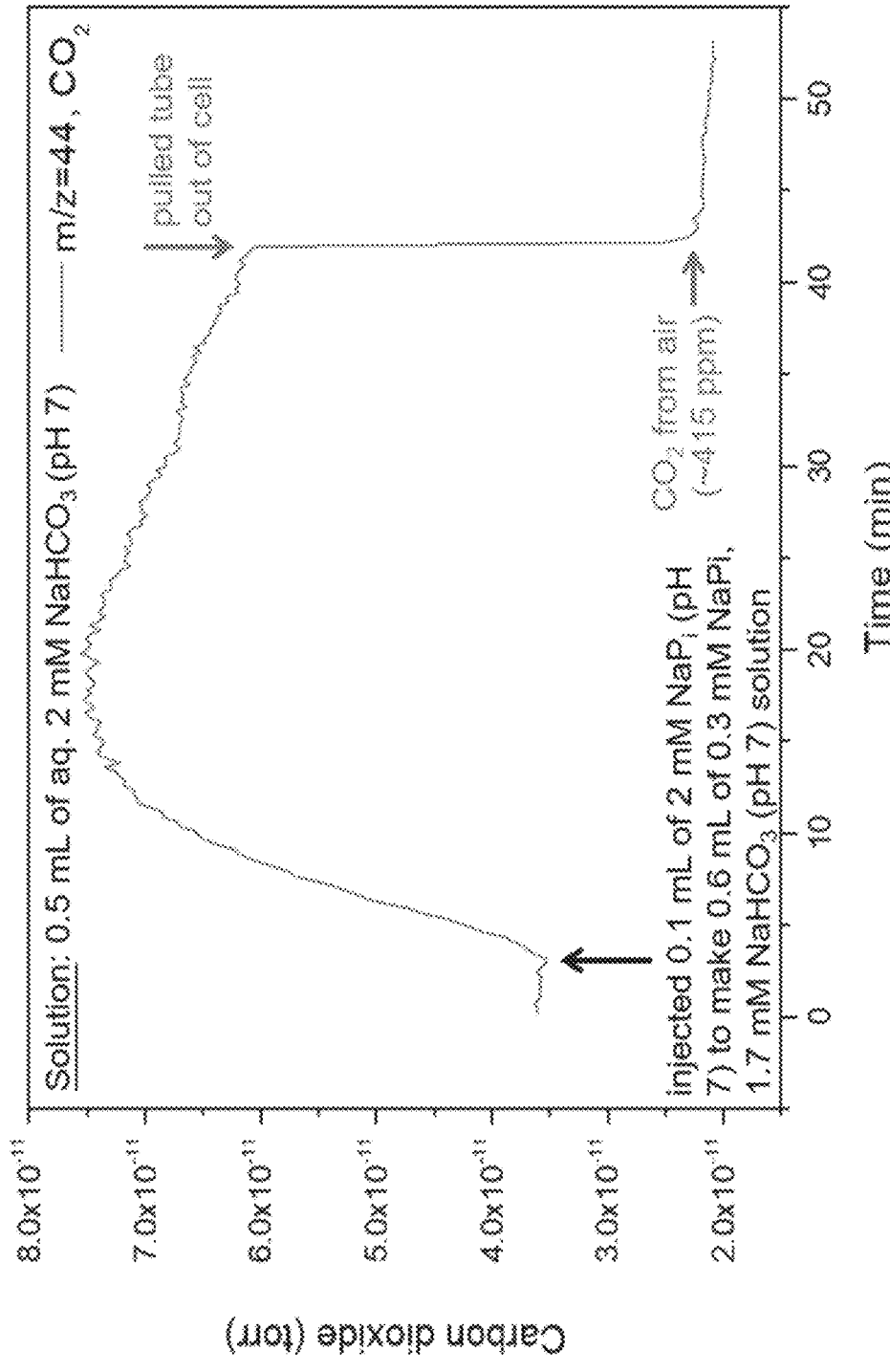
FIG. 7 provides mass spectrometry data for $CO_2$ (m/z=44) before and after addition of sodium phosphate WDF/BDF catalysts to $NaHCO_3$ solution (pH 7), according to aspects of the disclosure.

In various aspects, the inherently slow rate of CO$_2$ dissolution to form bicarbonate may be overcome using carbonic anhydrase, one of the most effective known biological catalysts of any reaction, with a catalytic rate enhancement on the order of $10^7$. This reaction proceeds via a hydroxylated intermediate that ultimately transfers OH$^-$ to CO$_2$ via a rate-limiting step of WD. Because catalysts increase the rate of forward and reverse reactions, aspects of such a carbonic anhydrase system are used to enhance rates of oceanic CO$_2$ removal according to the disclosure. Models indicate that buffering groups with pK$_a$=7 exhibit the most rapid catalysis of WDF, the active site of carbonic anhydrase contains a Zn(II)-OH cofactor whose conjugate base has pK$_a$≈6. Therefore, buffering groups—including metal cations like Zn(II)—and polymers developed for the WDF studies may be used for the catalysis of BDF according to aspects of the instant disclosure. FIG. 7 provides experimental results measuring $CO_2$ released from a 2 mM $NaHCO_3$ solution via inline mass spectrometry upon addition of a phosphate ($pK_a \approx 7$, 2) WDF catalyst, according to aspects of the disclosure. As shown, catalyst systems according to aspects of the disclosure enhance the rate for interconversion of bicarbonate and $CO_2$ via BDF significantly even at the target pH of 4 to 7.

In addition, the use of a catalyzed BDF membrane, aspects of the system may incorporate other elements to enhance $CO_2$ release. For example, one issue that can arise is that the conversion of dissolved $CO_2$ into gaseous $CO_2$ may be slow. According to aspects of the disclosure, the BDF catalysts may be disposed at the gas/liquid interface via covalent bonding to polymers to help disrupt interfacial water hydrogen-bonding networks and decrease surface tension leading to increased gaseous $CO_2$ release. Moreover, catalytic rates for overall BDF may be further enhanced in aspects of the disclosure by increasing local temperature, which will also serve to lower $CO_2$ solubility. In aspects of many systems according to the disclosure high-efficiency photo-voltaics are utilized (see discussion of FIG. 2), in such systems infrared radiation may be transmitted through commercial bifacial solar cells and harvested by an infrared radiation absorbing photonic layer that can then be used to locally heat the membrane contactor to further facilitate $CO_2$ release.

In various aspects, as will be described in greater detail below the gaseous $CO_2$ captured from the gas-liquid contactor may be used as a feedstock in various industrial processes thereby increasing the economic benefits of the system. However, flows of $CO_2$ captured from the gas-liquid contactor may contain other impurities such as $H_2O$, $O_2$, and $N_2$, and depending on the pH swing required for effective $CO_2$ release, even small amounts of HCl due to the high concentration of $Cl^-$ in oceanwater. To separate dissolved gases besides $CO_2$, aspects of the membrane contactor may be configured such that no catalyst buffering groups exist near its inlet, thus initially resulting in rapid $O_2$ and $N_2$ release. By first flowing oceanwater through regions of the membrane contactor that do not contain BDF catalysts, $O_2$ can be purged, such that in subsequent catalyst-containing regions, $CO_2$ release will mostly only be accompanied by water vapor generation. Downstream of the catalyst-free region the acidified degassed oceanwater will then encounter a buffer-catalyst-coated region, facilitating release of $CO_2$ as well as $H_2O$ and HCl impurities. In various aspects these remaining impurities may be separated using moderate swings in temperature and/or pressure at a centralized location. Ultimately, impurities will be reintroduced to the flow stream, plus addition of alkaline oceanwater, so that the effluent is only decarbonized oceanwater, as shown and described in relation to FIGS. 1a/1b. In addition, in various aspects membrane anti-fouling and subsequent decontamination may be performing using periodic gas purging processes and/or addition of excess acid/base to prolong the duty cycle of the BDF membranes.

Aspects of the Alkaline Pathway

As described above and shown in FIG. 1a, in various aspects the dual-pathway system, according to embodiments, further comprises an alkaline pathway (106) wherein an incoming flow of screened oceanwater is flowed through a basification element (138) in which a feedstock of NaOH (130) produced in the acid-base-generator (102) is introduced to raise the pH of the incoming oceanwater from ~8.1 to ~10. The basified water feedstock (138) is then introduced into a sedimentation element (146) wherein precipitation products are collected. The remaining alkaline water is then recombined with the acidic water such that a natural pH water effluent of ~8.1 is reintroduced into the environment.

The transformation of $CO_2$ into a precipitated mineral carbonate through a mineral carbonation route is considered a promising option for carbon capture and storage (CCS) since the captured $CO_2$ can be stored permanently. Aspects of the disclosure incorporate this process into the alkaline pathway of the dual-pathway system.

Possible precipitation products from oceanwater mineral carbonate precipitation reactions, including $CaCO_3$, $Ca(OH)_2$, $MgCO_3$, $Mg(OH)_2$, $SrSO_4$, $CaF_2$ and $CaSO_4$ are all incorporated into aspects as these different precipitates may be accessed at different temperatures, pHs and salinities. FIG. 8 includes the major ions and their relevant concentrations in the oceanwater showing the availability of ions in oceanwater for the various precipitation reactions.

In configuring the alkaline pathway according to aspects of the disclosure, the water dissociation reaction kinetics, $CO_2$/bicarbonate/carbonate acid base reactions and their reaction rates, as well as the boric acid reactions in oceanwater are considered. For example, the following two reactions may be used to describe the $CO_2$/bicarbonate equilibrium:

$$CO_2 + H_2O \underset{k_{1-}}{\overset{k_{1+}}{\rightleftharpoons}} H^+ + HCO_3^- \qquad \text{(EQ. 3)}$$

$$CO_2 + OH^- \underset{k_{2-}}{\overset{k_{2+}}{\rightleftharpoons}} HCO_3^- \qquad \text{(EQ. 4)}$$

with $k_f$ and $k_b$ representing the forward and backward rate constant, respectively, for each reaction. The temperature and salinity dependence of all equilibrium constants also needs to be considered. For example, the $K_w$ for water dissociation follows:[2]

$$\ln K_W = 148.96502 - \frac{13847.26}{T} - 23.6521 \ln T + \qquad \text{(EQ. 5)}$$
$$\left( \frac{118.67}{T} - 5.977 + 1.0495 \ln T \right) \sqrt{S} - 0.01615 S$$

where T is the oceanwater temperature and S is the oceanwater salinity. Using such calculations, it is possible to determine and thus control the preferential precipitates when the pH of the basified stream is changed from 8.1 to 12 with oceanwater at different temperature and salinity. As for the precipitation, calculated and experimentally measured rate constants for growth and nucleation as well as supersaturation ratio and induction time for nucleation may also be considered to predict various precipitation products.

An understanding of the kinetics of the various precipitation products from oceanwater is important because while adjustments could be made to favor the production of most of them, not all of them lead to the same level of efficiency in $CO_2$ capture. For example, an important feature of calcium carbonate precipitation is the polymorphicity of the product. While the formation of mixtures of rhombic calcite and spherical vaterite, and the needlelike aragonite have been reported under various experimental conditions, for the purpose of $CO_2$ capture and extraction in the form of solid precipitates, these precipitation products will work equally well as long as the precipitation kinetics are fast enough to achieve high capture efficiency with the given flow rate of oceanwater. On the other hand, other precipitation products, in particular, $Mg(OH)_2$ with a very low Ksp of $1.8 \times 10^{-11}$, if preferentially precipitated, will consume hydroxide ions in the basified stream that were produced from the bipolar membrane based electrodialzyer, hence lowering the overall energy efficiency and raising cost for $CO_2$ capture from oceanwater.

Accordingly, aspects of the disclosure are directed to operational relevant conditions to optimize calcite crystal formation. According to various aspects of the disclosure the pH of the basified water is made to be ~10 to 11 to most efficiently access $CaCO_3$ precipitates. This may be counter-intuitive as increasing the pH of the basified stream above a pH of ~10 would increase the concentration of the carbonate ions for $CaCO_3$ precipitation, but at the same time, it also increase the formation of $Mg(OH)_2$. Accordingly, aspects of the invention incorporate thermodynamic calculations in the above-mentioned model such that an optimal pH range for preferential $CaCO_3$ precipitation (e.g., ~pH 10 to 11) is implemented within the basification element.

Aspects of the alkaline pathway may also incorporated seeded crystal growth to control precipitation of $CaCO_3$. Given the nature of oceanwater processing at a large scale, homogeneous seeding using molecular or polymeric additives are not feasible unless those seeds can be re-used. In various aspects of the disclosure, $CaCO_3$ seeds, such as vaterite or calcite crystals or relatively concentrated salt solutions derived from them, all of which will be produced within the hybrid system, to accelerate the rate of overall $CaCO_3$ precipitation may be implemented. Other heterogeneous seeding methods may also be implemented according to aspects, such as using fine mesh and pointed substrates. Small quantities of dissolved organic matter present in natural oceanwater may also have an effect on the kinetics of $CaCO_3$ precipitation for $CO_2$ capture and thus strategies to optimize the presence or absence of such organic matter may also be implemented. In summary, by controlling the pH, temperature and various seeding strategies in aspects of the dual-pathway system, the kinetics for $CaCO_3$ precipitation and energy efficiency for $CO_2$ capture in the basified stream may be optimized.

Figure 9:
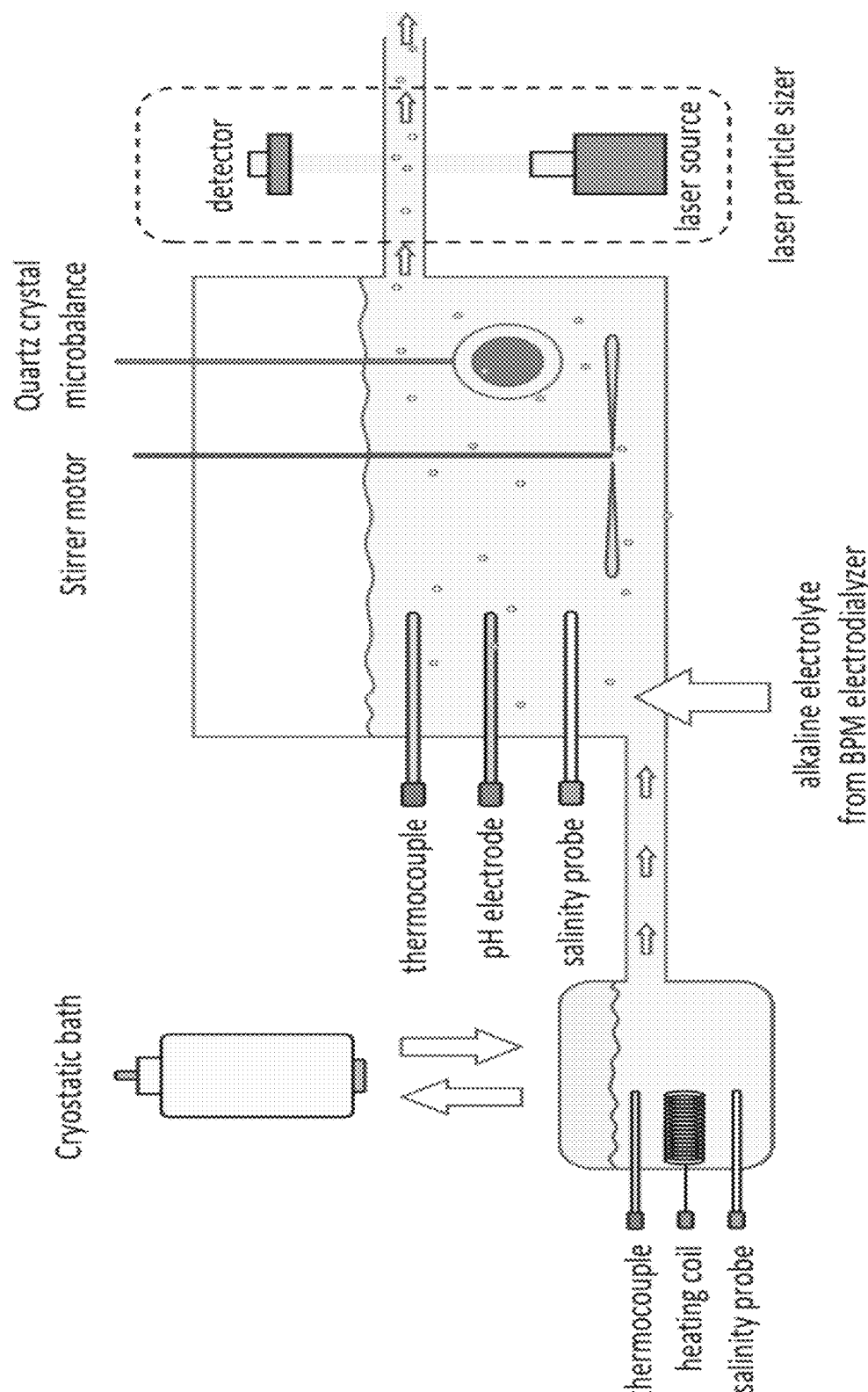
FIG. 9 provides a schematic illustration of an apparatus to characterize the precipitation rates and particle sizes in the basified stream according to aspects of the disclosure.

Quantitative characterization of the solid precipitation kinetics in the basified stream, according to aspects of the disclosure may be determined using an apparatus such as that provided in FIG. 9. As shown, in the device electrochemical quartz crystal microbalance measurements will be used for real-time monitoring of precipitation kinetics. In-line particle sizer may also be used to monitor the formation of suspended precipitates in the basified stream in real time. In addition, the temperature, pH and salinity of the basified stream both in the reactant chamber and the reaction chamber may be continuously monitored by thermometry, pH monitoring and salinity measurements, respectively, while SEM and EDX may be used to further analyze the chemical composition of the precipitation products.

In addition to this carbonate precipitate pathway, as discussed with respect to FIG. 1b, in various other aspects of dual-pathway systems, the alkaline pathway may use a gas feedstock that incorporates a direct air capture system that captures $CO_2$ from the gas feedstream using an aqueous solution with ionic concentrations of roughly 1.0 M OH⁻, 0.5 M $CO_3^{2-}$, and 2.0 M Na+. In such aspects the alkaline pathway produces an output stream of $CO_2$ lean gas and a carbonate solution. The configuration of the direct air capture system may take any suitable form, but in various aspects it may comprise a contactor that brings feedstock gas in contact with the alkali capture solution. Capture of $CO_2$ from the feedstock gas occurs at the surface of the solution, and any suitable structure may be used to increase the contact area, e.g., by flowing the gas feedstock and solution together across a high surface area element. It will be understood that aspects may include any suitable contactor design.

Economic Aspects of a Dual-Pathway System

According to aspects of the disclosure an off-shore, stand-alone system for efficient and cost-competitive removal of $CO_2$ from oceanwater is provided. Three specific aspects of the system significantly lower the cost for $CO_2$ removal, as discussed in the sections above: i) co-location on or near a body of salt water; ii) a low-overpotential electrodialyzer that operates at high current densities (between 250 mA/cm² to >1000 mA/cm²), and iii) a novel membrane contactor that exhibits unprecedented rates for $CO_2$ removal from only slightly acidified oceanwater (pH≈4 to 7). These aspects minimize energy devoted to: i) water pumping; ii) salt-splitting, in which ~0.5% of the water volume is converted to acid/base, and with moderate concentration (<0.5 M); and iii) water pre-treatment of ~0.5% of the total processed oceanwater for use in the electrodialyzer stack. Application of such the dual-pathway system enables the process to meet the <$100/t-$CO_2$ cost target at a projected scale of Gt-$CO_2$/yr. Aspects of the design also achieve an unprecedented second law efficiency of 50% (or 0.46 MWh/t-$CO_2$), and an estimated embodied emission of <2% of the lifecycle captured emissions. Moreover, aspects of the dual-pathway system are environmentally and ecologically friendly because acidification and subsequent basification of the oceanwater are performed in a closed system, so that the only effluent released back into the ocean is decarbonized oceanwater with the same salt level as at the intake.

Although specific embodiments of the invention have been described and illustrated, the invention is not to be limited to the specific forms or arrangements of parts so described and illustrated. The scope of the invention is to be defined by the claims appended hereto and their equivalents.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

What is claimed is:

1. A dual-pathway system for $CO_2$ capture comprising:
a platform disposed adjacent a source of oceanwater;
an acid-base-generator in fluid communication with the source of oceanwater comprising:
  a purification apparatus configured to convert a first portion of the oceanwater into a feedstock of NaCl, and
  at least one electrodialyzer in fluid communication with the purification apparatus and incorporated a bipolar membrane configured to convert the feedstock of NaCl into a HCl feedstock and a NaOH feedstock;
an acidic $CO_2$ removal system in fluid communication with the source of oceanwater comprising:
  an acidification element in fluid communication with the HCl feedstock and configured to produce an acidified oceanwater feedstock from the oceanwater, and
  a catalyst-bonded membrane contactor in fluid communication with the acidification element and a vacuum system to extract gaseous $CO_2$ from the acidified oceanwater feedstock and output a decarbonized acidified oceanwater effluent to an output;
an alkaline $CO_2$ removal system in fluid communication with a source of fluid entrained $CO_2$ and in further fluid communication with the NaOH feedstock and configured to produce a $CO_2$ lean effluent and a carbonate; wherein the alkaline $CO_2$ removal system is in fluid communication with the fluid entrained $CO_2$, which comprises a source of $CO_2$ containing gas feedstock and comprises:
  a direct air capture element in fluid communication with the NaOH feedstock and the $CO_2$ containing gas feedstock configured to produce a $CO_2$-lean gas effluent and a carbonate solution; and
  wherein the output mixes the decarbonized acidified oceanwater effluent and the carbonate solution to entrain the $CO_2$ within the carbonate into the decarbonized acidified oceanwater effluent for release into the environment.

2. The dual-pathway system for $CO_2$ capture of claim 1, wherein the alkaline $CO_2$ removal system is in fluid communication with the source of oceanwater and comprises:
a basification element in fluid communication with the NaOH feedstock and configured to produce a basified oceanwater feedstock from the oceanwater, and
a sedimentation element in fluid communication with the basification element to collect mineral carbonate precipitates from the basified oceanwater feedstock and output a decarbonized basified oceanwater effluent to the output; and
wherein the output mixes the decarbonized acidified oceanwater effluent and the decarbonized basified oceanwater effluent to form a mixed oceanwater effluent having a pH approximately equivalent to the pH of the source of oceanwater for release into the environment.

3. The dual-pathway system for $CO_2$ capture of claim 1, wherein the acidified oceanwater feedstock has a pH range between pH~4 to PH~7.

4. The dual-pathway system for $CO_2$ capture of claim 2, wherein the basified oceanwater feedstock has a pH of around 10, and wherein the mineral carbonate is $CaCO_3$.

5. The dual-pathway system for $CO_2$ capture of claim 2, wherein the oceanwater and mixed oceanwater effluent have a pH of around 8.

6. The dual-pathway system for $CO_2$ capture of claim 1, further comprising at least one pre-processing element disposed between the source of oceanwater and the acid-base generator, the acidic $CO_2$ removal system and the alkaline $CO_2$ removal system to screen the oceanwater.

7. The dual-pathway system for $CO_2$ capture of claim 6, wherein the pre-processing element comprises a drum-screen filter.

8. The dual-pathway system for $CO_2$ capture of claim 1, wherein the purification apparatus comprises one or more of the elements selected from the group consisting of dissolved air flotation clarifiers, micro/ultra-filters, cartridge filters, and water softening ion exchangers.

9. The dual-pathway system for $CO_2$ capture of claim 8, wherein the purification apparatus comprises at least a clarifier and an ion exchanger, and wherein the clarifier is in fluid communication with the HCl feedstock and the ion exchange is in fluid communication with the NaOH feedstock.

10. The dual-pathway system for $CO_2$ capture of claim 1, wherein the electrodialyzer is configures to operate at a current density between 250 mA/cm$^2$ to 1000 mA/cm$^2$.

11. The dual-pathway system for $CO_2$ capture of claim 1, wherein the bipolar membrane comprises a catalyzed ionic layer bound directly onto one of either a cationic-exchange membrane or an anionic-exchange membrane.

12. The dual-pathway system for $CO_2$ capture of claim 11, wherein the ionic layer has a thickness between 5-50 μm.

13. The dual-pathway system for $CO_2$ capture of claim 11, wherein the bipolar membrane is a trilayer structure comprising at least three elements selected from the group consisting of porous solid electrolytes, cationic-exchange membranes, and anionic-exchange membranes.

14. The dual-pathway system for $CO_2$ capture of claim 11, wherein the catalyzed ionic layer comprises at least one buffering group with a pKa of approximately 7.

15. The dual-pathway system for $CO_2$ capture of claim 14, wherein the catalyzed ionic layer comprises at least one buffering group covalently bound to a polymer backbone.

16. The dual-pathway system for $CO_2$ capture of claim 15, wherein the polymer backbone is selected from the group consisting of polyethylene oxide, polypropylene and polyethylene.

17. The dual-pathway system for $CO_2$ capture of claim 15, wherein the at least one buffering group is selected from the group consisting of phosphonates and metal-oxide nanomaterials.

18. The dual-pathway system for $CO_2$ capture of claim 1, further comprising a stack of electrodialyzers.

19. The dual-pathway system for $CO_2$ capture of claim 1, wherein the catalyst-bonded membrane contactor comprises one or more gas-liquid membrane contactor materials having bonded thereto a buffering group catalyst.

20. The dual-pathway system for $CO_2$ capture of claim 19, wherein the gas-liquid membrane contactor material comprises one or more hollow-fiber.

21. The dual-pathway system for $CO_2$ capture of claim 20, wherein the one or more hollow-fiber is a material selected from the group consisting of polypropylene or polyethylene.

22. The dual-pathway system for $CO_2$ capture of claim 19, wherein the buffering group catalyst is a synthetic carbon anhydrase mimic.

23. The dual-pathway system for $CO_2$ capture of claim 20, wherein the catalyst-bonded membrane contactor comprises a baffle structure disposed exterior to the one or more hollow-fiber such that flows of the acidified oceanwater feedstock are introduced at one or more angles to the one or more hollow-fiber.

24. The dual-pathway system for $CO_2$ capture of claim 19, wherein at least a portion of the catalyst-bonded membrane contactor proximal to an intake thereof is free of the buffering group catalyst.

25. The dual-pathway system for $CO_2$ capture of claim 1, further comprising one or more renewable power sources electrically interconnected to power the dual-path system.

26. The dual-pathway system for $CO_2$ capture of claim 25, wherein at least one of the renewable power sources if photovoltaics and wherein the photovoltaics collect infrared radiation, and wherein the infrared radiation is used to generate heat to heat the catalyst-bonded membrane contactor.

27. The dual-pathway system for $CO_2$ capture of claim 2, wherein the sedimentation element is further provided with at least one seeding growth material selected from the group consisting of vaterite, calcite, and salt solutions thereof.

28. The dual-pathway system for $CO_2$ capture of claim 1, wherein the first portion comprises ~0.5% of the oceanwater introduced into the dual-pathway system.

29. The dual-pathway system for $CO_2$ capture of claim 1, wherein the catalyst-bonded membrane contactor is in fluid communication with the HCl feedstock.

30. The dual-pathway system for $CO_2$ capture of claim 1, wherein at least one electrodialyzer further outputs a dilute low salt concentration water effluent, and wherein the dilute low salt concentration water effluent is reintroduced into the electrodialyzer as a feedstock.

31. A dual-pathway method for $CO_2$ capture comprising:
introducing a first portion of oceanwater into an acid-base-generator;
converting the first portion of the oceanwater into a feedstock of NaCl;
electrodialyzing in a bipolar membrane the NaCl into a HCl feedstock and a NaOH feedstock;
introducing a second portion of oceanwater to an acidification element in fluid communication with the HCl feedstock to produce an acidified oceanwater feedstock from the oceanwater;

extracting gaseous $CO_2$ from the acidified oceanwater feedstock through a catalyst-bonded membrane contactor and outputting a decarbonized acidified oceanwater effluent;
introducing a source of fluid entrained $CO_2$ to an alkaline $CO_2$ removal system in fluid communication with the NaOH feedstock and configured to produce a $CO_2$ lean effluent and a carbonate; wherein the source of fluid entrained $CO_2$ comprises a $CO_2$ containing gas feedstock, and further comprising:
introducing the $CO_2$ containing gas feedstock to a direct air capture element in fluid communication with the NaOH feedstock and configured to produce a $CO_2$-lean gas effluent and a carbonate solution; and
mixing the decarbonized acidified oceanwater effluent and the carbonate solution to entrain the $CO_2$ within the carbonate into the decarbonized acidified oceanwater effluent for release into the environment.

32. The dual-pathway method for $CO_2$ capture of claim 31, wherein the source of fluid entrained $CO_2$ comprises a third portion of oceanwater, and further comprising:
introducing the third portion to a basification element in fluid communication with the NaOH feedstock to produce a basified oceanwater feedstock from the oceanwater;
collecting a mineral carbonate precipitate from the basified oceanwater feedstock and outputting a decarbonized basified oceanwater effluent; and
mixing the decarbonized acidified oceanwater effluent and the decarbonized basified oceanwater effluent to form a mixed oceanwater effluent having a pH approximately equivalent to the pH of the source of oceanwater for release into the environment.

33. The dual-pathway method for $CO_2$ capture of claim 31, wherein the acidified oceanwater feedstock has a pH range between pH~4 to PH~7.

34. The dual-pathway method for $CO_2$ capture of claim 32, wherein the basified oceanwater feedstock has a pH of around 10, and wherein the mineral carbonate precipitate is $CaCO_3$.

35. The dual-pathway method for $CO_2$ capture of claim 31, wherein the first portion comprises ~0.5% of the oceanwater introduced into the dual-pathway system.

* * * * *